(12) United States Patent
Tay

(10) Patent No.: US 8,724,009 B2
(45) Date of Patent: May 13, 2014

(54) AUTO-FOCUS IMAGE SYSTEM

(76) Inventor: Hiok Nam Tay, Singapore (SG)

( * ) Notice: Subject to any disclaimer, the term of this patent is extended or adjusted under 35 U.S.C. 154(b) by 517 days.

(21) Appl. No.: 13/102,040

(22) Filed: May 5, 2011

(65) Prior Publication Data

US 2011/0273610 A1    Nov. 10, 2011

Related U.S. Application Data

(60) Provisional application No. 61/331,732, filed on May 5, 2010.

(51) Int. Cl.
*H04N 5/232*    (2006.01)
*G06K 9/40*    (2006.01)

(52) U.S. Cl.
USPC ............................ 348/345; 348/349; 382/255

(58) Field of Classification Search
CPC ...... H04N 5/23212; G02B 7/36; G02B 7/365; G03B 13/36; G06T 7/00; G06T 7/0085
See application file for complete search history.

(56) References Cited

U.S. PATENT DOCUMENTS

| 7,899,264 | B2 * | 3/2011 | Stewart | 382/255 |
| 7,978,247 | B2 * | 7/2011 | Nakajima et al. | 348/333.04 |
| 8,264,591 | B2 * | 9/2012 | Yeo et al. | 348/345 |
| 2003/0219172 | A1 * | 11/2003 | Caviedes et al. | 382/286 |
| 2005/0243351 | A1 * | 11/2005 | Aoyama | 358/1.9 |

* cited by examiner

*Primary Examiner* — Luong T Nguyen

(57) ABSTRACT

An auto focus image system that includes a pixel array coupled to a focus signal generator. The pixel array captures an image that has at least one edge with a width. The focus signal generator may generate a focus signal that is a function of the edge width and/or statistics of edge widths. A processor receives the focus signal and/or the statistics of edge widths and adjust a focus position of a focus lens. The edge width can be determined by various techniques including the use of gradients. A histogram of edge widths may be used to determine whether a particular image is focused or unfocused. A histogram with a large population of thin edge widths is indicative of a focused image. Edge corruption/partial corruption may be detected. Partially corrupted edge may have edge width calculated by relying more on the side that is not corrupted and less on the side that is corrupted. Edge or edge side corruption may be detected by detecting a presence of an adjacent edge of the opposite sign.

24 Claims, 37 Drawing Sheets

|    | C1       | C2       | C3       | C4       | C5      | C6      |
|----|----------|----------|----------|----------|---------|---------|
| R1 | 10 / 9 V | 10 / 10 V| 10 / 9 V | 2 / 0    | 0 / 0   | 0 / 0   |
| R2 | 3 / 0    | 10 / 8 V | 10 / 11 V| 9 / 10 V | 1 / 0   | 0 / 0   |
| R3 | 1 / 0    | 3 / 1    | 8 / 8 V  | 9 / 11 V | 7 / 8 V | 1 / 0   |
| R4 | 0 / 0    | 1 / 0    | 3 / 2    | 7 / 8 V  | 8 / 10 V| 7 / 8 V |
| R5 | 0 / -2   | 0 / 0    | 1 / 1    | 3 / 3    | 7 / 12 H| 6 / 12 H|
| R6 | 0 / -1   | 0 / -1   | 0 / 0    | 1 / 2    | 3 / 0 V | 1 / 8 H |

$b = a\,cos\phi$ corrects edge width for slant angle $\phi$
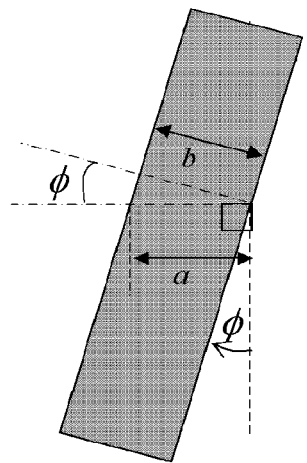
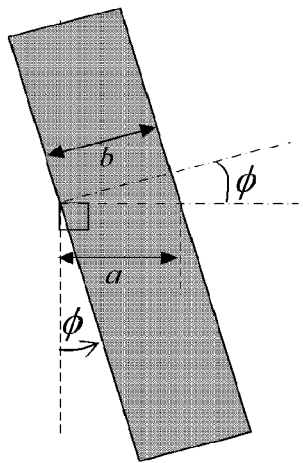
FIG. 6A　　　　　　　　　　　　　　FIG. 6B
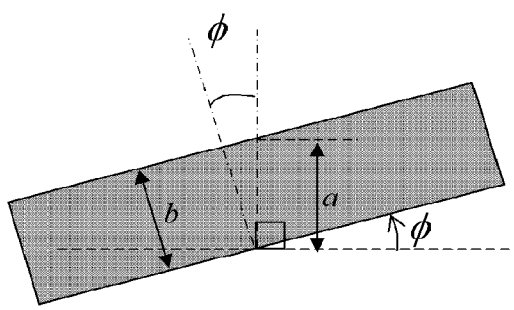
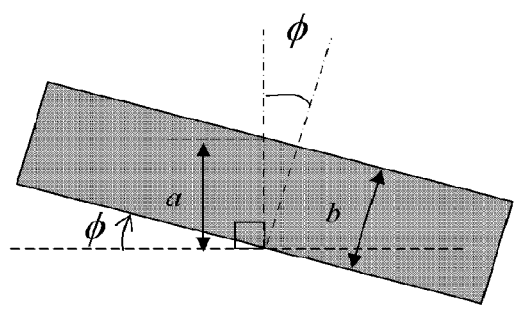
FIG. 6C　　　　　　　　　　　　　　FIG. 6D

| | C1 | C2 | C3 | C4 | C5 | C6 |
|---|---|---|---|---|---|---|
| R1 | 0<br>6 H | 5<br>10 H | 1<br>3 | 2<br>0 | 0<br>0 | 0<br>0 |
| R2 | 3<br>0 | 8<br>8 H | 15<br>11 V | 19<br>10 V | 1<br>0 | 0<br>0 |
| R3 | 1<br>0 | 3<br>1 | 18<br>8 V | 19<br>11 V | 17<br>8 V | 1<br>0 |
| R4 | 0<br>0 | 1<br>0 | 3<br>2 | 17<br>8 V | 18<br>10 V | 7<br>3 H |
| R5 | 0<br>2 | 0<br>0 | 1<br>1 V | 3<br>3 | 7<br>12 H | 6<br>12 H |
| R6 | 0<br>1 | 0<br>1 | 0<br>0 | 1<br>2 | 3<br>0 | 1<br>8 H |

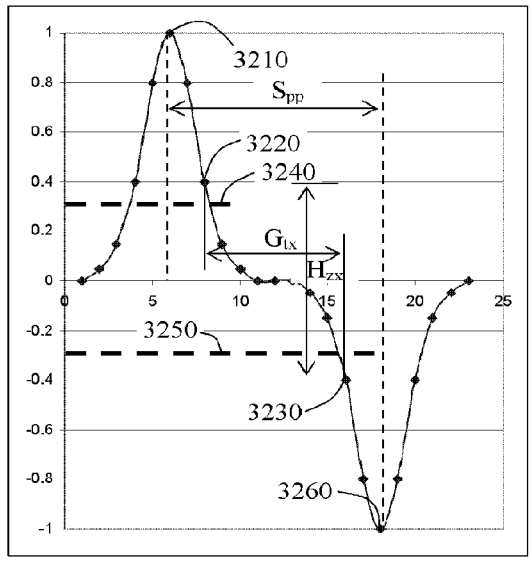
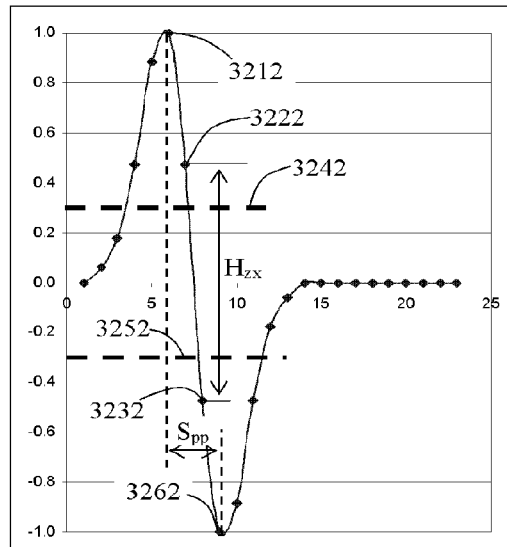
FIG. 51A  FIG. 51B
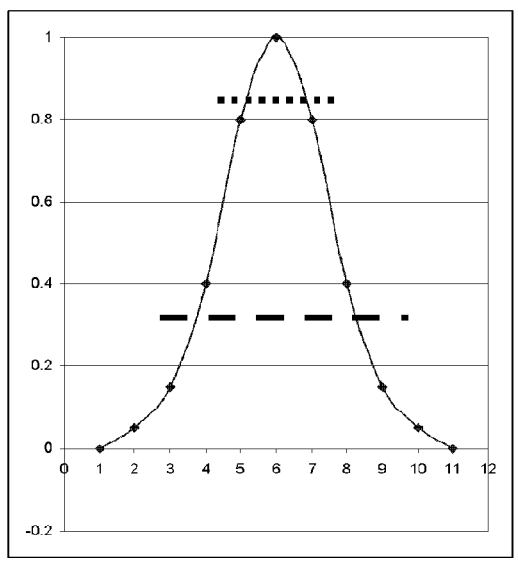
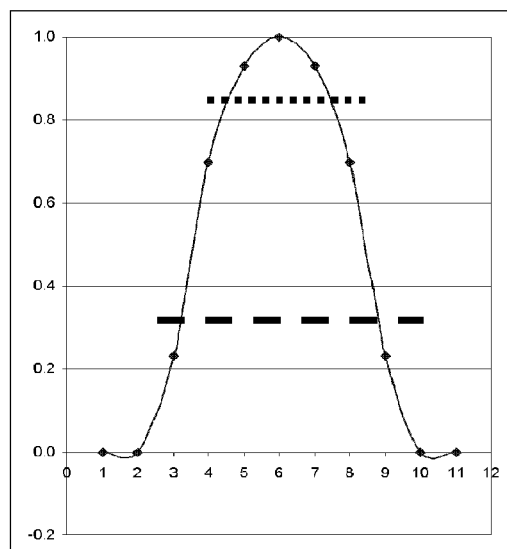
FIG. 52A  FIG. 52B

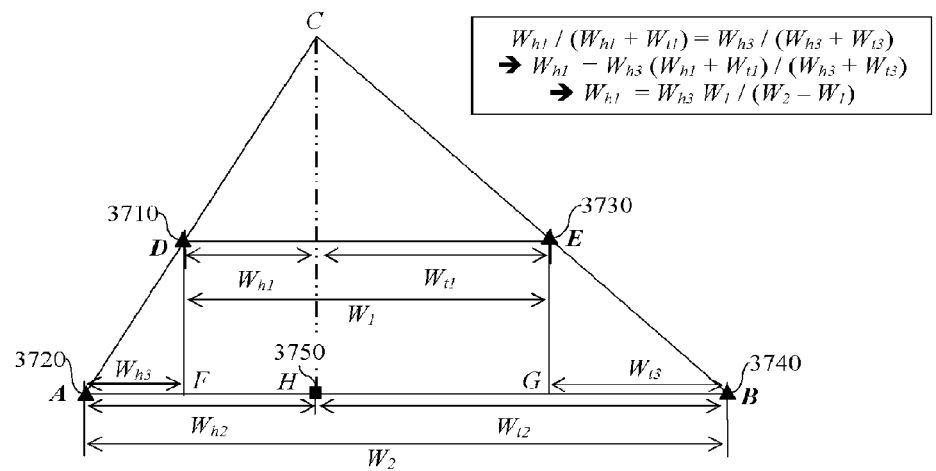
FIG. 56
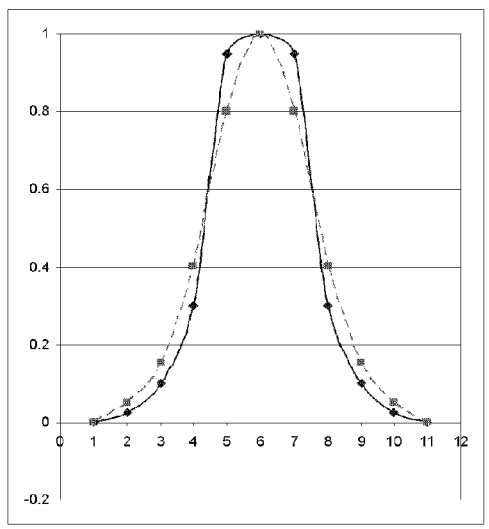
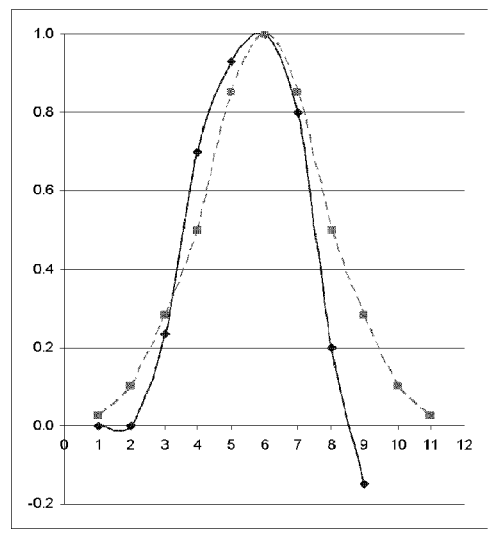
FIG. 57A　　　　FIG. 57B

AUTO-FOCUS IMAGE SYSTEM

REFERENCE TO RELATED APPLICATION

This Application claims priority to U.S. Provisional Application No. 61/331,732, filed on May 5, 2010.

BACKGROUND OF THE INVENTION

1. Field of the Invention

The subject matter disclosed generally relates to auto-focusing electronically captured images.

2. Background Information

Photographic equipment such as digital cameras and digital camcorders may contain electronic image sensors that capture light for processing into still or video images, respectively. Electronic image sensors typically contain millions of light capturing elements such as photodiodes.

Many image capturing devices such as cameras include an auto-focusing system. The process of auto-focusing includes the steps of capturing an image, processing the image to determine whether it is in focus, and if not, generating a feedback signal that is used to vary a focus position of a focus lens. There are two primary auto-focusing techniques. The first technique involves contrast measurement, the other technique looks at a phase difference between a pair of images. In the contrast method the intensity difference between adjacent pixels is analyzed and the focus is adjusted until a maximum contrast is detected. Although acceptable for still pictures the contrast technique is not suitable for motion video.

The phase difference method includes splitting an incoming image into two images that are captured by separate image sensors. The two images are compared to determine a phase difference. The focus position is adjusted until the two images match. The phase difference method requires additional parts such as a beam splitter and an extra image sensor. Additionally, the phase difference approach analyzes a relatively small band of fixed detection points. Having a small group of detection points is prone to error because noise may be superimposed onto one or more points. This technique is also ineffective if the detection points do not coincide with an image edge. Finally, because the phase difference method splits the light the amount of light that impinges on a light sensor is cut in half or even more. This can be problematic in dim settings where the image light intensity is already low.

BRIEF SUMMARY OF THE INVENTION

An auto focus image system that includes a pixel array coupled to a focus signal generator. The pixel array captures an image that has at least one edge with a width. An edge is a group of a plurality of pixels arrayed side-by-side in a direction and a gradient signal in said direction is either all-positive or all-negative over the plurality of pixels. The generator generates a focus signal that is a function of the edge width and various statistics of edge width. The generator may eliminate an edge having an asymmetry of a gradient of an image signal. The generator may also eliminate an edge that fails a template for an associated peaking the gradient. Edge corruption/partial corruption may be detected. Partially corrupted edge may have edge width calculated by relying more on the side that is not corrupted and less on the side that is corrupted. Edge or edge side corruption may be detected by detecting a presence of an adjacent edge of the opposite sign.

In a first aspect, a method is disclosed that determines a measure of sharpness of image on basis of a plurality of edges. The method comprises detecting that an edge that has gradient values of an opposite sign to those of another edge is too near to the other edge.

In the first aspect, the detecting may be performed in any one or more proximity tests. In a first, gradient values spaced one pixel apart are found to have opposite signs and their difference exceeds a gradient change threshold. In a second, a pair of pixels are found within a predetermined distance threshold from each other and are found to have gradient values having opposite signs and magnitudes that exceed a predetermined magnitude threshold. In a third, a positive peak gradient and a negative peak gradient are found to be within a predetermined distance threshold from each other. In a fourth, a second derivative of the gradient signal is evaluated adjacent to a peak and is found to fall outside of a predetermined permissible range.

In a second aspect, referred to as shape test, a method is disclosed that determines a measure of sharpness of image on basis of a plurality of edges. The method takes a first measure of the gradient signal at the edge in addition to a second measure of on the gradient signal at the edge, where the second measure contributes to the measure of sharpness depending on a result of the first measure.

In the second aspect, the first measure may be such that it differentiates between two symmetrical sequence of gradient values over the edge where one sequence declines in constant step size from where the sequence peaks while the other sequence declines in increasing step size away from its peak, although both give rise to the same value for the second measure. Such a first measure is different from a measure that measures asymmetry in the sequence of gradient values across an edge and is valuable for distinguishing spurious edge whose sequence of gradient values is not asymmetrical.

In the second aspect, the first measure may measure the gradient signal essentially to one side of a location where the gradient signal peaks, and separately to the other side. The second measure may likewise measure the two sides separately.

In a third aspect, a method is disclosed that determines a measure of sharpness of image on basis of a plurality of edges. In this method, if the gradient signal to one side of a location where the gradient signal peaks is found to fail to meet a criterion under the shape test or a criterion under the proximity test, the second measure is taken of the gradient signal to the other side of the location and is emphasized over the second measure of the one side for contribution to the measure of sharpness of image. Preferably, the second measure taken of the other side may be assigned a weight heavier than that for the one side. For example, if the second measure measures a width of each side from a gradient peak location, then an edge width may be taken to be twice the width of the other side.

BRIEF DESCRIPTION OF THE DRAWINGS

FIG. 6A, 6B are illustrations of a calculation of an edge width of a vertical edge having a slant angle $\phi$;

FIG. 6C, 6D are illustrations of a calculation of an edge width of a horizontal edge having a slant angle φ;

FIG. 51A illustrates a gradient of an image signal across two adjacent edges of opposite polarities (i.e. signs) where the edges do not overlap;

FIG. 51B illustrates a gradient of an image signal across two adjacent edges of opposite polarities (i.e. signs) where the edges mutually overlap to cause corruption to each other in the form of "cliff";

FIG. 52A illustrates a gradient of an image signal across an edge;

FIG. 52B illustrates a gradient of an image signal across a spurious edge;

FIG. 56 illustrate details of calculation for the peak interpolation method used on FIGS. 54A to 54D;

FIG. 57A illustrates a corrupted gradient profile that has "swell" on both sides, alongside a normal gradient profile fitted to the width at the gradient level of 50% of peak gradient; and, FIG. 57B illustrates a corrupted gradient profile that has a "swell" on the left side and a "cliff" on the right side, alongside a normal gradient profile fitted to the width at the gradient level of 50% of peak gradient and shifted to align peak-to-peak with the corrupted gradient.

DETAILED DESCRIPTION

Disclosed is an auto focus image system that includes a pixel array coupled to a focus signal generator. The pixel array captures an image that has at least one edge with a width. The focus signal generator may generate a focus signal that is a function of the edge width and/or statistics of edge widths. An auto focus image system that includes a pixel array coupled to a focus signal generator. The pixel array captures an image that has at least one edge with a width. The generator generates a focus signal that is a function of the edge width and various statistics of edge width. The generator may eliminate an edge having an asymmetry of a gradient of an image signal. The generator may also eliminate an edge that fails a template for an associated peaking in the gradient. A processor receives the focus signal and/or the statistics of edge widths and adjusts a focus position of a focus lens. The edge width can be determined by various techniques including the use of gradients. A histogram of edge widths may be used to determine whether a particular image is focused or unfocused. A histogram with a large population of thin edge widths is indicative of a focused image.

Architecture

Figure 1:
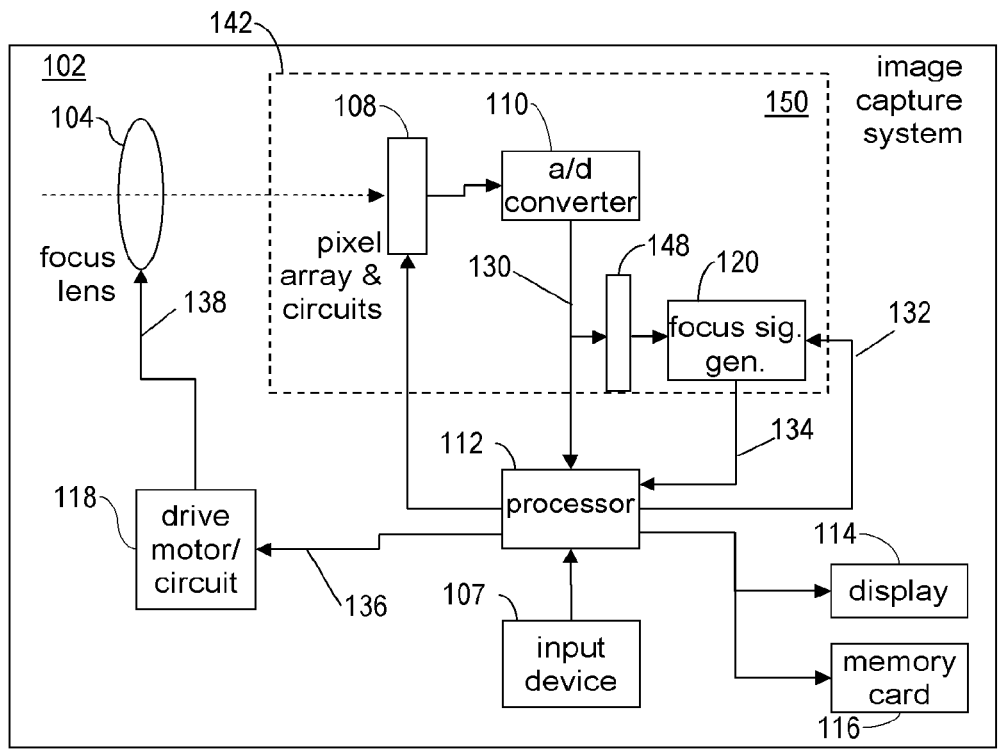
FIG. 1 is a schematic of an embodiment of an auto-focus image pickup apparatus.
Figure 2:
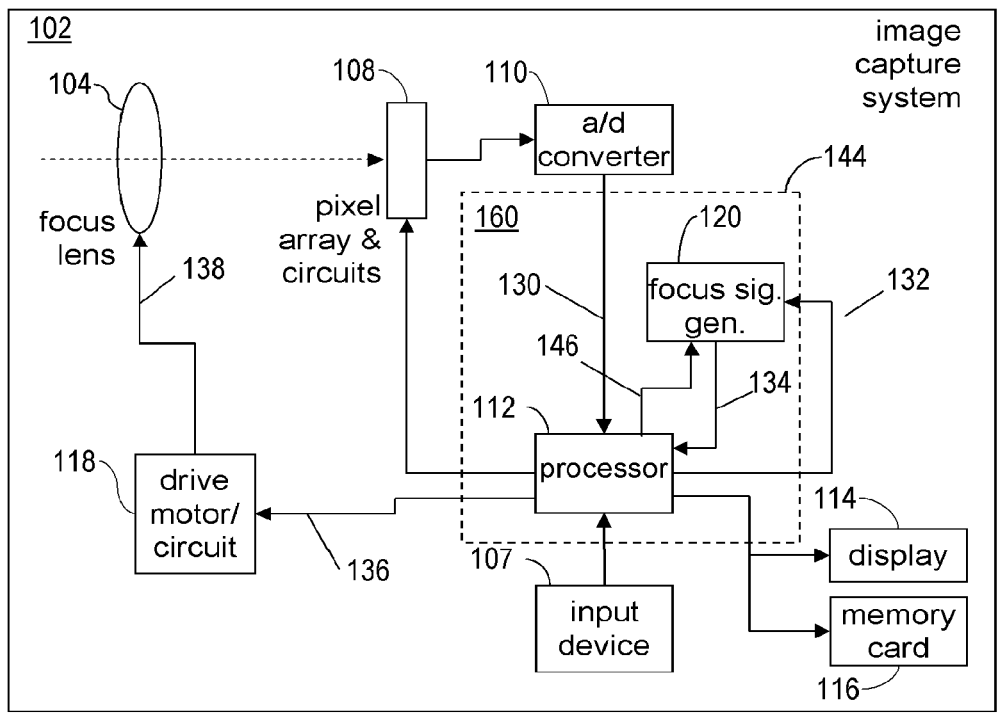
FIG. 2 is a schematic of an alternate embodiment of an auto-focus image pickup apparatus.

Referring to the drawings more particularly by reference numbers, FIG. 1 shows an embodiment of an auto-focus image capture system 102. The system 102 may be part of a digital still camera, but it is to be understood that the system can be embodied in any device that requires controlled focusing of an image. The system 102 may include a focus lens 104, a pixel array and circuits 108, an A/D converter 110, a processor 112, a display 114, a memory card 116 and a drive motor/circuit 118. Light from a scene enters through the lens 104. The pixel array and circuits 108 generates an analog signal that is converted to a digital signal by the A/D Converter 110. The pixel array 108 may incorporate a mosaic color pattern, e.g. the Bayer pattern. The digital signal may be sent to the processor 112 that performs various processes, e.g. color interpolation, focus position control, color correction, image compression/decompression, user interface control, and display control, and to the focus signal generator 120. Where the focus signal generator 120 and the processor 112 reside within different packages, a color interpolation unit 148 may be implemented to perform color interpolation on the digital signal 130 to estimate the missing color signals on each pixel for the focus signal generator 120. Alternatively, where the focus signal generator 120 and the processor 112 reside together within a package 144, the focus signal generator 120 may input interpolated color images from the processor 112 on bus 146 as shown in FIG. 2 or a single image signal derived from the original image signal generated from the A/D converter 110, for example a grayscale signal.

The focus signal generator 120 receives a group of control signals 132 from the processor 112, in addition, and may output signals 134 to the processor 112. The output signals 134 may comprise one or more of the following: a focus signal 134, a narrow-edge count, and a set of numbers representing a statistics of edge width in the image. The processor 112 may generate a focus control signal 136 that is sent to the drive motor/circuit 118 to control the focus lens 104. A focused image is ultimately provided to the display 114 and/or stored in the memory card 116. The algorithm(s) used to adjust a focus position may be performed by the processor 112.

The pixel array and circuits 108, A/D Converter 110, focus signal generator 120, and processor 112 may all reside within a package. Alternately, the pixel array and circuits 108, A/D Converter 110, and focus signal generator 120 may reside within a package 142 as image sensor 150 shown in FIG. 1, separate from the processor 112. Alternately, the focus signal generator 120 and processor 112 may together reside within a package 144 as a camera controller 160 shown in FIG. 2, separate from the pixel array 108 and A/D Converter 110.

Focus Signal Generator

Figure 3:
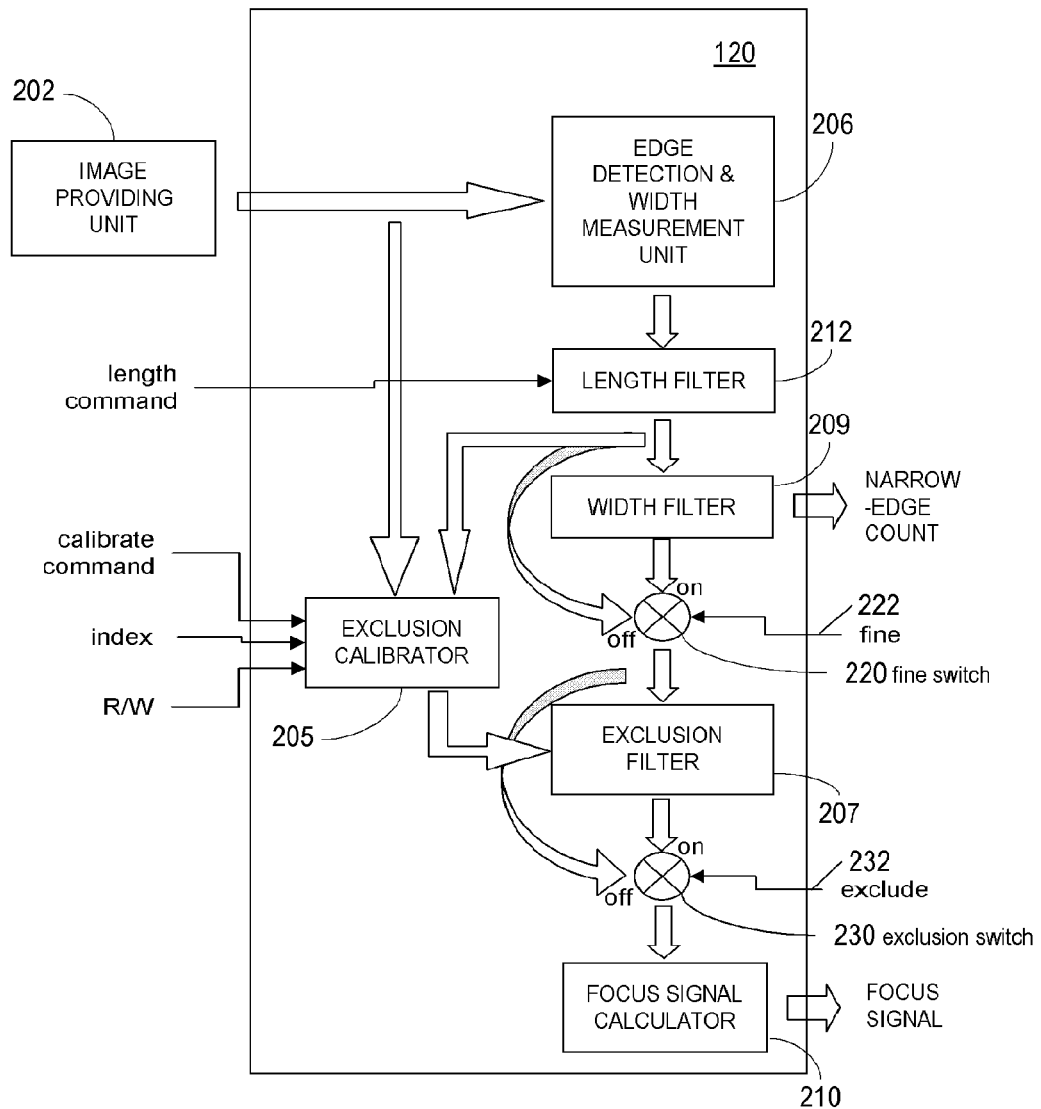
FIG. 3 is a block diagram of a focus signal generator.

FIG. 3 shows an embodiment of a focus signal generator 120 receiving image(s) from a image providing unit 202. The image providing unit 202 may be the color interpolator 148 in FIG. 1 or the processor 212 in FIG. 2. The focus signal generator 120 may comprise an edge detection & width measurement (EDWM) unit 206, a focus signal calculator 210, a length filter 212, a width filter 209, an exclusion filter 207, and an exclusion calibrator 205. It may further comprise a fine switch 220 and an exclusion switch 230, controlled by inputs 'fine' 222 and 'exclude' 232, respectively. The focus signal generator 120 may provide a narrow-edge count from the width filter 209 and a focus signal from the focus signal calculator 210, the focus signal being configurable between a fine focus signal and a gross focus signal, selectable by input 'fine' 222. Alternately, both fine focus signal and gross focus signal may be calculated and output as part of output signals 134. The edge detection & width measurement unit 206 receives image(s) provided by the image providing unit 202. The exclusion calibrator 205 receives command and control signals (calibrate command, index, and R/W) input to the focus signal generator 120. In the context of FIGS. 1 and 2, these command and control signals, along with control signal 'fine' 222 and 'exclude' 232, may be provided by the processor 112 in signals 132. Also in the context of FIGS. 1 and 2, the output signals 134 may be provided to the processor 112, which functions as a focus system controller that controls the focus position of the focus lens 104 to bring images of objects into sharp focus on the pixel array 108 by analyzing the output signals 134 to detect a sharp object in the image. Various components of the focus signal generator 120 are described below.

The EDWM unit 206 may transform the input image such that the three signals of the image, red (R), green (G) and blue (B) are converted to a single image signal. Several techniques can be utilized to transform an image to a single image. RGB values can be used to calculate a luminance or chrominance value or a specific ratio of RGB values can be taken to form the single image signal. For example, the luminance value can be calculated with the equation $Y=0.2126*R+0.7152*G+0.0722*B$, where Y is luminance value. The single image signal may then be processed by a Gaussian filter or any lowpass filter to smooth out pixel signal values among neighboring pixels to remove a noise.

The focus signal generator 120, 120', 120" is not limited to grayscale signal. It may operate on any one image signal to detect one or more edges in the image signal. Or it may operate on any combination of the image signals, for example Y, R-G, or B-G. It may operate on each and every one of the R, G, B image signals separately, or any one or more combinations thereof, to detect edges. It may form statistics of edge widths for each of the R, G, B image signals, or any combination thereof. It may form a focus signal from statistics of edge widths from one or more image signals.

A gradient of the processed image is then calculated. There are various methods available to calculate the gradient, including Laplacian, and Sobel. Gradients across the columns and the rows may be calculated to detect vertical and horizontal edges respectively, for example using a Sobel-X operator and a Sobel-Y operator, respectively. Sobel X-operator at pixel location [k, q] where k is a row number and q is a column number, is given by the equation $Sx[k, q]=U[k, q+1]-U[k, q-1]$. Sobel Y-operator at the same location is given by the equation $Sy[k,q]=U[k+1,q]-U[k-1,q]$, where U is an image signal of the processed image.

Orientation Tagging

Figures 4, 5:
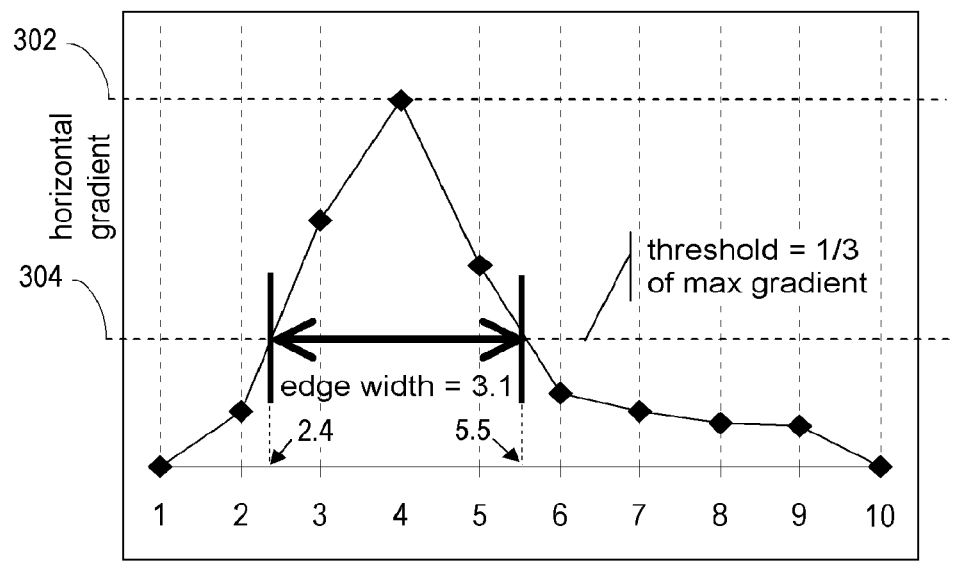
FIG. 4 is an illustration of a horizontal Sobel operator's operation on a image signal matrix.
FIG. 5 illustrates a calculation of edge width from a horizontal gradient.

Each pixel is tagged either a horizontal edge ('H') or a vertical edge ('V') if either vertical or horizontal gradient magnitude exceeds a predetermined lower limit ("elimination threshold"), e.g. 5 for an 8-bit image, or no edge if neither is true. This lower limit eliminates spurious edges due to gentle shading or noise. A pixel is tagged a vertical edge if its horizontal gradient magnitude exceeds its vertical gradient magnitude by a predetermined hysteresis amount or more, e.g. 2 for an 8-bit image, and vice versa. If both gradient magnitudes differ less than the hysteresis amount, the pixel gets a direction tag same as that of its nearest neighbor that has an direction tag already determined. For example, if the image is scanned from left to right in each row and from row to row downwards, a sequence of inspection of neighboring pixels may be the pixel above first, the pixel above left second, and the pixel on the left third, and the pixel above right last. Applying this hysteresis helps to ensure that adjacent pixels get similar tags if each of them has nearly identical horizontal and vertical gradient magnitudes. FIG. 4 illustrates the result of tagging on a 6-by-6 array of horizontal and vertical gradients. In each cell, the horizontal gradient is in the upper-left, vertical gradient is on the right, and direction tag is at the bottom. Only pixels that have either horizontal or vertical gradient magnitude exceeding 5 qualify at this step as edge pixels are printed in bold and get direction tags.

The image, gradients and tags may be scanned horizontally for vertical edges, and vertically for horizontal edges. Each group of consecutive pixels in a same row, having a same horizontal gradient polarity and all tagged for vertical edge may be designated a vertical edge if no adjacent pixel on left or right of the group are likewise. Likewise, each group of consecutive pixels in a same column having a same vertical gradient polarity and all tagged for horizontal edge may be designated a horizontal edge if no adjacent pixel above or below the group satisfies the same. Thus horizontal and vertical edges may be identified.

Edge Width

Each edge may be refined by removing pixels whose gradient magnitudes are less than a given fraction of the peak gradient magnitude within the edge. FIG. 5 illustrates this step using a refinement threshold equal to one third of the edge's peak gradient magnitude, refining the edge width down to 3 from the original 9. This edge refinement distinguishes the dominant gradient component that sets the apparent edge width that dominates visual perception of the edge's sharpness despite an image having multiple overlapping shadings that may cause gradients to gently decay over many pixels.

Edge width may be calculated in any one of known methods. One method of calculating edge width is simply counting the number of pixels within an edge. An alternate method of calculating edge width is shown in FIG. 5. In FIG. 5, a first fractional pixel position (2.4) is found between a first outer pixel (pixel 3) of a refined edge and the adjacent outside pixel (pixel 2) by an interpolation from the refinement threshold 304. Likewise, a second fractional pixel position (5.5) is found between a second outer pixel (pixel 5) and its adjacent outside pixel (pixel 6). The edge width is found as the difference between these two fractional pixel positions, 5.5-2.4=3.1.

Slant Correction

Figures 7, 8:
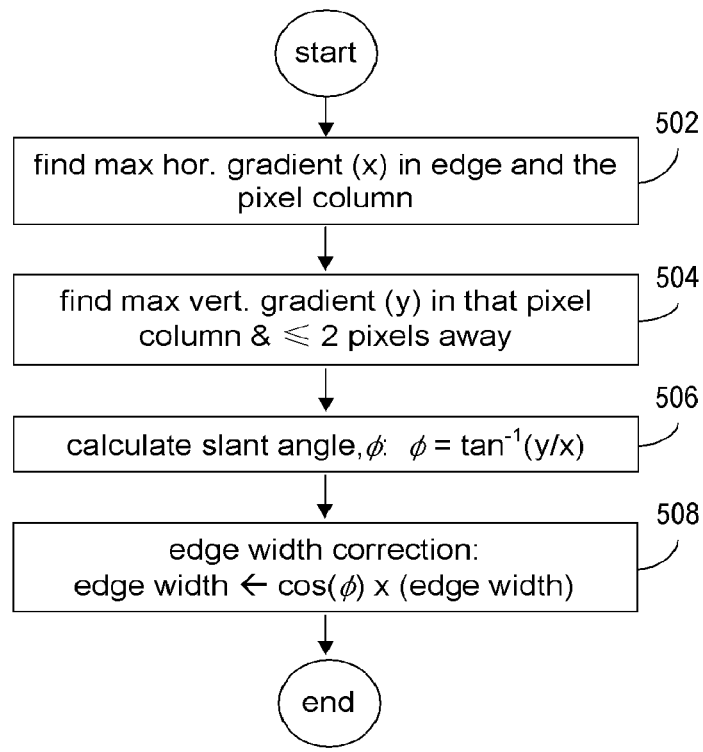
FIG. 7 is a flowchart of a process to calculate a slant angle φ and correct an edge width for a vertical edge having a slant.
FIG. 8 is an illustration of a vertical concatenated edge.

Each horizontal or vertical edge's edge width may be corrected for its slant from either the horizontal or vertical orientation, respectively. FIG. 6A, 6B illustrate a correction calculation for a vertical edge that has a slant from the vertical line. The correction consists of multiplying the edge width by a factor of $\cos \phi$, where $\phi$ is an angle of slant from the vertical line. Likewise, for a horizontal edge, $\phi$ is an angle of slant from the horizontal line. This slant angle $\phi$ may be used further in the exclusion filter 207 and exclusion calibrator 205. FIG. 7 shows a flowchart of a process to correct edge widths for slant for vertical edges. (For horizontal edges, substitute 'row' for 'column', and interchange 'vertical' with 'horizontal' in the flowchart.) For each vertical edge, at step 502, locate the column position where the horizontal gradient magnitude peaks, and find the horizontal gradient x. At step 504, find where the vertical gradient magnitude peaks along the column position and within two pixels away, and get the vertical gradient y. At step 506, find the slant angle $\phi=\tan^{-1}(y/x)$. At step 508, scale down the edge width by multiplying with $\cos(\phi)$, or an approximation thereof, as one skilled in the art usually does in practice.

Screen Threshold

Figure 9A:
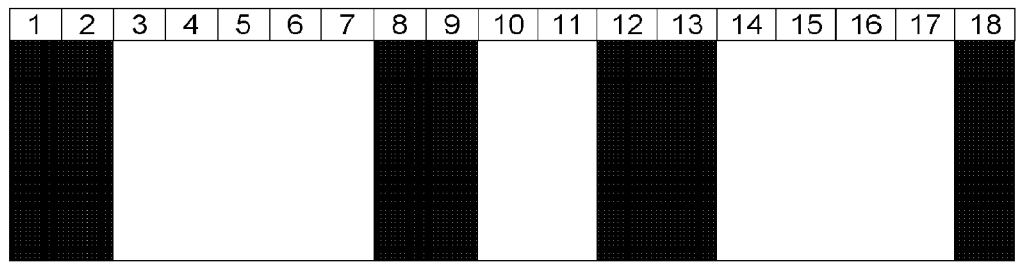
FIG. 9A is an illustration of a group of closely-packed vertical bars.
Figure 9B:
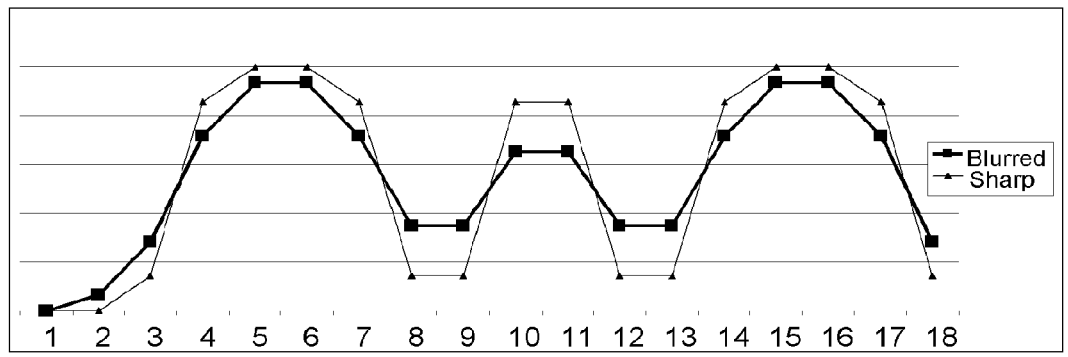
FIG. 9B is a graph of an image signal across FIG. 9A.
Figure 9C:
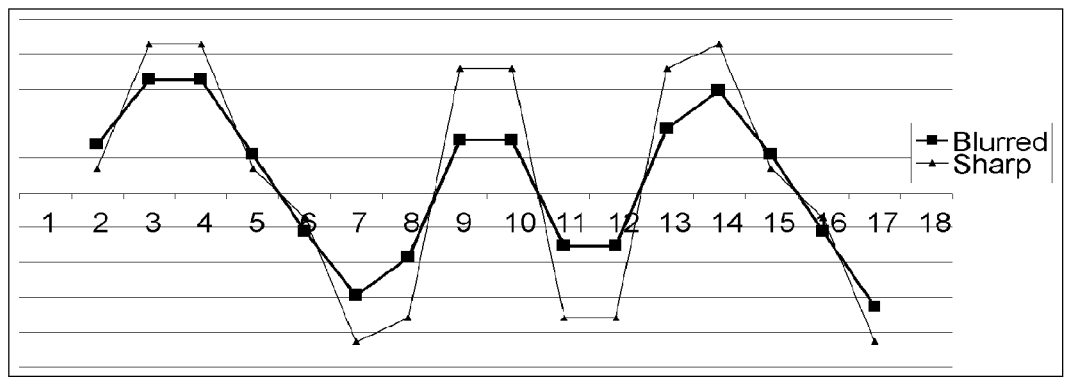
FIG. 9C is a graph of a horizontal Sobel gradient across FIG. 9A.

Adjacent narrow edges may be eliminated if their peak gradient magnitudes are below a predetermined fraction of the nearest wider edge's peak gradient magnitude. FIGS. 9A, 9B, and 9C illustrate a problem that is being addressed. FIG. 9A illustrates three vertical white bars separated by two narrow black spaces each 2 pixels wide. The middle white bar is a narrow bar 2 pixels wide. FIG. 9B shows an image signal plotted horizontally across the image in FIG. 9A for each of a sharp image and a blurred image. FIG. 9C plots Sobel-x gradients of FIG. 9B for the sharp image and blurred image. In FIG. 9C, the first edge (pixels 2-5) for the blurred image is wider than that for the sharp image, and likewise the last edge (pixels 13-15) as expected. However, the two narrowest edges (pixels 9 & 10, and pixels 11 & 12) have widths of two in both images. In FIG. 9B, the corresponding slopes at pixels 9 & 10, and pixels 11 & 12, each takes two pixels to complete a transition. The blurred image, however, has a significant decline of peak gradient magnitude, as much as 50%, from the wider edge to the narrow edge. The sharp image, on the other hand, changes less than 25% between the wider and the narrow edges. The significant decline, e.g. 40% or greater, in peak gradient magnitude for a narrow edge adjacent to a wider edge of an opposite gradient polarity gives the hint that the blurred image is not well focused, and thus the narrow edge should not be taken as an indication that the blurred image is sharp. Likewise, adjacent narrow edges of alternating gradient polarity should not be taken as such indication as long as they are in close proximity to each other, e.g. no more than 1 pixel apart ("minimum edge gap"). The minimum edge gap is in terms of a number of pixels, e.g. 1, or 2, or in between. Furthermore, given that one narrow pulse may have been eliminated due to having a peak gradient less than the elimination threshold, two successive narrow pulses having an identical gradient polarity and spaced no more than the minimum edge gap plus the narrow width apart and one of them adjacent to a wider pulse of significantly larger gradient magnitude should not be taken as such indication either. We thus have the following algorithm for eliminating closely-packed narrow edges based on a screen threshold established as a fraction of a wider edge adjacent a narrow edge, and a modulation screen flag that can be turned on and off. For each edge, the screen threshold and screen flag to be used for the immediate next edge of an opposite polarity are determined as in FIG. 10. An edge is eliminated unless one of the following conditions is true: (a) the screen flag is off for this edge, (b) the edge's peak gradient magnitude is not below the screen threshold for this edge, or (c) the edge width is not less than sharp_edge_width+1, a number having been assigned for sharp_edge_width to designate an edge width of a sharp edge. For the example shown in FIGS. 9A-9C, sharp_edge_width may be 2.

Figure 10:
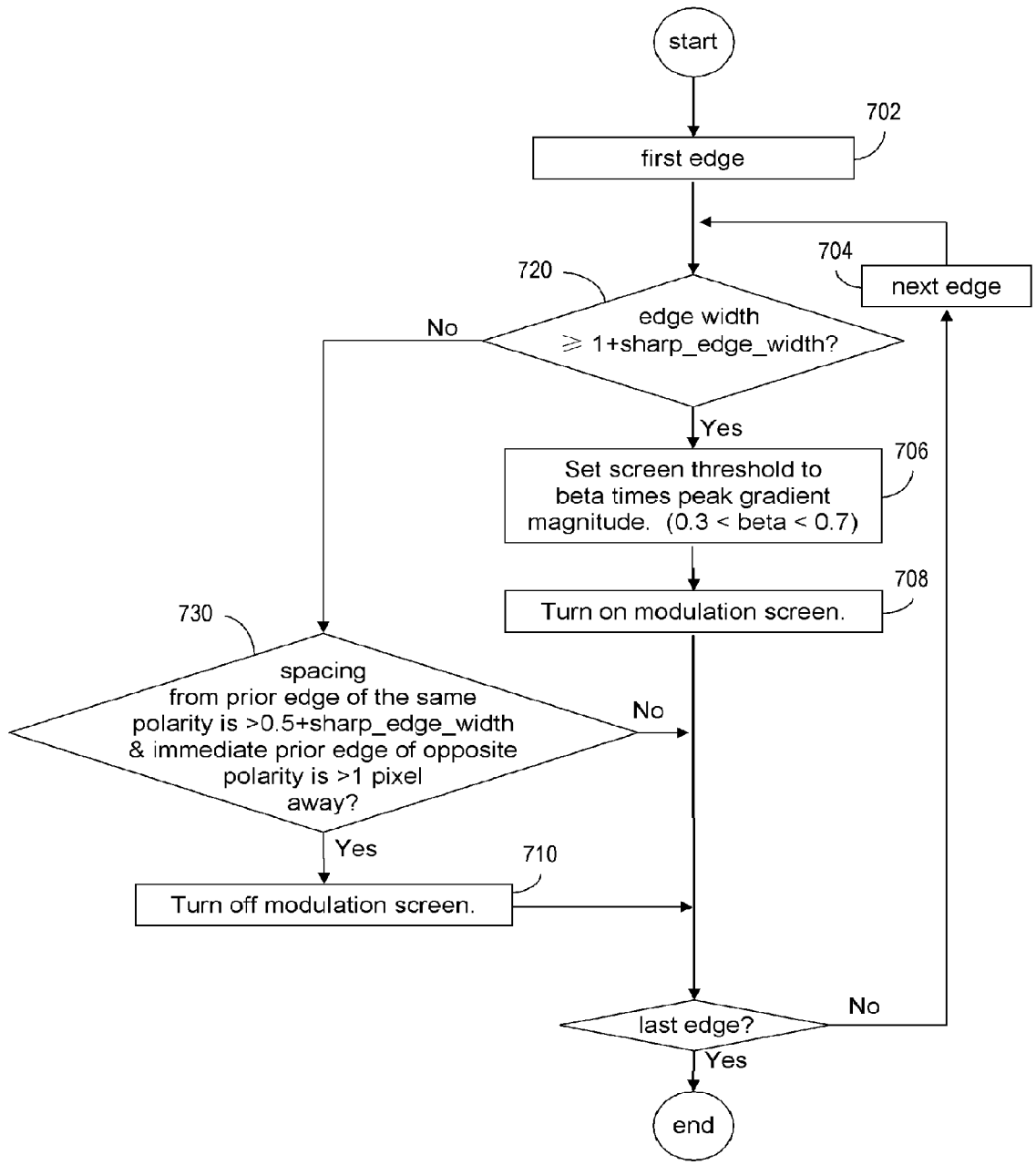
FIG. 10 is a flowchart of a process to eliminate closely-packed edges having shallow depths of modulation.

FIG. 10 is a flowchart to determine a screen threshold and a screen flag for each edge. For vertical edges, assume scanning from left to right along a row, though this is not required. (For horizontal edges, assume scanning from top to bottom along a column, though this is not required.) A number is assigned for sharp_edge_width and may be 2 for the example shown in FIGS. 9A-9C. Starting at the first edge at step 702, each edge is queried at step 720 as to whether its edge width is greater than or equal to one plus sharp_edge_width, the value of one being the minimum edge gap value used for this illustration, but a different value may be used. If yes, the edge is a wider edge, and step 706 follows to set the screen threshold for the immediate next edge that has an opposite polarity to beta times a peak gradient magnitude of the edge, beta being from 0.3 to 0.7, preferably 0.55, then step 708 follows to turn on the screen flag, then proceed to the next edge. If no, the edge is not a wider edge, and step 730 follows to check whether the spacing from the prior edge of the same gradient polarity is greater than the minimum edge gap (or a different predetermined number) plus sharp_edge_width and the immediate prior edge of an opposite polarity is more than the minimum edge gap away. If yes, step 710 follows to turn off the screen flag. If no, keep the screen flag and screen threshold and proceed to the next edge. Beta may be a predetermined fraction, or it may be a fraction calculated following a predetermined formula. In the latter case, beta may vary from one part of the image to another part.

Gradient Asymmetry

FIG. 51A and FIG. 51B illustrate a method where the focus signal generator detects an asymmetry about a peak in a gradient signal to reduce or eliminate altogether an associated edge from entering a focus signal or edge count. FIG. 51A illustrates a gradient of an image signal across two adjacent edges of opposite polarities where the edges are apart and do not overlap. FIG. 51B, on the other hand, illustrates a gradient of an image signal across two adjacent edges of opposite polarities where the edges are close enough to mutually overlap. In FIG. 51A, the gradient rises to a positive on the left and dips to a negative peak on the right. Adjacent to each peak, the gradient has a left-to-right symmetry about the peak. Using a threshold of 0.3 times of the peak gradient magnitude, the positive peak and the negative peak each corresponds to an edge width of 5 for a respective edge. In FIG. 51B, on the other hand, a positive peak on the left and a negative peak on the right are closer together than in FIG. 51A. In FIG. 51B, as in FIG. 51A, the gradient values are normalized to give peak gradient magnitudes of 1.0. The contributions from the edges that correspond to the peaks in FIG. 51B apparently partially cancel each other, causing a reduction in gradient magnitudes between the two peaks of opposite polarities. As a result, each peak has an asymmetry about itself. As another result, the edge width around each peak is reduced to 4, using the same threshold of 0.3 times of the peak gradient magnitude. The edge widths of both edges thus measured no longer represents a state of focusing. The focus signal generator may detect an asymmetry about a peak and de-emphasize a contribution of an associated width towards a focus signal and/or an edge count or eliminate it altogether.

On way to detect an asymmetry about a peak is to find a difference between the numbers of pixels on one side of the peak and on the other side, gradient magnitudes at the pixels being above a certain fraction of a peak gradient. This is illustrated by way of an example using FIG. 51A and FIG. 51B and a fraction of 0.3. In FIG. 51A, for the positive peak on the left, and above gradient value of +0.3, two pixels lie to the left and two pixels lie to the right of the peak. The difference between two and two is zero. No asymmetry is detected. In FIG. 51A, on the other hand, for the positive peak on the left, and above gradient value of +0.3, two pixels lie to the left and one pixels lie to the right of the peak. There is one more pixel on the left than on the right of the positive peak on the left in FIG. 52B. An asymmetry is detected.

A modification to the above way to detect an asymmetry about a peak that one skilled in the art would readily appreciate is to interpolate the gradient to find the fractional pixel distances on the left and right of each peak where the interpolated gradient (for example the solid line in FIG. 51A and FIG. 51B) crosses the above fraction of gradient magnitude of the peak, calculate a difference between the distances and decide there is an asymmetry if the difference exceeds a certain asymmetry threshold. The asymmetry threshold may be a given number for an image, or a number that depends on the edge width of the edge associated with the peak. Other reasonable choices for determining the asymmetry threshold are acceptable.

A further modification is to interpolate the gradient to find a fractional pixel position where the interpolated gradient has a maximum magnitude ("interpolated peak position"). This interpolated peak position may be used to calculate the distances to the left and to the right as described above. The interpolated gradient magnitude at the interpolated peak position may be used to calculate the gradient magnitude at which said distances are measured or above which pixels are counted.

An alternate way to detect an asymmetry about a peak is to find a difference between two areas, one to the left and the other to the right of the peak (or interpolated peak as above), and compare the difference with an asymmetry threshold. Each of the two areas may be bounded on one side by a vertical line under the peak (or the interpolated peak), on the other side by the interpolated gradient, and from the top and bottom by two horizontal lines each at a different fraction of the peak gradient. By way of example, in FIG. 51B, an upper horizontal line may be drawn at 0.9 and a lower horizontal line at 0.1 (both horizontal lines not shown). An area left of the positive peak on the left is bounded from above by 0.9, from below by 0.1, from the right by the vertical dashed line under the peak, and from the left by the interpolated gradient curve. An area right of the same peak bounded from above by 0.9, from below by 0.1, from the right by the interpolated gradient curve, and from the left by the vertical dashed line. An asymmetry may be measured by calculating a difference or a ratio between the areas and compared with a certain asymmetry threshold. As above, the asymmetry threshold may be a given number for an image, or a number that depends on the edge width of the edge associated with the peak. Other reasonable choices for determining the asymmetry threshold are acceptable.

A modification to the above way is to find a difference in pixels that have gradient magnitudes that fall between those two gradient thresholds (the upper and horizontal lines). A difference that is greater than zero may indicate an asymmetry. By way of example, in FIG. 51B, between an upper gradient threshold of 0.9 and a lower gradient threshold of 0.1, 3 pixels lie to the left whereas only one pixel to the right of the positive peak, indicating an asymmetry.

A second modification to the above way is to find a difference in lengths of the interpolated gradient curve (such as the solid line in FIG. 51B) between those two gradient thresholds. By way of example, in FIG. 51B, the interpolated gradient curve is longer left of the positive peak between normalized gradient values of 0.2 and 0.6 than right of the peak, indicating an asymmetry.

Yet another way may be to find a difference between slopes of the gradient on two sides of the peak and compare the difference with an asymmetry threshold. By way of example, the slopes may be calculated from an interpolation. By way of example, the slopes may be calculated at a gradient level that is a certain fraction of the peak gradient value, for example 0.5. In FIG. 51B, at where the gradient is at 0.5 of the peak gradient, the slope right of the positive peak is steeper than the slope left of the peak.

There are other methods for detecting asymmetry about a peak as on skilled in the art may find.

The above detection and solution for asymmetric edges may be performed in the Edge Detection & Width Measurement Unit 206.

Gradient Peaking Template

FIG. 52A and FIG. 52B illustrate a method where the focus signal generator compares a gradient peaking template with a gradient signal about a peak to detect a mismatch and thence to reduce or eliminate altogether an associated edge from entering a focus signal or edge count. FIG. 52A illustrates a gradient of an image signal across a genuine edge in the image signal, whereas FIG. 52B illustrates a gradient of an image signal across a spurious edge. A gradient peaking template may be specified in terms of a difference (or a ratio) between a width of the gradient signal peaking at an upper gradient magnitude and a width at a lower gradient magnitude. By way of example, in FIG. 52A, and likewise in FIG. 52B, an upper gradient magnitude of 0.85 and a lower gradient magnitude of 0.3 are indicated with dotted and dashed lines, respectively. In FIG. 52A, the gradient peaking width at the upper gradient magnitude is the distance between where the interpolated gradient curve intersects the upper gradient magnitude, about 1.5 pixels. At the lower gradient magnitude, the gradient peaking width is about 4.5 pixels. The difference is 3.0 pixels. The ratio is 1 to 3. In FIG. 52B, the widths are about 3.2 pixels and 5.5, respectively, giving a difference of 2.3 pixels and a ratio of 1 to 1.7. A template may be specified for a difference to lie between 2.5 and 3.5 pixels, or/and for a ratio to lie between 1 to 2.6 and 1 to 3.45, outside of which an edge associated with the peak may be rejected or de-emphasized. Thus, in this example, the edge associated with the gradient peaking in FIG. 52B is rejected or de-emphasized.

An alternate way to specify a gradient peaking template is to find a difference or ratio between the numbers of pixels above an upper gradient magnitude and those above a lower gradient magnitude, each gradient magnitude being at a certain upper fraction and lower fraction, respectively, from a peak (or interpolated peak) gradient magnitude. By way of example, in FIG. 52A, above the upper gradient magnitude of 0.85, there is one pixel, whereas above the lower gradient magnitude of 0.3 there are 5 pixels, giving a difference of 4 pixels and a ratio of 1 to 5. For FIG. 52B, on the other hand, 3 pixels are above the upper gradient magnitude and 5 pixels above the lower gradient magnitude, giving a difference of only 2 and a ratio of only 1 to 1.7. A template may be specified for a difference to lie between 3.5 and 4.5 pixels, or/and for a ratio to lie 1 to 4 and 1 to 6, outside of which an edge associated with the peak may be rejected or de-emphasized. Thus, in this example, the edge associated with the gradient peaking in FIG. 52B is rejected or de-emphasized.

There are other ways to specify a template for a peaking of a signal that one skilled in the art can readily appreciate and/or find.

A different template may be specified for each different width at a certain normalized gradient magnitude. For example, a peaking having a width of 6 at a normalized gradient magnitude at 0.5 may use a different template than another having a width of 3.

The above detection of spurious edges and solution for spurious edges may be performed in the Edge Detection & Width Measurement Unit 206.

Edge Corruption/Partial Corruption

Edges may be corrupted in one of several ways. FIGS. 51B, 52B and 53A-53B illustrate various corruptions of edge gradient profiles.

Unlike a corrupted edge, an uncorrupted edge under different degrees of focusing or defocusing has a gradient profile that exhibits a symmetric shape about a peak. At each degree of defocusing, the gradient profile matches a given symmetric shape. FIG. 51A illustrates a pair of symmetric gradient profiles that has the same degree of defocusing but opposite signs of gradients. This given symmetric shape is a function of the focusing lens, the size of the aperture through which light from the scene is received, and how far the pixel array is away from the focal plane on which light from the subject is focused.

Figure 53A:
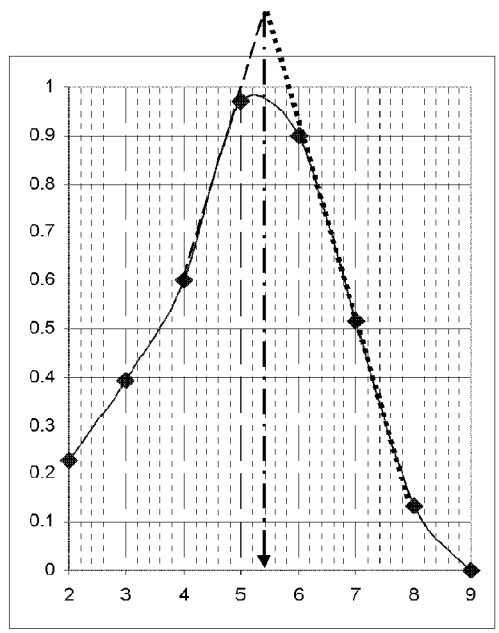
FIGS. 53A to 53D illustrate four different asymmetric, partially corrupted gradient profiles and their peak interpolation using intersection of extrapolated steepest slopes.
Figure 53B:
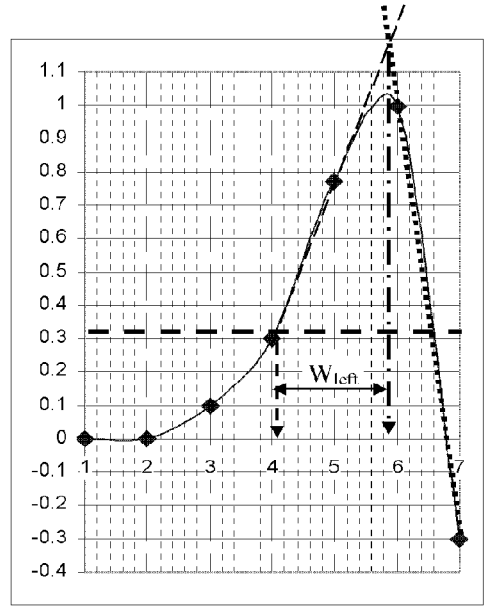
Figure 53C:
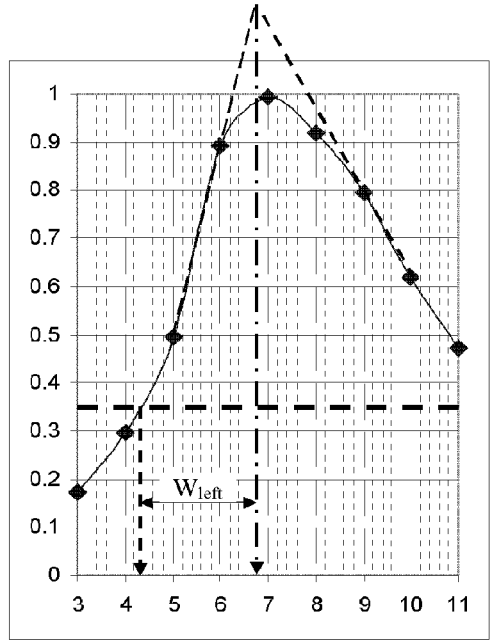

An edge may be partially corrupted, such as being corrupted on one side but not the other. FIG. 53B illustrates a gradient profile that is normal on the left side but falls off like a cliff on the right side. The "cliff" on the right side indicates that the right side is corrupted. FIG. 53C illustrates a gradient profile that is normal on the left side but swells on the right side. The "swell" (or "shoulder") on the right side indicates that the right side is corrupted. Another indication that the right side is corrupted is that the right side is asymmetrical with respect to the left side and is far wider.

An edge may be corrupted or spurious on both sides in such a way that neither side has a gradient profile that matches any genuine edge gradient profile across a boundary between two regions of two distinct colors. FIGS. 57A and 57B illustrate in solid curves two gradient profiles that are corrupted on both sides against normal gradient profiles in dashed curves. In FIG. 57B, the gradient profile in solid curve has a "swell" (i.e. "shoulder") on the left and a "cliff" on the right. In FIG. 57A, the gradient profile in solid curve has "swells" on both sides.

Solution Step for Corruption/Partial Corruption—Detection

A BROAD CLASS of approaches for detecting a corruption to the edge gradient profile is to detect a presence of an adjacent edge that is too near to the edge being examined.

One side of an edge can be corrupted if another adjacent edge that has gradients of the opposite sign is too near. The corruption to the side typically appears as a "cliff" in the gradient profile. As shown in FIG. 51B, relative the edge that includes the gradient 3222, which is above threshold 3242, the next gradient 3232 has the opposite sign and is large enough to cross the negative threshold 3252. The pair of gradients 3222 and 3232 thus forms a "cliff".

In a first method, the slope of zero crossing on one side of the gradient profile is compared with a threshold.

In the same FIG. 51B, the zero crossing slope of the gradient profile from gradient 3222 to gradient 3242 is 0.9. By requiring the zero crossing slope to be less than a zero crossing slope threshold, e.g. 0.2, the "cliff" can be detected when the threshold is exceeded. The zero crossing slope may be calculated between a pair of consecutive adjacent gradients that have opposite signs (e.g gradients 3222 and 3242) and that are adjacent to the side of the edge, and the gradient nearer to the side (e.g. gradient 3222) may or may not be part of the edge being examined (e.g. the group of four consecutive gradients above threshold 3242 in FIG. 51B). In the example shown in FIG. 51A, on the other hand, it is clear that the zero-crossing slope is zero and any zero crossing does not involve a gradient within the edge that consist of gradients above the threshold 3240 shown.

In a second method, the presence of a gradient that has the opposite sign, has a magnitude larger than a predetermined threshold and is within a predetermined distance from the edge is detected. The predetermined threshold may be a function of the edge width of the edge being examined. As shown in FIG. 51B, relative to the edge that includes the gradient 3222, which is above threshold 3242, the next gradient 3232 has the opposite sign and is large enough to cross the negative threshold 3252. The pair of gradients 3222 and 3232 thus forms a "cliff". By requiring that gradients 3222 and 3232 must exceed a given horizontal spacing threshold, e.g. 1.5, this "cliff" is detected when this requirement is not met. For FIG. 51A, on the other hand, this requirement is amply met by gradients 3220 and 3230. Although in FIGS. 51A and 51B the negative thresholds 3250 and 3252, respectively, may be seen as the thresholds for qualifying gradients to belong to the negative edge, it need not be so. The predetermined threshold for finding the gradient of the opposite sign may be the same or may be different from the threshold for qualifying gradients to belong to edges of the opposite polarity. Likewise, positive thresholds 3240 and 3242 need not be the thresholds used for finding the location on the slope of the edge to measure the distance from. For example, although the qualifying threshold for including/excluding gradients to/from a positive edge may be one-third (⅓) of the peak gradient, the threshold for find the location on the slope to measure distance from may be 50% of the peak gradient; alternately, it may be 20%.

In a third method, the peak-to-peak spacing ($S_{pp}$) between a peak of the edge and a peak of the adjacent edge that has gradients of the opposite sign is compared with a predetermined spacing threshold. The predetermined spacing threshold may be a function of the edge width of the edge being examined, or a function of the edge widths of both edges. Again referring to FIG. 51B, the spacing between the peaks 3212 and 3262 is 3. By requiring that peaks 3212 and 3262 must exceed a given horizontal spacing threshold, e.g. 4 for this pair of edges, this "cliff" between the peaks is detected when this requirement is not met. In FIG. 51A, on the other hand, the peak-to-peak spacing ($S_{pp}$) is seen to be approximately 12, far exceeding the horizontal spacing threshold, hence no "cliff" is detected.

In a fourth method, a second order derivative of the edge and on the side that is being examined is calculated and compared with a curvature threshold. The second order derivative may be calculated for the outermost pixel of the side of the edge. For example, in FIG. 51A, gradient 3220 corresponds to the rightmost pixel of the edge on the left. Alternatively, it may be calculated for a particular gradient level that is a predetermined fraction of the peak gradient, e.g. 50% or 25%. The second order derivative may be calculated for the nearest gradient. The fraction may be a function of edge width. The second order derivative may be calculated with one of a number of methods. One such method is the use of Laplacian operator. Given three consecutive gradient values $y_{i-1}$, $y_i$ and $y_{i+1}$, the Laplacian operator calculates the second order derivative for position i as $(y_i - 0.5*(y_{i+1}+y_{i-1}))$. For example, in FIG. 51A, at gradient 3220, the second order derivative given by the Laplacian operator is approximately $(0.4-0.5*(0.8+0.15))=-0.075$, indicating a concave profile as expected of an uncorrupted side. In FIG. 51B, on the other hand, at gradient 3222, the second order derivative given by the Laplacian operator is approximately $(0.5-0.5*(1.0+-0.46)=+0.23$, indicating a convex profile, which is a sign of a "cliff". By requiring that the second order derivative must not exceed a curvature threshold for a positive-signed edge, since such event indicates too much convexity in the gradient profile, the convexity between peak 3212 and peak 3262 in FIG. 51B can be detected and thus found to fail the requirement, causing a declaration of "cliff". As for a negative-signed edge, the same procedure applies after inverting the sign of the gradients. Other methods that produce results that are proportional to the change of the slope of the gradient profile are also applicable. For example, a cubic interpolation may be applied to interpolate among pixels on the side of the edge (and even one or more pixels beyond the edge), followed by calculating the second order derivative at the particular gradient level from the cubic spline polynomial.

ANOTHER BROAD CLASS of approaches to detect a corruption whether a "cliff" or a "shoulder" is to test the gradient profile against one or more shape tests. The shape test can be a test for the gradient profile to both sides of a peak of the gradient profile. Alternatively, the shape test can test gradients of the gradient profile to each side of the peak separately from an opposite side. The shape test may be any test that measures a departure from one or more given genuine gradient profiles. The departure can be defined in terms of one or more of various properties associated with gradients within the gradient profile.

A shape test may measure a second order derivative at a given level of gradient that is a predetermined fraction of the peak gradient, for instance 50%.

A shape test may measure a ratio or a difference between a first width and a second width. The first width is measured from the peak of the edge gradient profile to the location where the interpolated gradient profile crosses a first predetermined threshold. The second width is measured from the peak to the location where the interpolated gradient profile crosses a second predetermined threshold. Both the first and second thresholds may be given as predetermined fractions of the maximum gradient.

A shape test may measure a ratio or a difference between a first gradient magnitude and a second gradient magnitude. The first and second gradient magnitudes are measured at the interpolated gradient profile that at a first and second distances from the peak, respectively. The first and second distances may be given as predetermined fractions of the edge width of the gradient profile measured at a given gradient threshold level. Alternatively, they may be given as predetermined fractions of the width of the side being examined, where the width is measured from the peak to the interpolated gradient profile at a given gradient threshold level.

A shape test may compare the gradient profile with one or more normal gradient profiles and evaluate the difference between the gradient profile being examined and the normal gradient profiles. For example, FIG. 57A illustrates a corrupted gradient profile that has "swell" on both sides, alongside a normal gradient profile fitted to the width at the gradient level of 50% of peak gradient. FIG. 57B illustrates a corrupted gradient profile that has a "swell" on the left side and a "cliff" on the right side, alongside a normal gradient profile fitted to the width at the gradient level of 50% of peak gradient and shifted to align peak-to-peak with the corrupted gradient. The difference between the gradient profile being examined and the normal profile may be evaluated as a sum of the squares of differences at each pixel location across a plurality of pixels in the edge. Any other known method of evaluating the difference between two curves may be used. The final evaluation result may be generated finding the minimum such difference among a number of normal gradient profiles used for the comparison. These normal gradient profiles may or may not be required to fit the edge width at any particular gradient level. Data that define the normal gradient profiles may be stored in a nonvolatile memory.

Final Solution to Edge Corruption or Partial Corruption

If the edge is corrupted on both sides, it should either be prevented entirely from contributing to the focus signal calculation or receive attenuation in such contribution, in order to prevent a corruption of the focus signal.

Similarly, if the edge is partially corrupted, the edge may be rejected or its contribution attenuated.

For the partially corrupted edge, however, a better alternative is to reject or attenuate a contribution from the side that is corrupted and to rely entirely on or increase the contribution from the other side that is not corrupted. By way of example, the final edge width may be assigned the value of twice the width of the side that is not corrupted instead of the sum of the widths under both the corrupted and uncorrupted sides. In general, the final edge width receives from the width of uncorrupted side a contribution more than one time, preferably two times, and from the width of the corrupted side a contribution less than one time, preferably zero.

FIG. 53B illustrates this procedure using a gradient profile that has a "cliff" on the right side but a normal profile on the left side. A threshold of 0.3 times the peak gradient amplitude is used in FIG. 53B to measure the width of the left side, $W_{left}$, which is 1.8. Since the right side is declared a "cliff", its gradient profile is corrupted. The final edge width is given as twice the width of the left side, i.e. 3.6.

FIG. 53C illustrates this procedure using a gradient profile that has a "shoulder" on the right side but on the left side has a normal gradient profile. A threshold of 0.35 times the peak gradient amplitude is used in FIG. 53C to measure the width of the left side, $W_{left}$, which is 2.5. Since the right side is declared a "shoulder", its gradient profile is corrupted. The final edge width is given as twice the width of the left side, i.e. 5.0.

Note that, in FIG. 53C, the right side can be declared as corrupted, even if it passes one or more shape tests, by determining that the right side has a width that exceeds the width of the left side by a predetermined amount (e.g. 1.0) and that the left side is uncorrupted. In general, if the edge gradient profile is asymmetric (such as one side being wider than the other side by a given amount or more) and both sides pass one or more shape tests, then the wider side is declared corrupt.

The term "peak" as used in the above description may be a gradient that has the largest gradient magnitude among pixels across the gradient profile, or may be the peak of an interpolated gradient profile interpolated over a plurality of gradients in the edge ("interpolated peak").

The location referred to where a gradient threshold intersects a gradient profile may be a nearest larger gradient of a pixel within the edge or may be an intercept of the gradient threshold with an interpolated gradient profile interpolated over a plurality of gradients adjacent to the nearest larger gradient of a pixel within the edge.

Interpolation of Peak Location

Peak location may be interpolated to obtain higher precision for one or more of the above measurements, such as measuring the width of a side from the peak to an intercept on the interpolated gradient profile. In FIG. 53A, for example, it can be seen that a more precise location of the peak may be between location 5 and location 6, and more likely to be nearer to location 5 than location 6. In FIG. 53A, the intersection between the dashed line extrapolated from the left side of the gradient profile and the dotted line extrapolated from the right side appear to be a suitable estimate of the location of the peak. We refer to a peak found this way as "interpolated peak".

There are more than one method to estimate a location of the peak. Two methods are described below. One of ordinary skill in the art may happen upon other methods for estimating a location of the peak.

FIGS. 53A to 53D illustrate the first method for estimating a peak location for a gradient profile. FIGS. 55A to 55D illustrate details of the calculation.

Figure 53D:
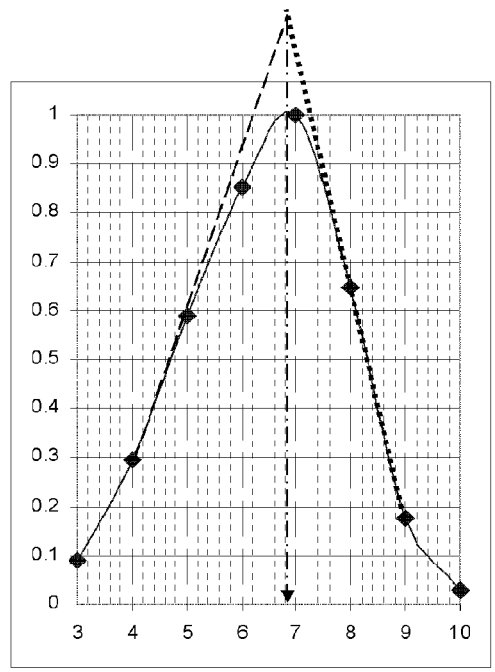

In the first method, the most positive slope and the most negative slope from both sides of the gradient profile are extrapolated to intersect each other. The horizontal location where the intersection occurs is the interpolated peak location. For example, in FIG. 53A, the intersection between the dashed line and the dotted line gives interpolated peak location of 5.4. In FIG. 53B, likewise the interpolated peak is seen to be approximately at location 5.8. Note that in FIG. 53B the steepest slope on the right of the gradient profile connects a gradient at pixel location 6, which is clearly within the edge being examined, and a gradient at pixel location 7, which is clearly outside the edge and in fact has the opposite sign. In similar manners, the interpolated peak locations in FIG. 53C and FIG. 53D are both found to be approximately 6.8.

For four different cases, FIGS. 55A to 55D illustrate details of the calculation under the first method for finding an interpolated peak location H from the gradient profile where four gradients A, B, D and E are given at four pixel locations. Gradients A and D belong to a pair of mutually adjacent pixels on the steeper side, and gradient D is closer to the peak. Likewise, gradients B and E belong to a pair of mutually adjacent pixels on the less steep side, and gradient E is closer to the peak. The calculation is derived from similarity of triangles. In each case, the horizontal distance of the peak location from the pixel location of gradient A, $|AH|=W_4(H_1+H_2/W_4)/(H_0+H_1)$, is expressed in terms of the distance between the pixel locations of the inner pair of gradients D and E ($W_5$), the distance between the pixel locations of the outer pair of gradients A and B ($W_4$), the difference in gradient levels between the gradients A and D of the pair of mutually adjacent pixels on the steeper side ($H_0$), the difference in gradient levels between the gradients B and E of the pair of mutually adjacent pixels on the less steep side ($H_1$), and the difference in gradient levels between the smaller gradient B on the less steep side and the smaller gradient A on the steeper side ($H_2$).

It is seen from the expression for $|AH|$ that if $H_0$ becomes larger, i.e. the steeper side becomes steeper, but all else are unchanged, then $|AH|$ becomes smaller, i.e. the peak location is pulled towards the steeper side. Vice versa, if $H_1$ becomes larger, i.e. the less steep side becomes steeper, but all else are unchanged, then |AH| becomes larger (because $H_2/W_4<H_0$ makes the numerator grows faster percentage-wise than the denominator in $(H_1+H_2/W_4)/(H_1+H_0)$), i.e. the peak location is pulled towards the less steep side.

The first method is not limited to using only steepest slopes that are found from linear interpolation between adjacent gradients as shown in FIGS. 53A to 53D and FIGS. 55A to 55D. The steepest slopes can be found from a higher-order interpolation, such as interpolation using a polynomial of degree two or higher, for instance cubic interpolation.

FIGS. 54A to 54D illustrate a second method for estimating a peak location for a gradient profile. FIG. 56 illustrates details of the calculation.

Figure 54A:
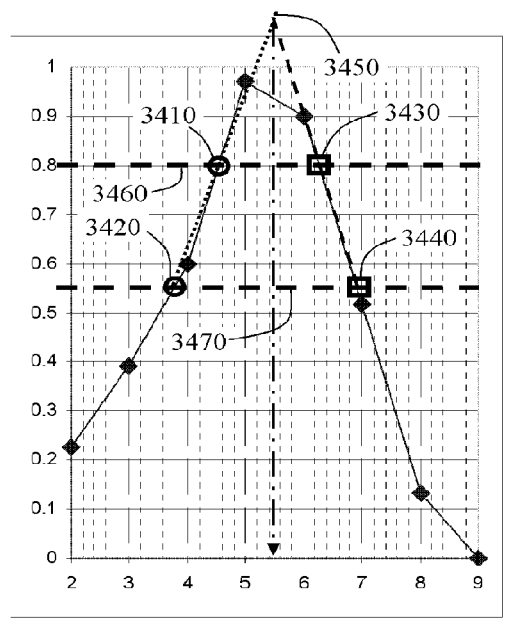
FIGS. 54A to 54D illustrate the same four different asymmetric partially corrupted gradient profiles and their peak interpolation using intersection of slopes drawn through horizontal intercepts of two different gradient levels with the interpolated gradient profile.
Figure 54B:
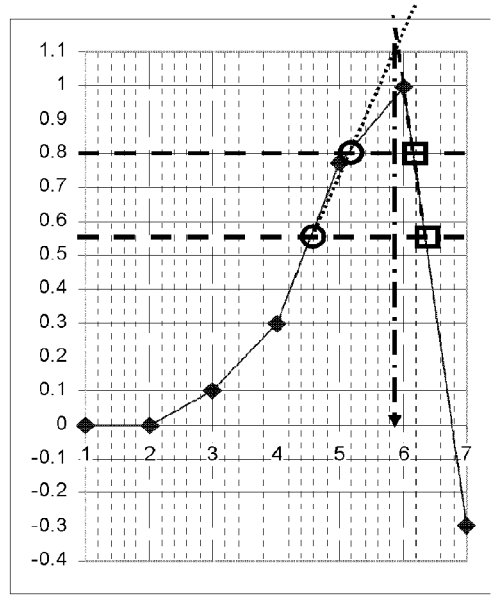
Figure 54C:
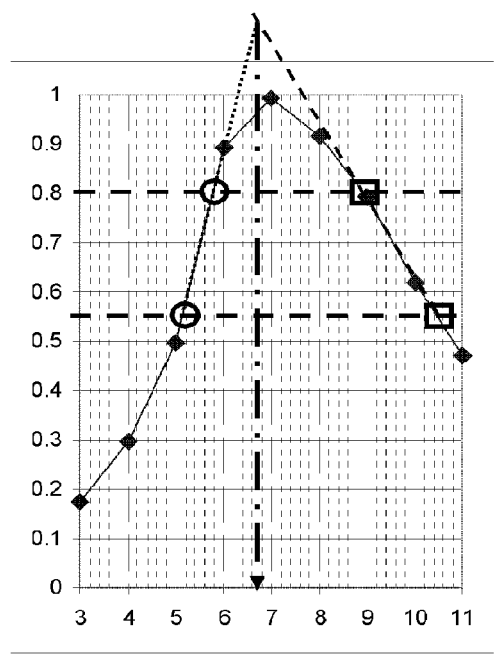
Figure 54D:
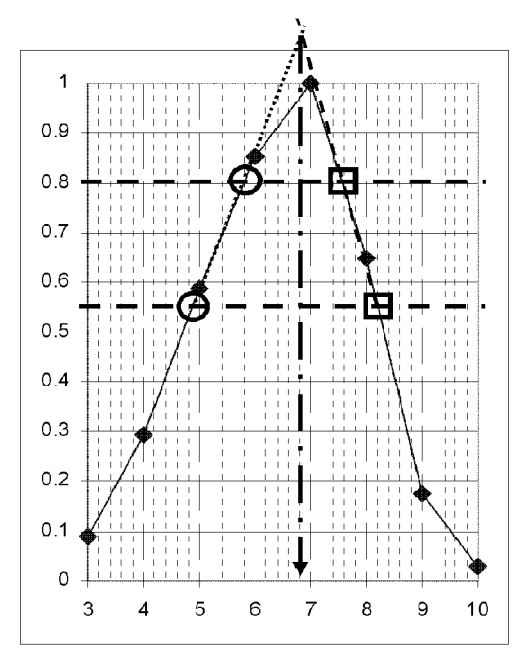
Figure 55A:
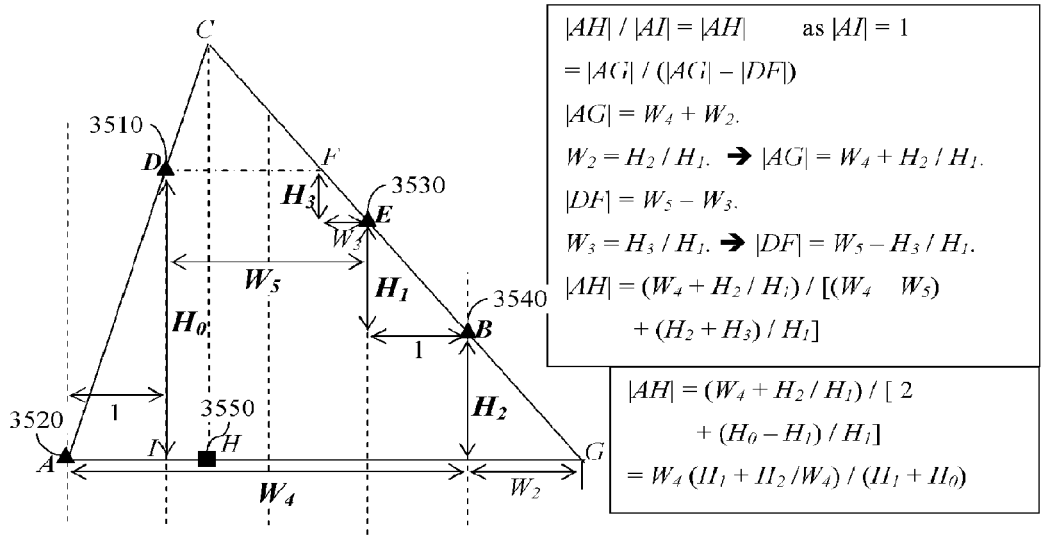
FIGS. 55A to 55D illustrate details of calculation for the peak interpolation method used on FIGS. 53A to 53D.
Figure 55B:
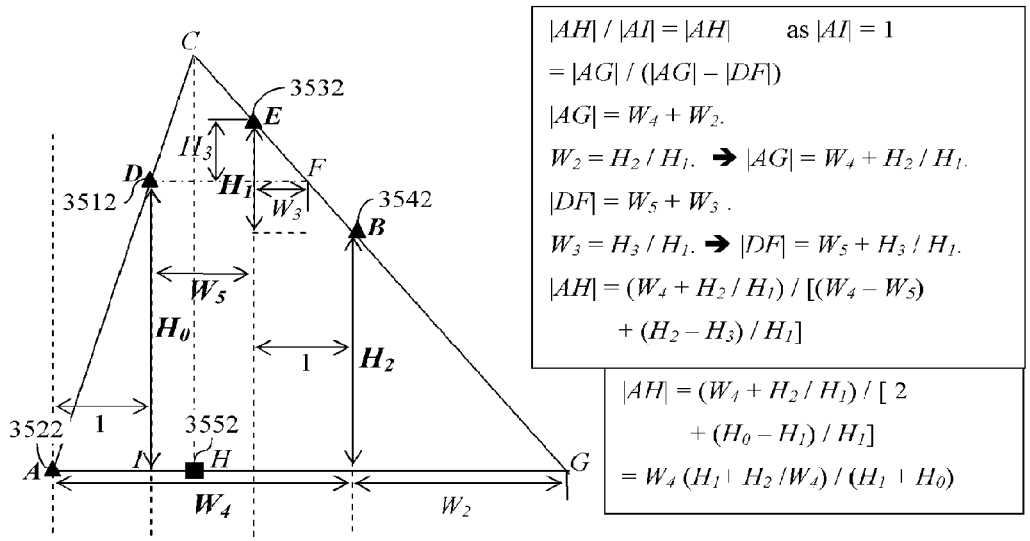
Figure 55C:
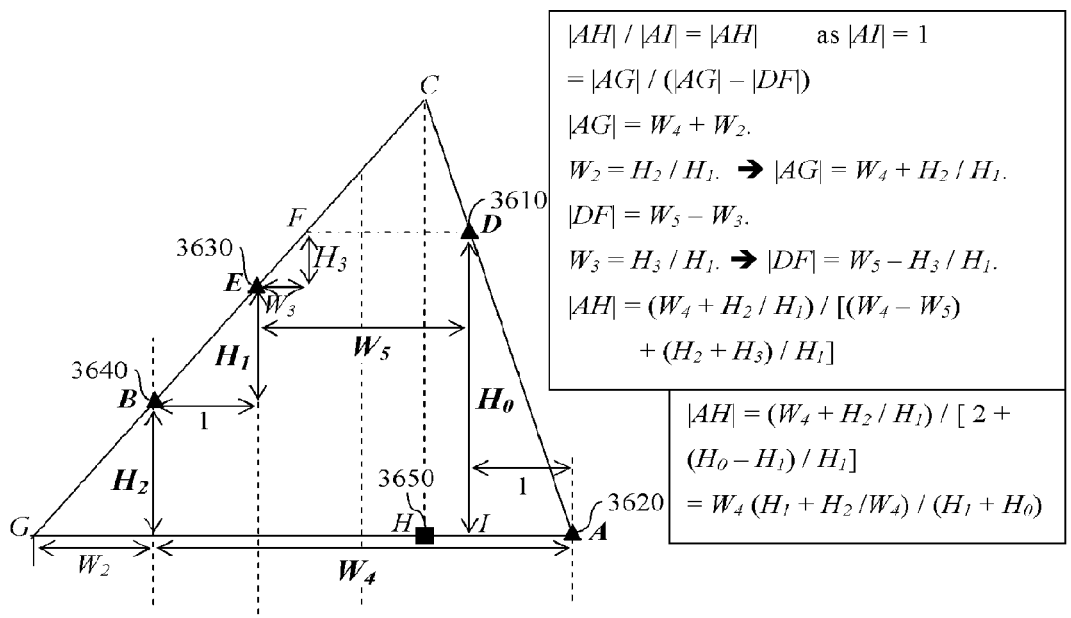
Figure 55D:
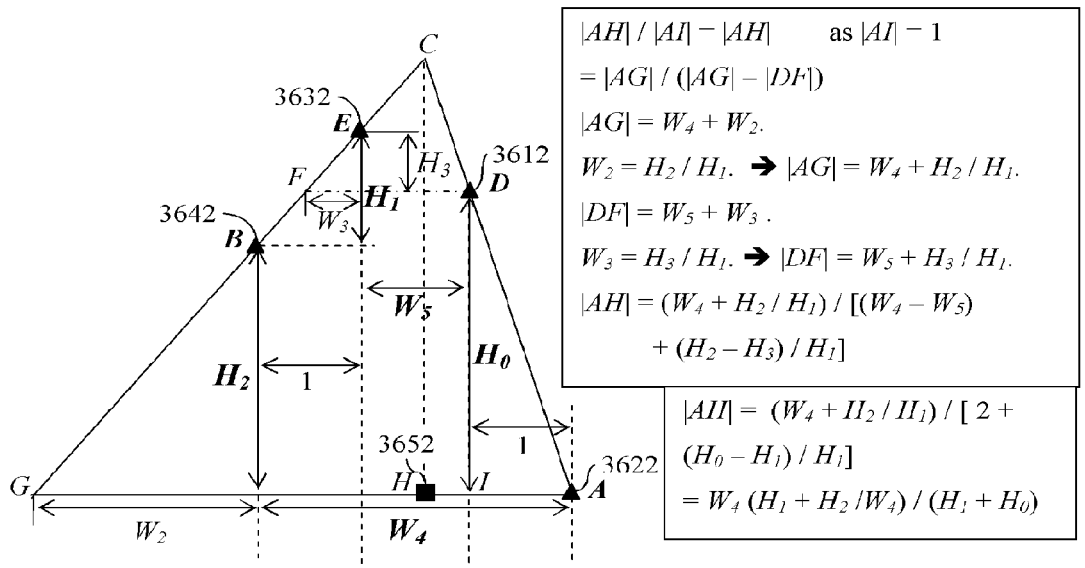

In the second method, two gradient levels are given. The gradient levels may be given as predetermine fractions of the peak gradients among the pixels across the gradient profile. The fractions may be a function of the edge width. For each gradient level, an intercept with the gradient profile at each side is found, giving a pair of intercept points on each side. A slope is extrapolated from each pair of intercept points. The intersection between the two slopes, one from each side, thus gives the interpolated pixel location of the interpolated peak. Referring to FIG. 54A, the gradient levels 3460 and 3470 intersect the linearly interpolated gradient profile (connected solid line segments) at intercept points 3410, 3420, 3430, and 3440. A slope on the left drawn in a dotted line through intercept points 3410, 3420 and another slope on the right drawn in a dashed line through intercept points 3430, 3440 mutually intersect at intersection 3450. The pixel location of intersection 3450 is approximately 5.4. FIGS. 54B, 54C and 54D demonstrate similar constructions for finding the peak locations, giving approximately 5.8, 6.7 and 6.8, respectively.

Although linear interpolation is used across FIGS. 54A to 54D to form the interpolated gradient profile, a different interpolation may be used, such as polynomial interpolation with a polynomial of degree two or higher, for instance cubic interpolation.

FIG. 56 illustrates details of the calculation under the second method for finding the pixel location H of an interpolated peak from the interpolated gradient profile where four gradients A, B, D and E are given at four locations. Gradients A and D are on the left side, and gradient D is the larger. Gradients B and E are on the right side, and gradient E is the larger. Gradients A and B are on the same smaller gradient level. Gradients D and E are on the same larger gradient level. The horizontal distance of the interpolated peak from gradient D ($W_{h1}$) is given in terms of the horizontal distance between the smaller gradients ($W_1$), the horizontal distance between the larger gradients ($W_2$) and the horizontal distance between the pair of gradient on the left ($W_3$)

As seen in the expression for $W_{h1}$ shown in FIG. 56, $W_{h1}$ is directly proportional to $W_{h3}$. Thus, the smaller $W_{h3}$ is, the smaller $W_{h1}$ becomes. In other words, if the left side becomes steeper whereas the right side does not change, then the interpolated peak is pulled more to the left. On the other hand, if the right side becomes steeper whereas the right side does not change and $W_2$ remains constant, then $W_1$ increases and $(W_2-W_1)$ decreases, causing $W_{h1}$ to increase, i.e. the interpolated peak is pushed more to the right.

Thus both the first and second methods are seen to have a common property that if a side becomes steeper then the interpolated peak location is pulled closer towards the side.

The above peak interpolation, corruption detection and solution for corrupted/partially corrupted edges may be performed in the Edge Detection & Width Measurement Unit 206.

Length Filter

Below describes a function of length filter 212. Broadly defined, length filter 212 creates a preference for edges that each connects to one or more edges of a similar orientation. A group of edges that are similarly oriented and mutually connected within the group ("concatenated edge") is less likely to be due to noise, compared with an isolated edge that does not touch any other edge of similar orientation. The more edges of a similar orientation thus concatenated together, the lesser the chance of them being due to noise. The probability of the group being due to noise falls off exponentially as the number of edges within the group increases, and far faster than linearly. This property can be harnessed to reject noise, especially under dim-lit or short-exposure situations where the signal-to-noise ratio is weak, e.g. less than 10, within the image or within the region of interest. The preference may be implemented in any reasonable method to express such preference. The several ways described below are merely examples.

A first method is to eliminate edges that belong to vertical/horizontal concatenated edges having lengths lesser than a concatenated length threshold. The concatenated length threshold may be larger when the region of interest is dimmer. For example, the concatenated length threshold may start as small as 2, but increases to 8 as a signal-to-noise ratio within the region of interest drops to 5. The concatenated length threshold may be provided by the processor 112, 112', 112", for example through a 'length command' signal, shown in FIG. 3, as part of signals 132. Alternately, the threshold may be calculated according to a formula on the focus signal generator.

A second method is to provide a length-weight in the length filter 212 for each edge and apply the length-weight to a calculation of focus signal in the focus signal calculator 210. An edge that is part of a longer concatenated edge receives a larger weight than one that is part of a shorter concatenated edge. For example, the length-weight may be a square of the length of the concatenated edge. Thus, a contribution of each edge towards the focus signal may be multiplied by a factor A/B before summing all contributions to form the focus signal, where B is a sum of the length-weights of all edges that enter the focus signal calculation, and A is a length-weight of the edge. Likewise, the edge-width histogram, which may be output as part of signals 134, may have edges that are members of longer concatenated edges contribute more to the bins corresponding to their respective edge width, thus preferred, instead of all edges contribute the same amount, e.g. +1. Thus, for example, each edge may contribute A/C, where C is an average value of A across the edges. Similarly, the narrow-edge count may have edges that are members to longer concatenated edges contribute more. Thus, for example, the contribution from each edge may be multiplied by A/D, where D is an average of A among edges that are counted in the narrow-edge count.

A group of N vertical (horizontal) edges where, with the exception of the top (leftmost) and the bottom (rightmost) ones, each edge touches two other vertical (horizontal) edges, one above (to the left of) itself, the other below (to the right of) itself, is a vertical (horizontal) concatenated edge of length N. The top (leftmost) edge needs only touch one edge below (to the right of) itself. The bottom (rightmost) edge needs only touch one edge above (to the left of) itself.

FIG. 8 illustrates a vertical concatenated edge and its length. In FIG. 8, cells R2C3 and R2C4 form a first vertical edge, cells R3C3, R3C4, and R3C5 together form a second vertical edge, and cells R4C4 and R4C5 together form a third vertical edge. The first and the third vertical edges each touches only one other vertical edge, whereas the second vertical edge touches two other vertical edges. The first, second and third vertical edges together form a vertical concatenated edge having a length of 3.

In a situation (not shown) where a vertical (horizontal) concatenated edge has two or more branches, i.e. having two edges in a row (column), the length may be defined as the total number of edges within the concatenated edge. Alternately, the length may be defined as the vertical (horizontal) distance from a topmost (leftmost) edge therein to a bottommost (rightmost) edge therein plus one.

There are other possible ways to define a concatenated length other than the above proposals. For example, a definition of a length for a concatenated edge shall have a property that the length is proportional to the number of member edges within the concatenated edge at least up to three. This is to be consistent with the previously stated reasoning that more edges being mutually connected by touching each other exponentially reduces a probability that the concatenated edge is caused by a noise, and as such the length should express a proportionality to the number of member edges within the concatenated edge up to a reasonable number that sufficiently enhances a confidence in the concatenated edge beyond that for a single member. The length filter 212 may de-emphasize or eliminate and thus, broadly speaking, discriminate against an edge having a concatenated length of one. The length filter 212 may discriminate against an edge having a concatenated length of two. The length filter 212 may discriminate against an edge having a concatenated length of three, to further reduce an influence of noise. The length filter 212 may do any one of these actions under a command from the processor.

Although shown in FIG. 3 to immediately follow the Edge Detection & Width Measurement Unit 206, other arrangements are possible. For example, the Length Filter 212 may be inserted before the focus signal calculator 210 and after the exclusion switch 230, wherein the edges processed by the Length Filter 212 are those that pass through either or both of the width filter 209 and exclusion filter 207 depending on the 'fine' and 'exclude' command signals.

In an alternate embodiment of a focus signal generator, the fine switch 220 may be removed so that the focus signal calculation unit 210 receives a first set of data not filtered by the width filter 209 and a second set filtered, and for each calculates a different focus signal, gross focus signal for the former, fine focus signal for the latter, and outputs both to the processor 112, 112'.

Width Filter

Figure 11:
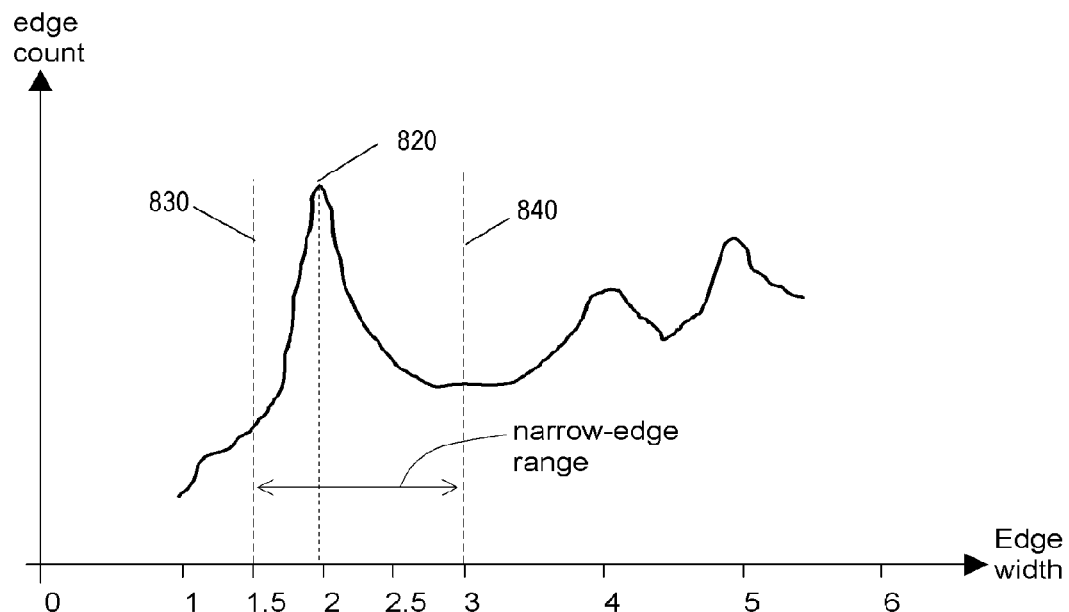
FIG. 11 is a histogram of edge widths illustrating a range of edge widths for calculating a fine focus signal.

Refer next to FIG. 3 to understand an operation of the Width Filter 209. FIG. 11 plots a histogram of edge widths, i.e. a graph of edge counts against edge widths. At edge width of 2, i.e. the aforementioned sharp_edge_width, there is a peak, indicating a presence of sharp edges in the image. At edge widths of 4 and 5, however, there are peaks, indicating edges that are blurred, possibly due to the corresponding imaged objects being out of focus, being at a different distance away from the focus lens than those objects that give rise to the sharp edges. For calculating a focus signal, edges whose widths lie outside a predetermined range ("narrow-edge range") may be de-emphasized using the Width Filter 209. The Width Filter 209 may create a lesser weight for edge widths outside the narrow-edge range for use in the focus signal calculation. For example, edge widths may be assigned weight of 1.0, whereas edges widths more than +1 to the right of the upper limit 840 assigned a weight of 0, and edge widths in between assigned weights between 0 and 1.0, falling monotonically with edge width. Alternately, the Width Filter 209 may prevent such edges from entering the focus signal calculation altogether. Appropriate upper and lower limits 830, 840 depend on several factors, including crosstalk in the pixel array 108, the interpolation method used to generate missing colors for the image received by the focus signal generator 120, and the filter coefficients used in the lowpass filter employed in the Edge Detection and Width Measurement Unit 206. Appropriate upper and lower limits 830, 840 and the parameter sharp_edge_width may be determined for the image pickup apparatus 102, 102' by capturing images of various degrees of sharpness and inspecting the edge width histograms. For example, if a sharp image has a peak at edge width of 2, an appropriate lower and upper limit may be 1.5 and 3, respectively, and the sharp_edge_width may be set to 2.0. The lower and upper limits and sharp_edge_width may be determined as above and provided to the focus signal generator 120, 120', 120" by the processor 112, 112". When 'fine command' is ON, the fine focus signal thus calculated de-emphasizes edge widths outside the narrow-edge range.

In addition, the Width Filter 209 may calculate a total count of the edges whose edge widths fall within the narrow-edge range and output as part of output signals 134. Narrow-Edge Count may be input to and used by the focus system controller (processor 112) to detect a presence of sharp image and/or for initiating tracking.

Focus Signal

Referring next to the focus signal calculator 210 of FIG. 3, the focus signal calculator 210 receives edge widths and outputs a focus signal. The focus signal may be calculated as a weighted average of all the edge widths where the weights are the edge counts for each edge width, viz. focus signal=$\Sigma w_i e_i / \Sigma w_i$, where $e_i$ are the edge widths, $w_i$ are the weights, where here $w_i=c_i$, $c_i$ being the edge count at edge width $e_i$, i being a bin number of a histogram of edge widths. Alternately, the weight at each edge width may be the edge count for the edge width multiplied by the edge width itself, i.e. $w_i=c_i e_i$. In addition, preferences from the Width Filter 209 that are expressed in terms of weights may be further multiplied to each edge width. For example, for weights $\Omega_i$ produced by the Width Filter 209, $\Sigma \Omega_i=1$, focus signal may be calculated as $\Sigma \Omega_i w_i e_i / \Sigma \Omega_i w_i$. If control signal 'fine' is ON and 'exclude' is OFF, the focus signal would be a value very close to the sharp edge width of 2.0 for the example shown in FIG. 11, indicating that among object details within the focus distance range that would produce edge widths between 2.0 and 3.0, most are actually in sharp focus. If control signal 'fine' is OFF and 'exclude' is OFF, the focus signal may be a value close to 5.0, indicating that there are substantial details of the image that are out of focus. Turning ON the fine switch 220 allows the focus signal to respond more to objects slightly blurred while less to those that are completely blurred. When the fine switch 220 is ON, we shall refer to the focus signal as a fine focus signal, whereas when the fine switch 220 is OFF, a gross focus signal. As aforementioned, the emphasis expressed by the Length Filter 212 may be incorporated into the focus signal in one of several ways, such as eliminating an edge that is de-emphasized from entering the focus signal calculation, or reducing a weight of the edge's contribution towards a count $e_i$ of a corresponding edge width bin.

Figure 15:
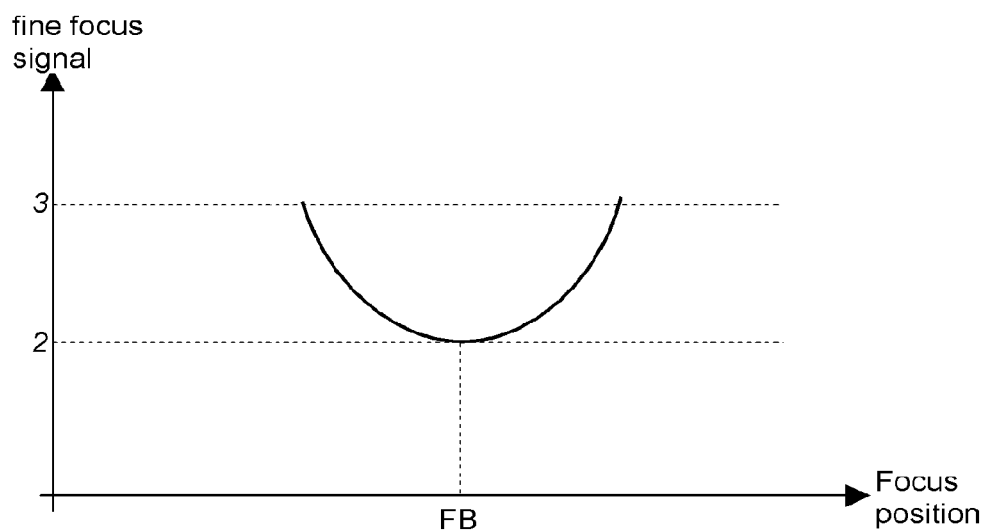
FIG. 15 is a graph illustrating a variation of a fine focus signal across a range of focus positions.

FIG. 15 sketches a response of the fine focus signal to an adjustment of the focus position in the vicinity of where an object is in sharp focus. The fine focus signal reaches a minimum value, approximately at sharp_edge_width, where the focus position brings an image into sharp focus, and increases if otherwise. The fine focus signal may be used for tracking objects already in-focus or very nearly so. For moving objects, the fine focus signal allows the focus control system to keep the objects in sharp focus even if the focus distance continues to change. Fine focus signal may also be used to acquire a sharp focus ("acquisition") of an object that is not yet in sharp focus but close enough such that the object gives rise to edges whose widths fall within the narrow-edge range. Since the edge width histogram exhibits a peak at the edge width corresponding to the object away from the sharp_edge width, resulting in the fine focus signal being larger than the sharp_edge_width, the focus control system may respond by adjusting the focus position to bring the fine focus signal value towards the sharp_edge_width, thus centering the peak of edge width due to the object at the edge width value equal to sharp_edge_width.

Basic Use

FIGS. 12-16 illustrate how the narrow-edge count, gross focus signal, and fine focus signal may be used to perform focus control to achieve sharp images.

Figure 12:
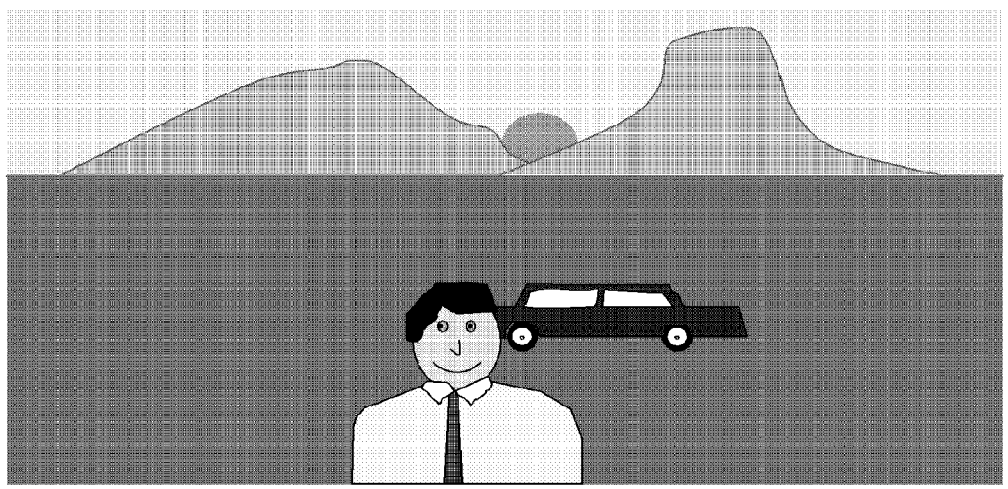
FIG. 12 is an illustration of a scene.

FIG. 12 illustrates an outdoor scene having 3 groups of objects at different focus distances: "person" in the foreground, "mountain, sun, and horizon" in the background, and "car" in the between.

Figure 13:
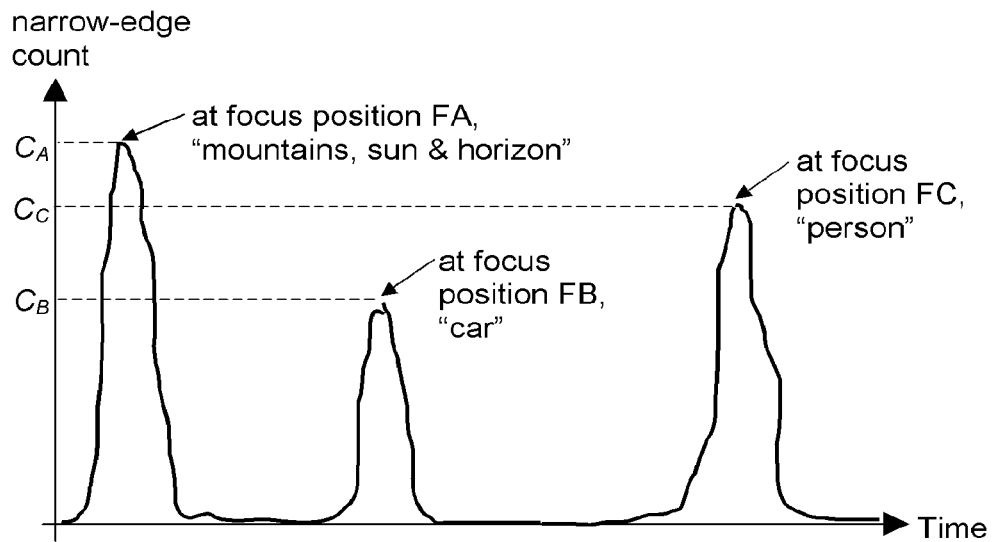
FIG. 13 is a graph illustrating a variation of a narrow-edge count during a focus scan of the scene of FIG. 12.

FIG. 13 is an illustration of the narrow-edge count plotted against time when the focus position of the focus lens 104 sweeps from far to near for the scene illustrated in FIG. 12. The narrow-edge count peaks when the focus position brings an object into a sharp image on the pixel array 108. Thus the narrow-edge count plot exhibits 3 peaks, one each for "mountain, sun, and horizon", "car", and "person", in this order, during the sweep.

Figure 14:
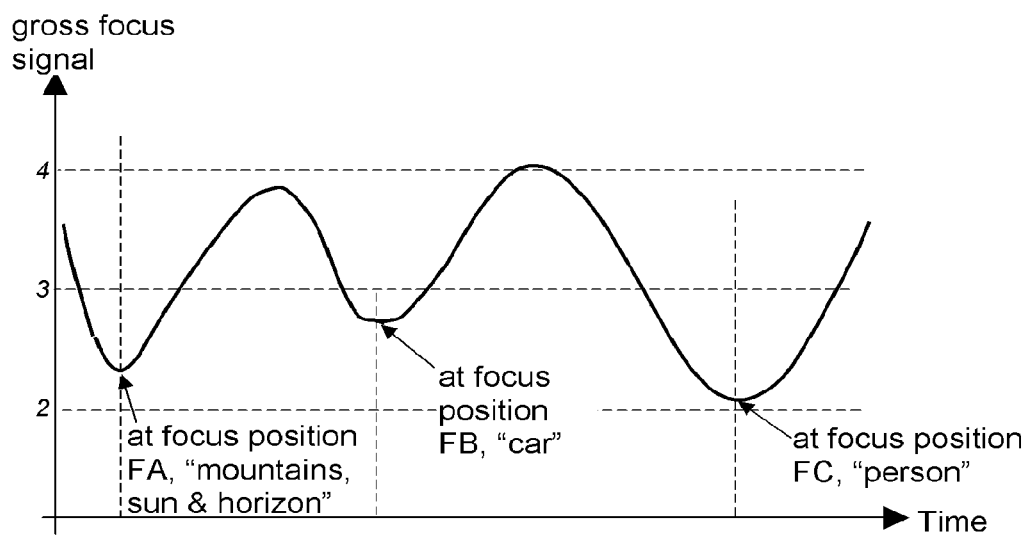
FIG. 14 is a graph illustrating a variation of a gross focus signal during a focus scan of the scene of FIG. 12.

FIG. 14 shows the gross focus signal plotted against time. The gross focus signal exhibits a minimum when the focus position is near each of the 3 focus positions where the narrow-edge count peaks. However, at each minimum, the gross focus signal is not at the sharp edge width level, which is 2.0 in this example, due to bigger edge widths contributed by the other objects that are out-of-focus.

FIG. 15 illustrates the fine focus signal plotted against the focus position in the vicinity of the sharp focus position for "car" in the scene of FIG. 12. The fine focus signal achieves essentially the sharp edge width, which is 2 in this example, despite the presence of blurred objects ("person" and "mountains, sun, and horizon"). Referring to FIG. 11 again, where two peaks at widths of 4 and 5 are contributed by those two groups of blurred objects, this can be understood as the Width Filter 324 having reduced the weight or eliminated altogether the contributions from the edge widths to the right of upper-limit 840.

A focus control system may use the gross focus signal to search for the nearest sharp focus position in a search mode. It can move the focus position away from the current focus position to determine whether the gross focus signal increases or decreases. For example, if the gross focus signal increases (decreases) when the focus position moves inwards (outwards), there is a sharp focus position farther from the current focus position. The processor 112, 112', 112" can then provide a focus drive signal to move the focus lens 104 in the direction towards the adjacent sharp focus position.

A focus control system may use the fine focus signal to track an object already in sharp focus to maintain the corresponding image sharp (thus a "tracking mode") despite changes in the scene, movement of the object, or movement of the image pickup apparatus. When an object is in sharp focus, the fine focus signal level is stable despite such changes. Hence a change in the fine focus signal suggests a change in focus distance of the object from the image pickup apparatus. By "locking" the focus control system to a given fine focus signal level near the minimum, for example between 2.0 to 2.5 in this example, in particular 2.1, any shift in the fine focus signal level immediately informs the processor 112, 112', 112" of a change in the focus distance of the object. The processor 112, 112', 112" can then determine a direction and cause the focus lens 104 to move to bring the fine focus signal level back to the "locked" level. Thus the image pickup apparatus 102, 103, 103', 103" is able to track a moving object.

A focus control system, e.g. as implemented in algorithm in processor 112, 112', 112", may use narrow-edge count to trigger a change from a search mode to a tracking mode. In the tracking mode, the focus control system uses the fine focus signal to "lock" the object. Before the focus position is sufficiently near the sharp focus position for the object, the focus control system may use the gross focus signal to identify the direction to move and regulate the speed of movement of the lens. When a object is coming into sharp focus, narrow-edge count peaks sharply. The processor 112, 112', 112" may switch into the tracking mode and use the fine focus signal for focus position control upon detection of a sharp rise in the narrow-edge count or a peaking or both. A threshold, which may be different for each different sharp focus position, may be assigned to each group of objects found from an end-to-end focus position "scan", and subsequently when the narrow-edge count surpasses this threshold the corresponding group of objects is detected. For a stationary scene, e.g. for still image taking, an end-to-end focus position scan can return a list of maximum counts, one maximum count for each peaking of the narrow-edge count. A list of thresholds may be generated from the list of maximum counts, for example by taking 50% of the maximum counts.

Figure 16:
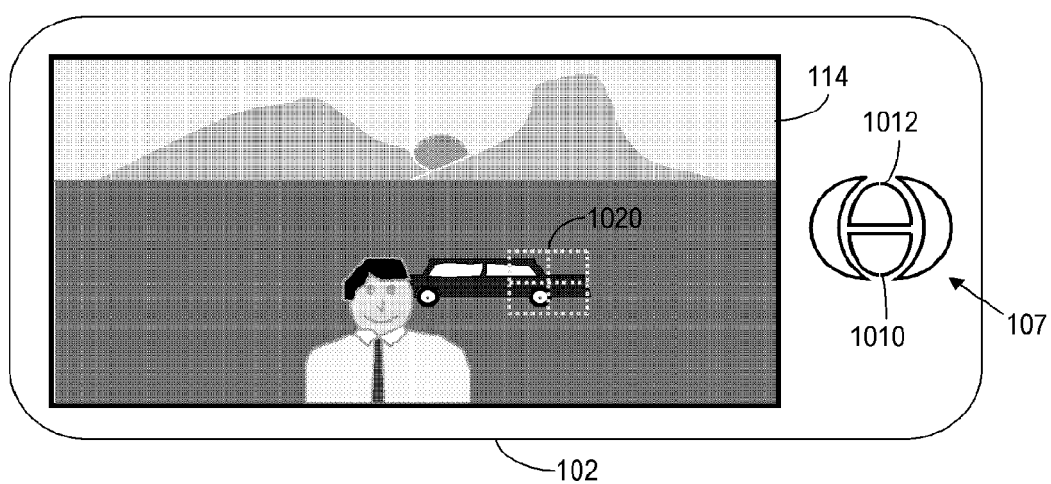
FIG. 16 is an illustration of an apparatus displaying multiple objects in a scene and a selection mark over one of the objects.

FIG. 16 illustrates an image pickup apparatus 102 having a display 114, an input device 107 comprising buttons, and selection marker 1920 highlighted in the display 114. A user can create, shape and maneuver the selection marker 1920 using input device 107. Although shown in this example to comprise buttons, input device 107 may comprise a touch-screen overlaying the display 114 to detect positions of touches or strokes on the display 114. Input device 107 and processor 112, 112', 112" or a separate dedicated controller (not shown) for the input device 107 may determine the selection region. The parameters for describing the selection region may be transmitted to the focus signal generator 120, 120', 120" over bus 132 (or internally within the processor 112 in the case where focus signal generator 120 is part of the processor 112). In response, the focus signal generator 120 may limit the focus signal calculation or the narrow-edge count or both to edges within the selection region described by said parameters or de-emphasize edges outside the selection region. Doing so can de-emphasize unintended objects from the focus signal and then even the gross focus signal will exhibit a single minimum and a minimum level within 1.0 or less of the sharp edge width.

Exclusion Filtering

Below describes exclusion filtering performed by exclusion filters 207, 910.

Broadly defined, given one or more image characteristics and one or more exclusion ranges defined for each characteristic, exclusion filtering creates a preference for edges that do not fall into any one exclusion range in any one characteristic.

The collection of image characteristics may be predetermined. The following is a non-exhaustive list: hue (FIG. 23), saturation, maximal luminance (FIG. 22), luminance change (FIG. 24), mean luminance, slant angle (FIGS. 6A-6D and 44), length of concatenated edge (FIGS. 8 and 43), and spacing to nearest edge.

A first embodiment of an exclusion filter is to eliminate edges that belong to any one exclusion range in any one characteristic given to the exclusion filter.

Figure 21:
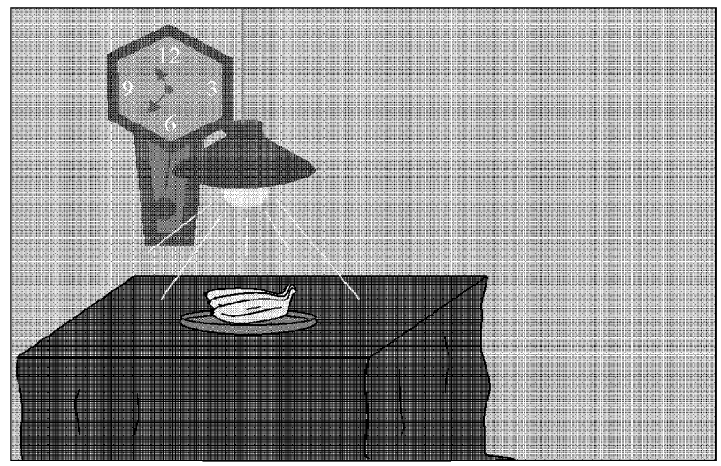
FIG. 21 is an illustration of a scene having edges at different focus distances each under a different illumination.
Figure 22:
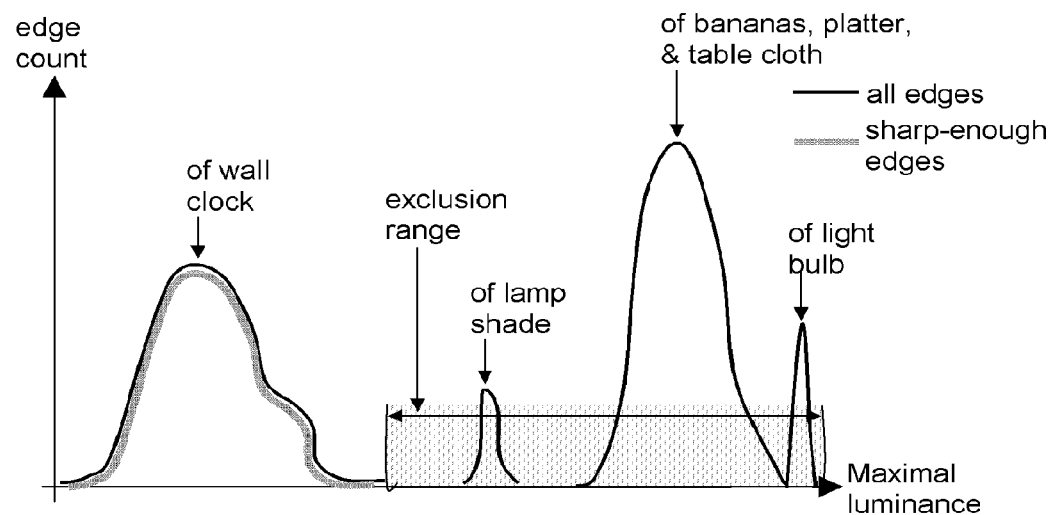
FIG. 22 is a first histogram of maximal luminance of edges and a second histogram for only sharp-enough edges within a region (wall clock) of FIG. 21.

FIG. 22 illustrates a use of maximal luminance as a characteristic for exclusion. FIG. 22 illustrates an all-edge and sharp-edge histograms for maximal luminance of an image captured of the scene illustrated in FIG. 21 with only the wall clock in sharp focus. Maximal luminance is the highest luminance value within an edge. FIG. 22 shows a histogram for sharp edges (associated with the wall clock in FIG. 21) and a histogram for all edges, associated with other objects (lamp shade, bananas, platter, table cloth, light bulb) in the image that are not in sharp focus as well as the wall clock. In FIG. 22, the wall clock occupies a lower range of maximal luminance than all other objects, which are brightly illuminated. An exclusion range (shown in FIG. 22) covering approximately the upper half of the maximal luminance range de-emphasizes or even excludes altogether most edges that are not in sharp focus.

Figure 23:
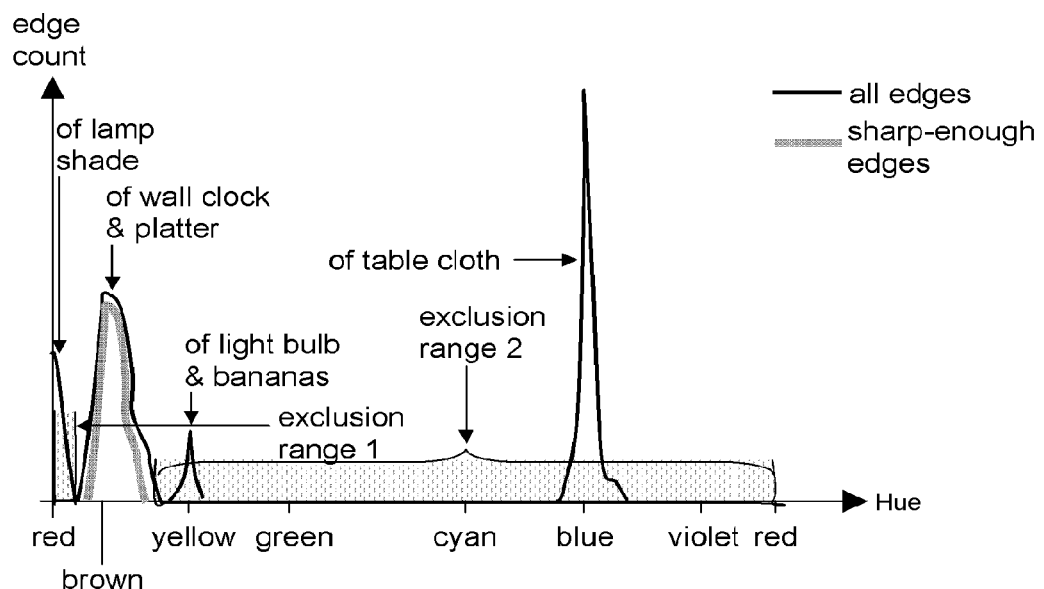
FIG. 23 is a first histogram of a hue of edges and a second histogram for only sharp-enough edges within a region (wall clock) of FIG. 21.

FIG. 23 illustrates a use of hue as a characteristic for exclusion. FIG. 23 shows a histogram for sharp edges (associated with wall clock in FIG. 21) and a histogram for all edges, associated with other objects in the image that are not in sharp focus as well as the wall clock. For this hue histogram, if both sides of an edge has the same hue value, the hue bin that contains the hue value gets a count contribution of +2 from this edge; whereas if each side has a different hue value, then each hue bin that contains one of the hues gets a count contribution of +1. In FIG. 23, the wall clock and the platter together occupy a small range of hue in the vicinity of a brown hue. Exclusion range 1 and exclusion range 2 (shown in FIG. 23) that together cover most of the rest of the hue range would exclude most edges that are not in sharp focus except those arising from the platter, which are not a major part of non-sharp edges. An edge would be de-emphasized or even excluded altogether by an exclusion filter operating by these two exclusion ranges if both hues on its two sides fall within any of these exclusion ranges.

Figure 24:
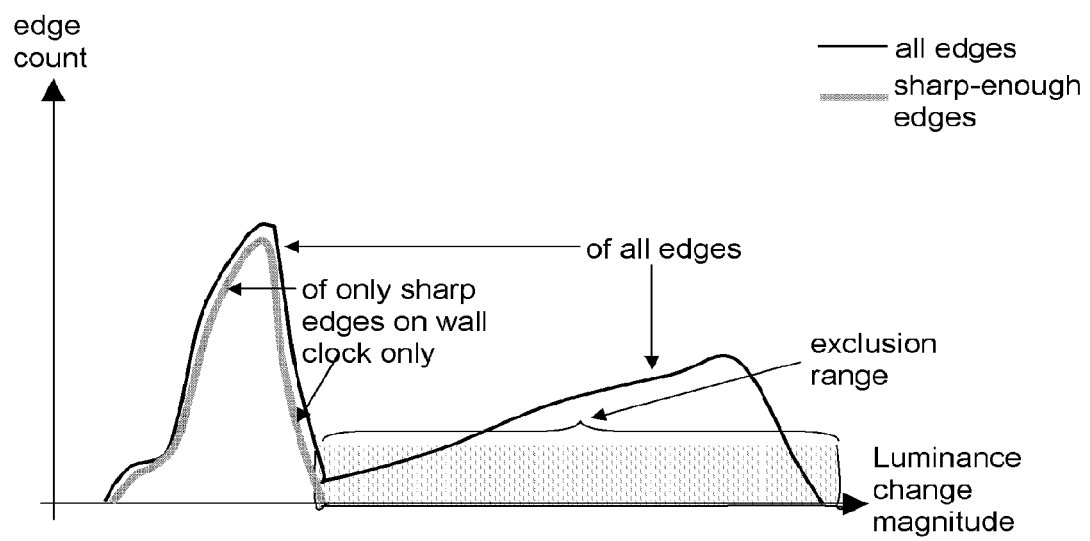
FIG. 24 is a first histogram of luminance change magnitude across edges and a second histogram for only sharp-enough edges within a region (wall clock) of FIG. 21.

FIG. 24 illustrates a use of luminance change as a characteristic for exclusion. Luminance change is a magnitude of change of luminance across an edge. FIG. 23 shows a histogram for sharp edges (associated with wall clock in FIG. 21) and a histogram for all edges, associated with other objects in the image that are not in sharp focus as well as the wall clock. In FIG. 24, the edges from wall clock occupy a small region at the lower range, and an exclusion range (shown in FIG. 24) covering the upper range would de-emphasize or even exclude altogether most edges that are not in sharp focus.

Figure 42A:
FIG. 42A is an illustration showing a first image captured when a selection region selects a bird in a scene and the exclusion calibrator calibrates for the bird when in sharp focus.
Figure 43:
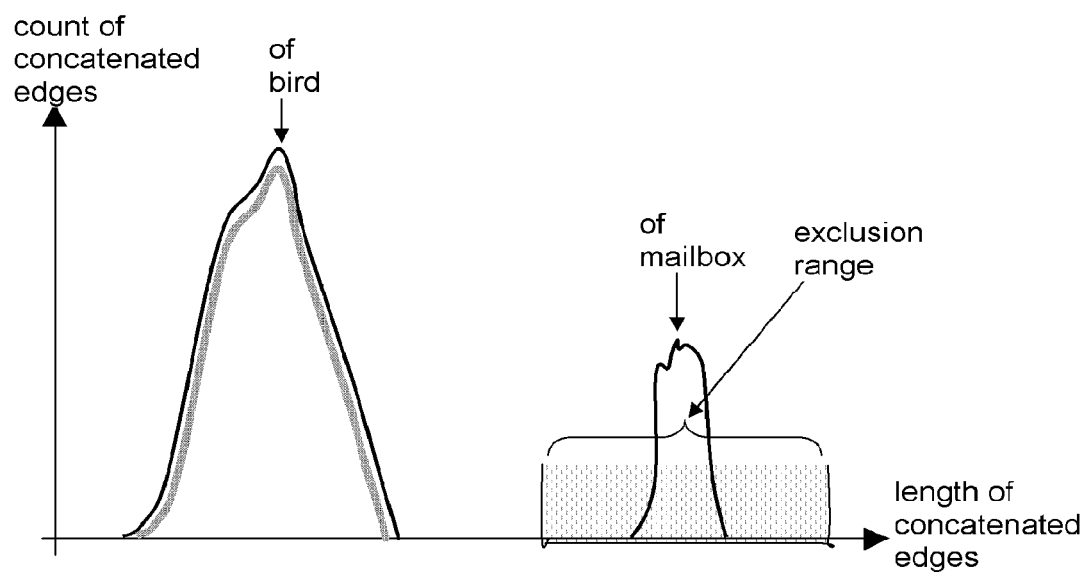
FIG. 43 is a first histogram of a length of concatenated edges and a second histogram of only concatenated sharp-enough edges (bird) of FIG. 42A.

FIG. 43 illustrates a histogram of length of concatenated edges and an exclusion range for the scene of FIG. 42A. Such a histogram may be used to separate objects having different sizes.

Spacing to nearest edge is another image characteristic. To each vertical (horizontal) edge is calculated and associated a spacing along a same row (column) to a nearest neighboring vertical (horizontal) edge ("edge spacing"). The edge spacings of all edges and sharp-enough edges have their respective histogram. Exclusion ranges for edge spacings are formed like for the other characteristics. Edge spacing can be used to distinguish objects that have many small details, for example a tree with many leaves and branches, from other objects that do not have similar densities of details, for example a car.

An alternate embodiment of exclusion filter is to create an exclusion-weight in the exclusion filter 212 and/or 910 for each edge and apply the exclusion weight to a calculation of focus signal in the focus signal calculator 210. An edge whose value for a first characteristic falls within an exclusion range of the first characteristic receives a lesser weight for the characteristic ("characteristic weight") than one whose value fall outside all exclusion ranges. For example, the characteristic weight may be 0 in the middle of an exclusion range, rises to 1 at the edges of the exclusion range, and 1 everywhere outside all exclusion ranges. If the exclusion filtering uses only one characteristic, the characteristic weight is the exclusion weight. If two or more characteristics are used, each characteristic has a characteristic weight for each edge, and all characteristic weights may be multiplied together to form the exclusion weight. Thus each edge may have a first, a second, and a third characteristic weight where three different characteristics are used in an exclusion chain, and the exclusion weight would be the product of all three characteristic weights. Thus, a contribution of each edge towards the focus signal may be multiplied by a factor E/G before summing all contributions to form the focus signal, where G is the sum of exclusion weights of all edges that enter the focus signal calculation, and E is the exclusion weight of the edge. Likewise, the edge-width histogram, which may be output as part of signals 134, may have edges that are not members to any exclusion range of any characteristic contribute more to the bins corresponding to their respective edge widths instead of all edges contribute the same amount, e.g. +1. Thus, for example, each edge may contribute E/H instead of +1 towards the bin of the edge-width histogram, where H is an average of E among edges that are counted in the histogram. Similarly, the narrow-edge count may have edges that are not members to any exclusion range of any characteristic contribute more. Thus, for example, the contribution from each edge may be multiplied by E/J, where J is an average of E among edges that are counted in the narrow-edge count.

Exclusion Calibration

Referring next to the exclusion calibrator 205 of FIG. 3, the exclusion calibrator 205 receives edges, edge widths, and the input image, and processes them to generate various exclusion control parameters to configure the exclusion filter 207. The exclusion calibrator 205 may further receive control signals 'calibrate command', 'index', and 'R/W'. These control signals may come from a focus system controller, e.g. processor 112 of FIG. 1 or 2.

The exclusion calibrator 205 is configured to inspect one or more image characteristics of edges in general and separately of sharp edges in particular upon a command on a 'calibrate command' input control signal, and create one or more exclusion ranges in those characteristics to exclude substantial amount of edges that are not sharp enough. Sharp-enough edges are edges whose widths fall within a predetermined narrow range ("sharp-edge range") surrounding sharp_edge_width. A sharp-edge range may be contained within the narrow-edge range. For example, a sharp-edge range may be +/−0.2 around sharp_edge_width. If sharp_edge_width is 2.0, a sharp-edge range may be from 1.8 to 2.2, whereas a narrow-edge range may be from 1.5 to 3.0. The exclusion ranges may be memorized under a unique index value provided by the 'index' input control signal by providing a write command on the 'R/W' input control signal. Multiple sets of exclusion ranges may be memorized, each with a different index value. A set of exclusion ranges may be retrieved by providing its associated index value on the 'index' input control signal and a read command on the 'R/W' input control signal. The retrieved exclusion ranges may be applied by the exclusion filter 207 in FIG. 3 to exclude edges that fall within these exclusion ranges. The exclusion ranges of a first characteristic may be applied before those of a second characteristic.

Figure 17:
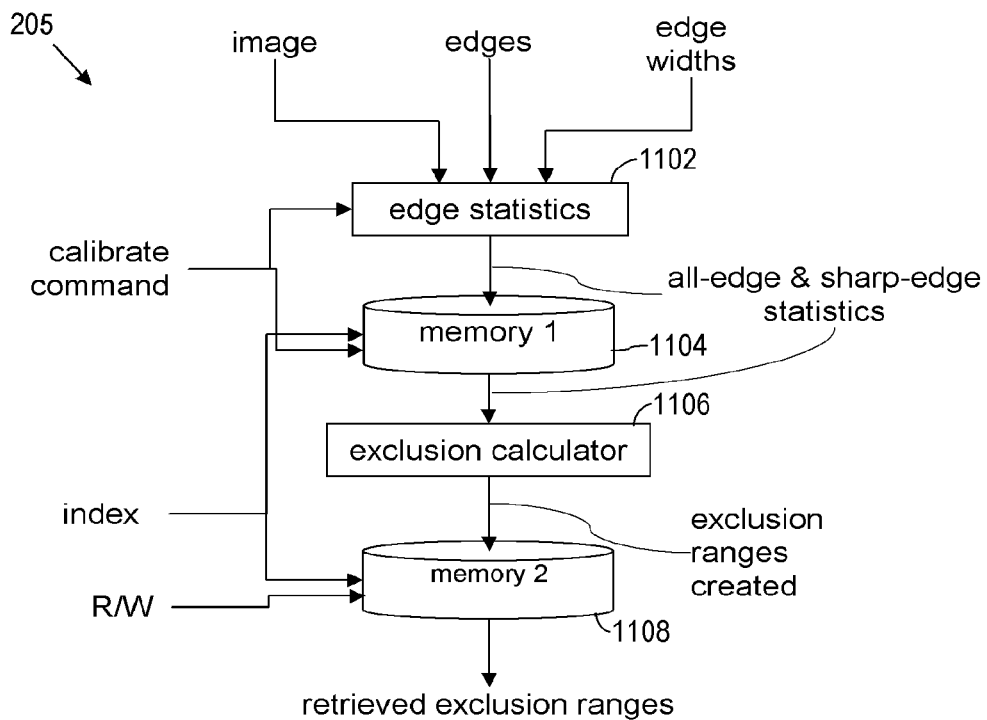
FIG. 17 is a block diagram of a first embodiment of an exclusion calibrator.

FIG. 17 shows a block diagram of one embodiment of an exclusion calibrator. Edge Statistic unit 902 receives an image, a set of edges, and edge widths. It calculates all-edge statistics, which are histograms for one or more characteristics associated with these edges. It also calculates sharp-edge statistics, which are histograms for the same characteristics but only on edges whose edge widths fall within the sharp-edge range. Both all-edge statistics and sharp-edge statistics may be stored in a memory-1 904. The exclusion calculator 906 receives both sets of statistics, performs calculation to form exclusion ranges in one or more characteristics based on histograms therein, and outputs to a memory-2 908, which may store these exclusion ranges under an index value provided on input control signal 'index' upon a write command on the input control signal 'R/W'.

Figure 18:
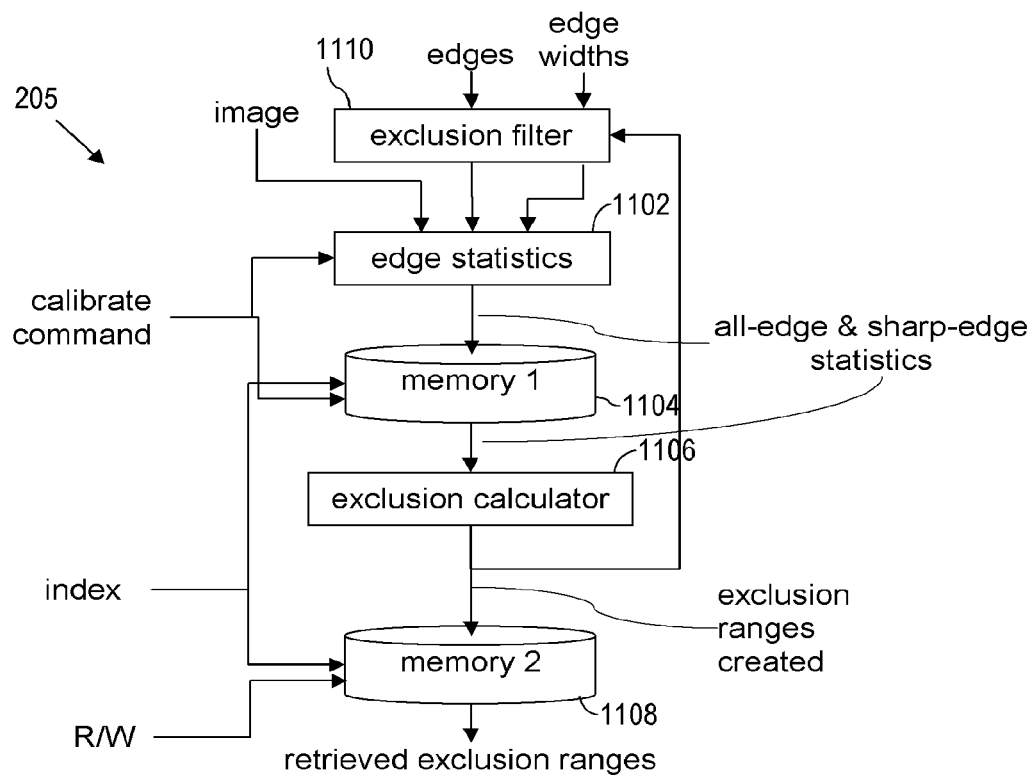
FIG. 18 is a block diagram of a second embodiment of an exclusion calibrator.

FIG. 18 is a block diagram of an alternate embodiment of an exclusion calibrator. This embodiment adds an exclusion filter 910 to the structure of FIG. 17. The exclusion filter 910 filters by a chain of sets of exclusion ranges, each set corresponding to a different characteristic. Edges are filtered by one set after another in the chain. At each iteration, the set of exclusion ranges calculated for the characteristic analyzed at the prior iteration is appended to the chain of sets of exclusion ranges. The resultant edges and edge widths (and exclusion weights, if the exclusion filter 910 follows the aforementioned alternate embodiment of exclusion filter) output by the exclusion filter 910 and further filtered by the newly added set are analyzed by Edge Statistics unit 902 to generate a new set of all-edge statistics and sharp-edge statistics (and exclusion weights, ditto). The exclusion calculator 906 analyzes the new set of all-edge statistics and sharp-edge statistics (and exclusion weights, ditto) and selects the next characteristic and its sets of exclusion ranges. A characteristic not used in prior iterations is chosen.

Figure 20:
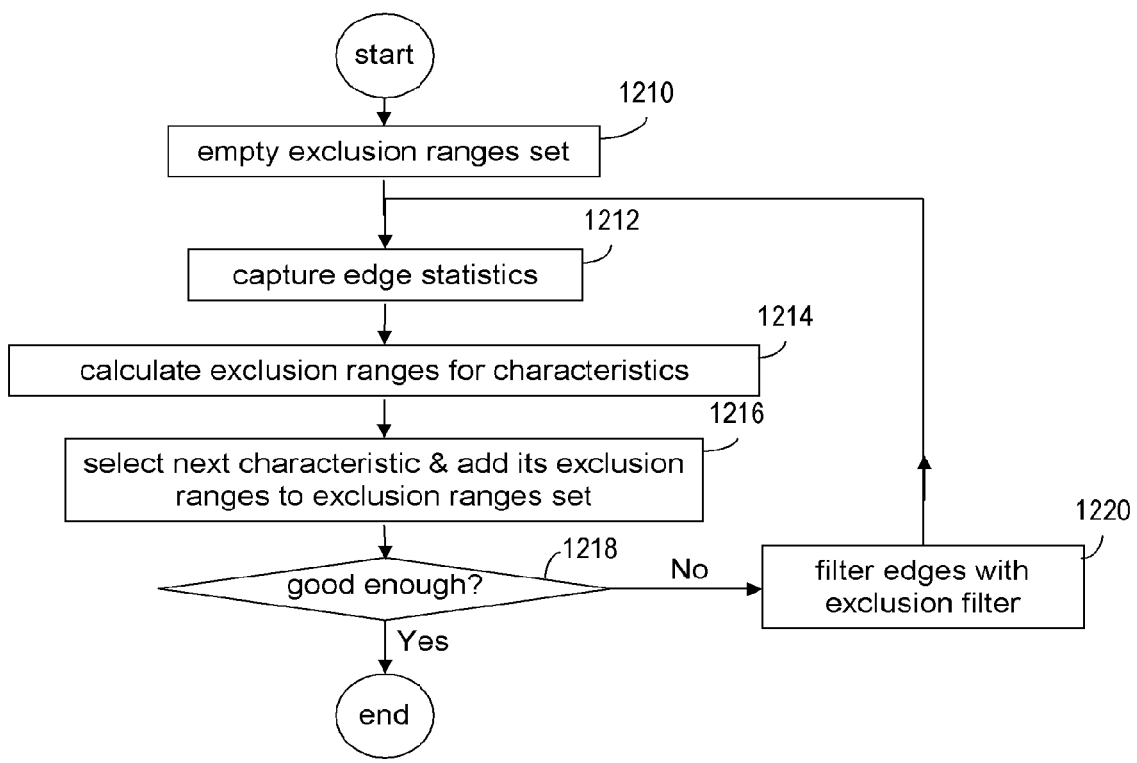
FIG. 20 is a flowchart of a process to determine a chain of exclusion ranges for multiple edge characteristics.

The flowchart in FIG. 20 illustrates this process. At step 1010, the chain of sets of exclusion ranges is initialized to empty. At step 1012, edge statistics unit 902 generates all-edge statistics and sharp-edge statistics for a number of characteristics for edges and associated edge widths received from exclusion filter 910. At step 1014, exclusion calculator 906 calculates exclusion ranges for a number of characteristics not used in prior iterations. At step 1016, a next characteristic is chosen from the abovementioned characteristics and its associated set of exclusion ranges is appended to the chain of exclusion range sets. At step 1018, a query on "good enough" (described below) is made. If answer is yes, the iterative process is done, and the chain of sets of exclusion ranges may be stored to the memory-2 908. If not, at step 1020, the exclusion filter 910 further filters those edges and their associated edge widths previously input to step 1012 with the latest added exclusion ranges, and subsequently a new iteration starts at step 1012 to re-calculate edge statistics.

Each iteration in FIG. 20 may choose a different characteristic that is not used in prior iterations in one of several ways. In a first way, the sequence of all characteristics may be predetermined, such that each next iteration uses the next characteristic down the sequence. In a second way, to choose between a first characteristic and a second characteristic to become a next characteristic, the characteristic that generates exclusion ranges that de-emphasize or even exclude more edges that survive into the current iteration may be preferred over the other characteristic. This preference may be reversed if the characteristic de-emphasizes or removes more than a certain fraction, e.g. 10%~50%, preferably 20%, of sharp edges. This selection procedure for a next characteristic is applicable to the embodiment of FIG. 17 as well as the embodiment of FIG. 18.

In general, a first characteristic may be preferred over a second characteristic if the former results in a greater increase in a ratio of sharp-enough edges to all edges among the surviving edges after a re-filtering using a corresponding set of exclusion ranges.

Exclusion ranges corresponding to a number of different indices may be combined to form new exclusion ranges that are stored under a new index. For each characteristic present under one or more of said different indices, the exclusion ranges of said characteristic under said different indices may be logically ANDed across said indices followed by an inversion to form new exclusion ranges such that a value is within such new exclusion ranges if and only if said value is not within an exclusion range for said characteristic for at least an index that has said characteristic in its exclusion chain. Effectively, such new exclusion ranges for said characteristic tries to exclude sharp-enough edges from all of said different indices. One or more characteristics may be operated upon in this manner to generate new exclusion ranges. Such characteristics may form an exclusion chain. An exclusion calibrator may receive a command input that specifies a set of different indices along with the new index to store the resultant exclusion chain under. A new exclusion chain thus formed under a new index may be retrieved to apply on the exclusion filter 207 to exclude edge contributions from a number of objects already calibrated for to discover remaining objects in the scene.

The exclusion calibration works in iteration from the start of the calibrate command until either a certain "good enough" condition is met or no more characteristics remain.

Then the entire chain of set of exclusion ranges may be stored in the memory-2 808 along with the index value from the 'index' input control signal or transmitted to the processor 112, 112', 112" or both. The "good enough" condition can be met in one of several ways. In one, the condition is met if the chain of exclusion ranges has a predetermined number of characteristics, for example three. In a second, the condition is met if, for example, 75% of edges that are not sharp-enough edges are eliminated after exclusion filtering. In a third, the condition is met if the number of sharp-enough edges outnumber the rest by three to one after exclusion filtering. "Good enough" condition may be anyone of the above, or combination thereof, or other reasonable condition that indicates that what remains after exclusion filtering are not dominated by edges other than sharp-enough edges.

Figure 19:
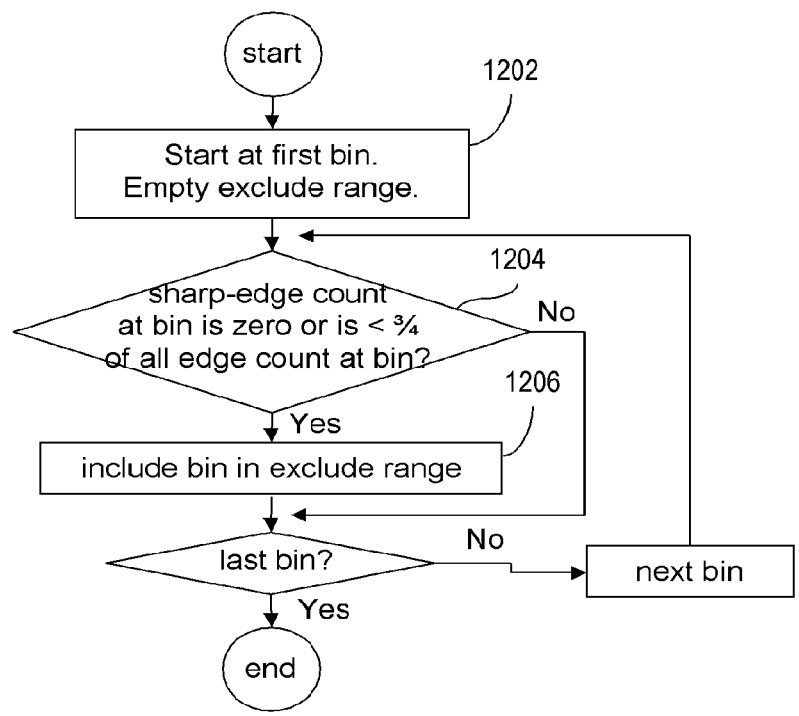
FIG. 19 is a flowchart of a process to determine exclusion ranges for one edge characteristic.

FIG. 19 is a flowchart for the exclusion calculator 906 shown in FIGS. 17 and 18 to generate exclusion ranges for each characteristic. The characteristic's range may be divided into bins, each bin covering a fraction of the range, and all bins together cover the entire range, and adjacent bins do not overlap except sharing the common boundary. Starting with the first bin at step 1002, the exclusion range is emptied. At step 1004, the count of sharp-enough edges is compared with the count of all edges. If the count of sharp-enough edges in this bin is either zero or less than a given fraction, e.g. three quarters, of the count of all edges in this bin, include this bin in the exclusion range. Repeat steps 1004 and 1006 until all bins are done.

An exclusion calibrator may create a separate set of exclusion ranges ("pointed exclusion ranges") by further limiting sharp-enough edges to be within a given region in the image. To do so, sharp-edge statistics is further tightened to exclude edges that lie outside the given region. The given region may be formed, for example, in FIG. 16, from a selection region 1920 shown overlapping the displayed image in the display 114. The selection region 1920 indicates an object desired to be in sharp focus. Thus if there were a different object outside the selection region 1920 but at the same focus distance as the object within the selection region 1920, the different object does not interfere with the formation of exclusion ranges to reject edges not pertaining to the desired object. The exclusion calibrator may create and memorize a separate set of exclusion ranges corresponding to further limiting sharp-enough edges within the selection region. The given region may be formed, alternately, as a predetermined focusing region (not shown) in the center of the display of digital cameras and the viewfinder of cameras in general, often in rectangular shape or circular shape. The given region may be formed, alternately, by a touch-screen sensor overlapping the display 114. The touch-screen sensor may sense one or more strokes of touching by one or more of a stylus and fingers, for example, and provide such information as the positions of the touching to a processor to determine the corresponding selection region.

Although shown to reside together in the focus signal generator 120, one or more components of the exclusion calibrator 205 may reside instead in the processor 112, 112', 112". For example, the exclusion calculator 906 and the memory 908 may reside in the processor 112, 112', 112". In this configuration, the processor 112, 112', 112" receives all-edge and sharp-edge statistics (shown in FIGS. 17 and 18) via signals 134 for use in the exclusion calculator 906. The processor 112, 112', 112" may perform the process of the flowchart in FIG. 19 and/or 20 entirely within itself or in conjunction with the focus signal generator 120, 120'.

Use with Exclusion

Exclusion calibrator 205 and exclusion filter 207 together may be used to form a chain of exclusion ranges to eliminate edges that do not belong to the object in sharp focus in one image captured at a time. The same chain of exclusion ranges may subsequently be used to eliminate those other edges even though the object has moved relative to the background objects. Doing so allows the edges of the object to continue to dominate the focus signal. Exclusion filtering may be operated whether or not the width filter 209 is bypassed by the fine switch 220 in FIG. 3. If the width filter 209 is bypassed, i.e. the focus signal is a gross focus signal, those two outlier peaks in FIG. 11 at edge widths of 4.0 and 5.0 may be eliminated so that even if the previously in-focus object has moved out of focus so much that the associated peak 820 moves outside of the narrow-edge range, the gross focus signal can still provide a good feedback signal to the focus control system to estimate how much to adjust the focus position to bring the object of interest back into the narrow-edge range where the fine focus signal can provide a more accurate feedback control signal to finally bring the object into a sharp focus.

Re-calibration may be performed at any time, for example during tracking of an object of interest, by issuing a "calibrate" command to the exclusion calibrator 205. The processor 112, 112', 112" may provide the same index to the exclusion calibrator 205 as the index under which the existing calibrated exclusion ranges for the object of interest is stored. The index may be the index used to retrieve the chain of sets of exclusion ranges currently in use in the calibration filter 207. Issuing the same index as an existing index will replace the previous calibrated exclusion ranges and chain that correspond to the existing index with a new chain of sets of exclusion ranges.

A re-calibration may be performed when a selection region is created on and/or around the object of interest to limit sharp-enough edges to within the selection region only, as discussed above. The "pointed exclusion ranges" or "pointed exclusion chain" may be sent to and be used at the exclusion filter 207 instead of non-pointed exclusion ranges or chain, e.g. when the processor 112 receives a user command providing a given region in one of the abovementioned manners.

Re-calibration may be performed during movement of the object of interest within the scene causing one or more image characteristics pertaining to the object to change. For example, the user may command a given region on and/or around the object of interest as soon as the object of interest is no longer highlighted or is losing more and more of the highlight that indicates sharp edges.

For re-calibration, instead of providing the same index, the processor 112 may provide a new index to store a new chain of sets of exclusion ranges. The re-calibrated chain of sets of exclusion ranges may be stored under a new index and not over-write the existing index and its associated chain of sets of exclusion ranges. The chain of sets of exclusion ranges from the new and the existing indices may be compared to identify which characteristic(s) change, and which do not. The characteristics that do not change from the existing index to the new index may be promoted to become earlier in the new chain. The characteristics that change may be eliminated from the chain. Thus characteristics that remain unchanged over time are retained for tracking the same object over time. A characteristic may be considered having changed if replacing the characteristic's exclusion ranges in the new chain with that of the existing chain would result in a significant change in a ratio of sharp-enough edges to all edges after a re-filtering with the characteristic. A significant change in the ratio may be in terms of a percentage, for example 50%.

For an object of interest nearly in sharp focus such that it produces edges within the sharp-edge range, exclusion calibrator 205 and exclusion filter 207 help to eliminate edges contributed by out-of-focus objects so that contribution to the fine focus signal (for which width filter is not bypassed) is dominated by edges contributed by the object of interest to give an improvement in the accuracy of fine focus signal as an indication of focus sharpness.

When a selection region 1920 is created on and/or around the object of interest, the focus signal generator 120 may give preference in the calculation of the focus signal to edges that correspond to only the selection region 1920 ("preferred edges") under a control (not shown) of the processor 112. Preference to preferred edges may be given in one of several ways. The image provided to the focus signal generator 120 on bus 130 may be limited to within the selection region 1920. Or a weight may be applied on edges that enter the focus signal calculation such that edges outside and/or farther from the selection region 1920 have lesser weights than the preferred edges, or even zero (i.e. equivalent to being excluded from focus signal calculation altogether). Or edges that are not preferred edges may be eliminated at any one of the units within the focus signal generator 120, such as the edge detection & width measurement unit 206, the width filter 209, and the exclusion filter 207. Ways to give preferences to intra-region edges are not limited to the above. Nor is there a need for a rigid or sharp distinction between inside and outside of the selection region 1920. One skilled in the art can readily appreciate that it suffices as long as a plurality of edges are selected to correspond to the selection region and to receive such preference against a plurality of edges outside the selection region.

When a selection region 1920 is created on or around an object of interest, the processor 112 may control the focus signal generator to generate a gross focus signal that applies a preference to the preferred edges. Doing so can eliminate edges not pertaining to the object of interest. For example, in FIG. 14 is shown a gross focus signal across a sweep of focus position from far to near without applying such preference. The gross focus signal exhibits multiple minima but only one minimum, at position FB, is due to the car. By applying such preference for the car, such as by using the selection region 1920 shown in FIG. 16, the minima corresponding to the foreground "person", at position FC, and the background "mountains, sun & horizon", at position FA, can be eliminated. In addition, the gross focus signal level at position FB, corresponding to the "car", will have a value closer to the sharp-edge width. The focus control system 102 may control the focus position of the focus lens 104 to reduce the difference between the focus position FB to the current focus position by evaluating a difference between the current gross focus signal level and the sharp_edge_width by applying one of the known control methods, PI-controller. The focus control system 102 may switch to use the fine focus signal when the current focus signal level falls within a range close enough to the sharp_edge_width, such as the narrow-edge range.

Control—Scanning

Figure 25:
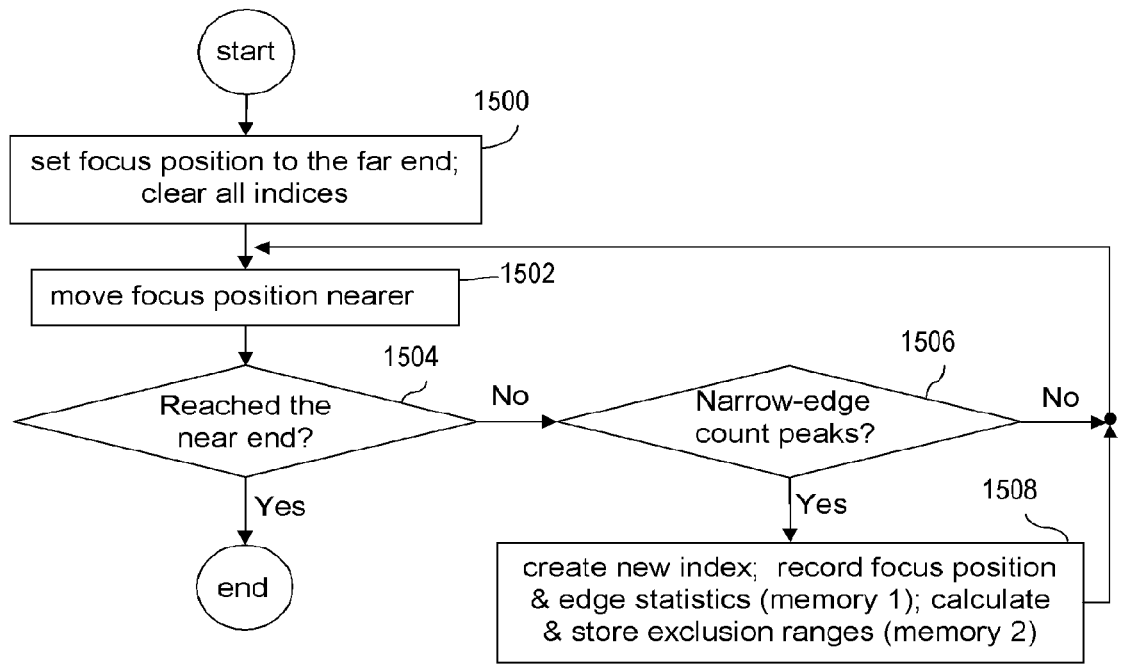
FIG. 25 is a flowchart of a process of focus scan.

FIG. 25 is a flowchart for a focus system controller such as processor 112 of FIGS. 1 and 2 to adjust the focus position and measure focus signal when moving the focus position across its range from one end to the other in search of focus positions that render sharp images of objects in the scene. At step 1400, the focus position is set to the far end. All indices for the exclusion calibrator 205 of FIG. 3 may be cleared, along with the exclusion range data in memory-2 908 of FIGS. 17 and 18. At step 1402, the focus position is moved one step closer. At step 1404, if the focus position is the near end, scanning is completed. If not, at step 1406, check to see if the narrow-edge count peaks. If not, go to the next iteration, starting back at step 1402. If yes, create a new index for this focus position, record the focus position, send a calibrate command to the exclusion calibrator 205 to gather edge statistics, form a chain of sets of exclusion ranges, and send the index and a write command to store the chain of exclusion ranges, then proceed to the next iteration, starting back at step 1402.

A chain of sets of exclusion ranges may be formed during the scanning process for each focus position where sharp images are found. In a subsequent search for any of these objects, the exclusion ranges may be applied to the focus signal generator to help de-emphasize and discriminate against edges contributed by the other objects so that the gross focus signal may exhibit a single trough and further the trough has a minimum value that is close to the sharp_edge_width, and so that the fine focus signal also has less interference from out-of-focus objects that its departure from the sharp_edge_width gives an accurate estimate of how much to adjust the focus position to bring the object into sharp focus. Both remain useful and reliable even if the object of interest moves relative to the other objects.

Figure 26:
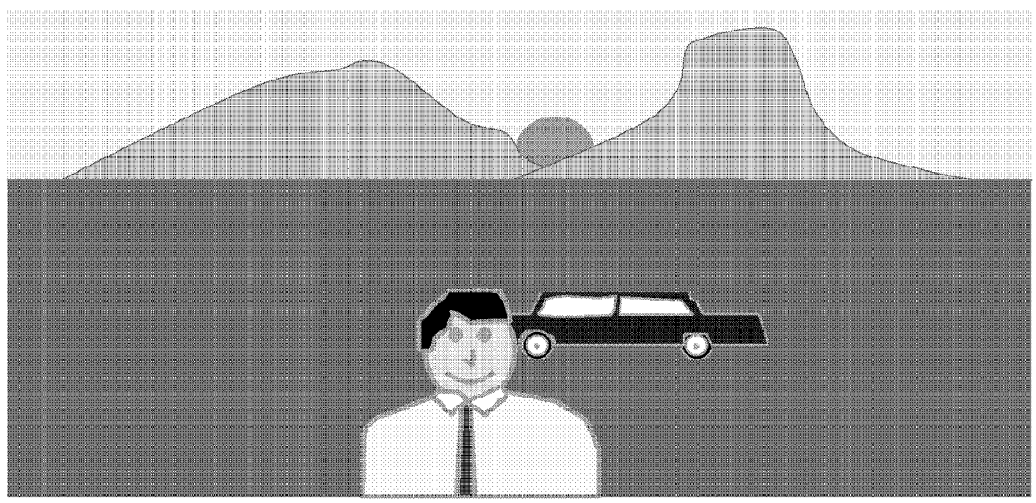
FIGS. 26-28 are illustrations of images of the scene of FIG. 12 captured at different focus positions.
Figure 27:
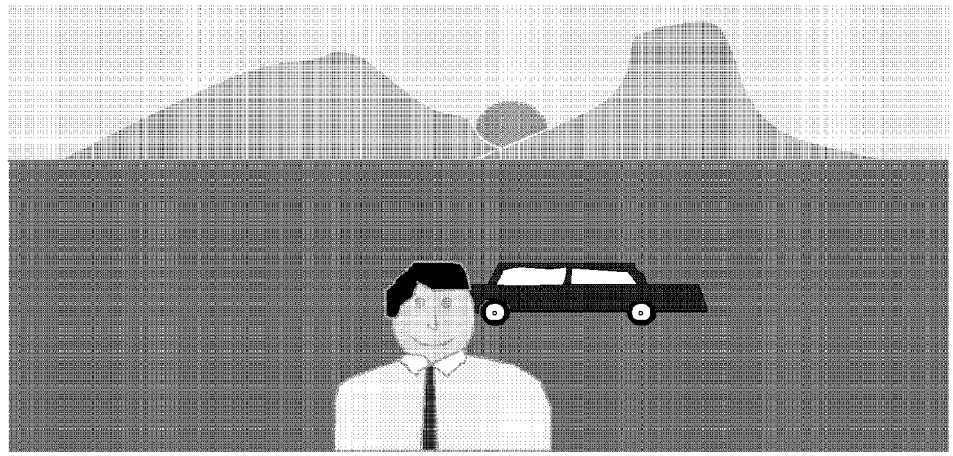
Figure 28:
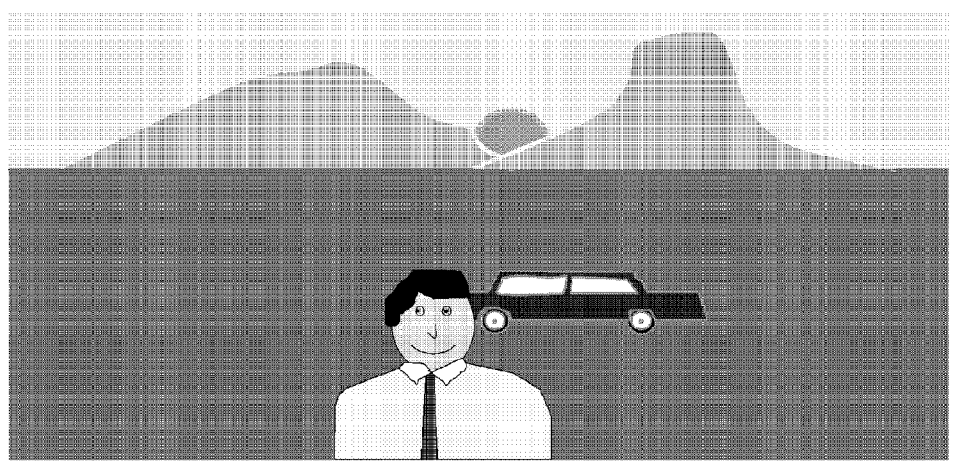
Figure 29:
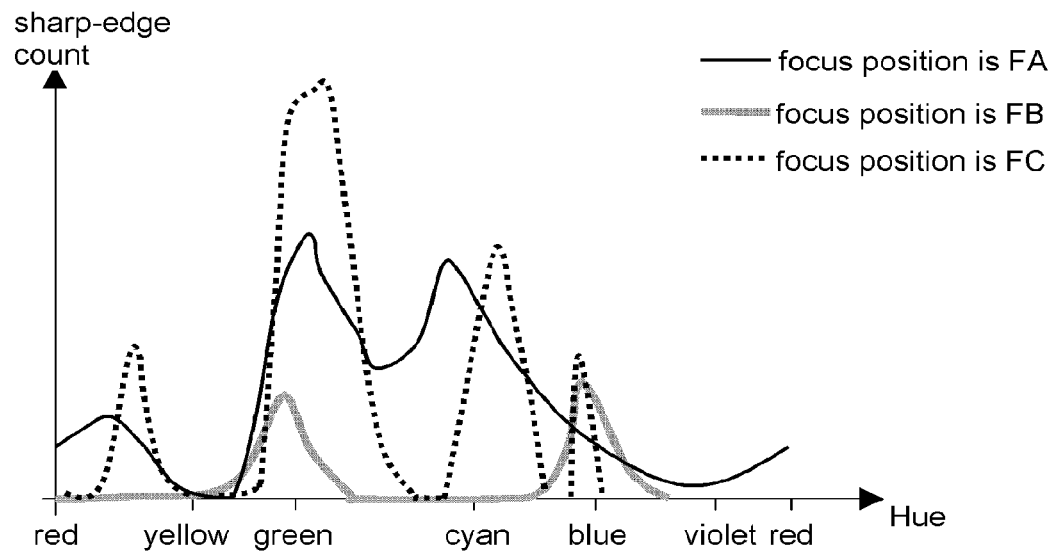
FIG. 29 is a graph illustrating a sharp-edge count versus a hue at focus positions FA, FB, and FC of FIG. 13.
Figure 30A:
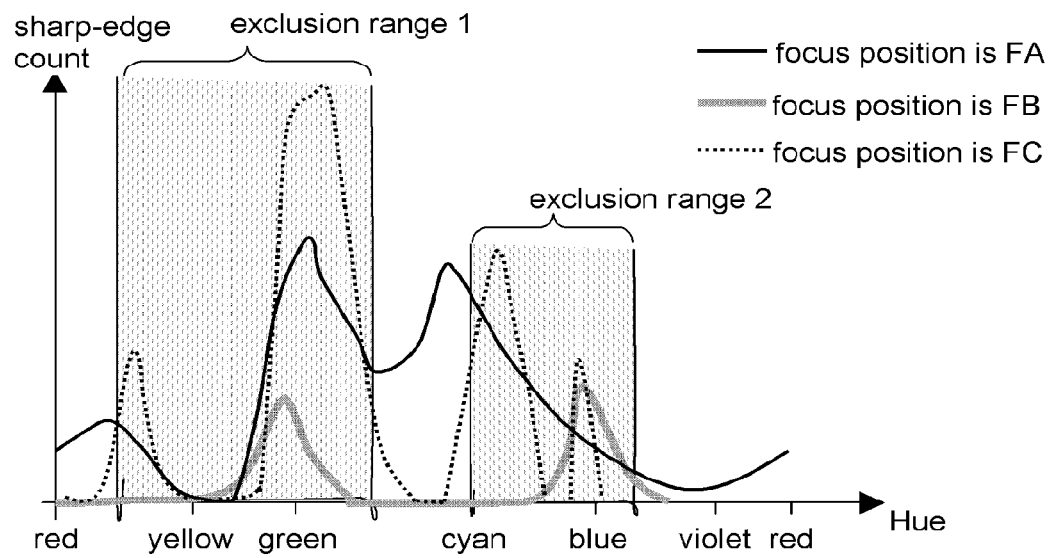
FIG. 30A is a graph showing hue exclusion ranges for focus position FA ("mountains, sun & horizon")
Figure 30B:
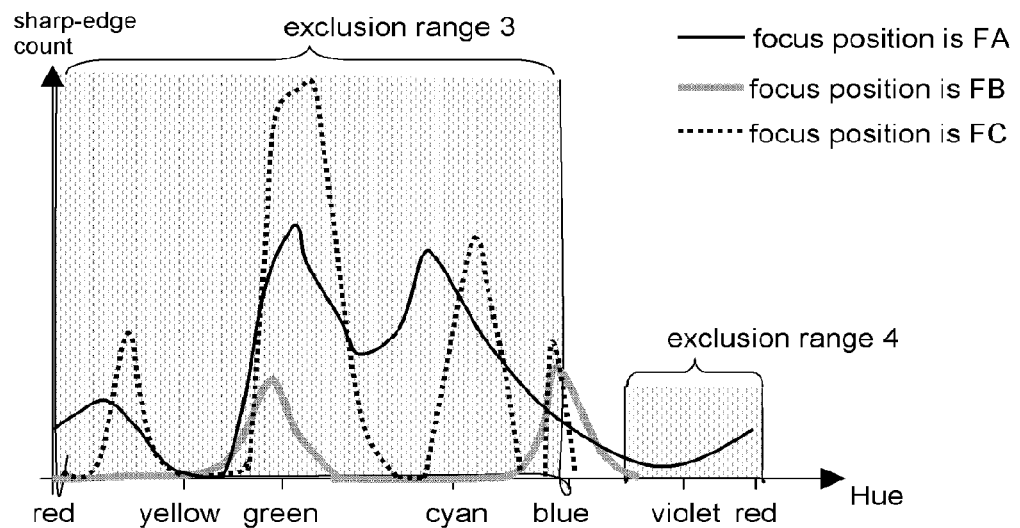
FIG. 30B is a graph showing hue exclusion ranges for focus position FB ("car")
Figure 30C:
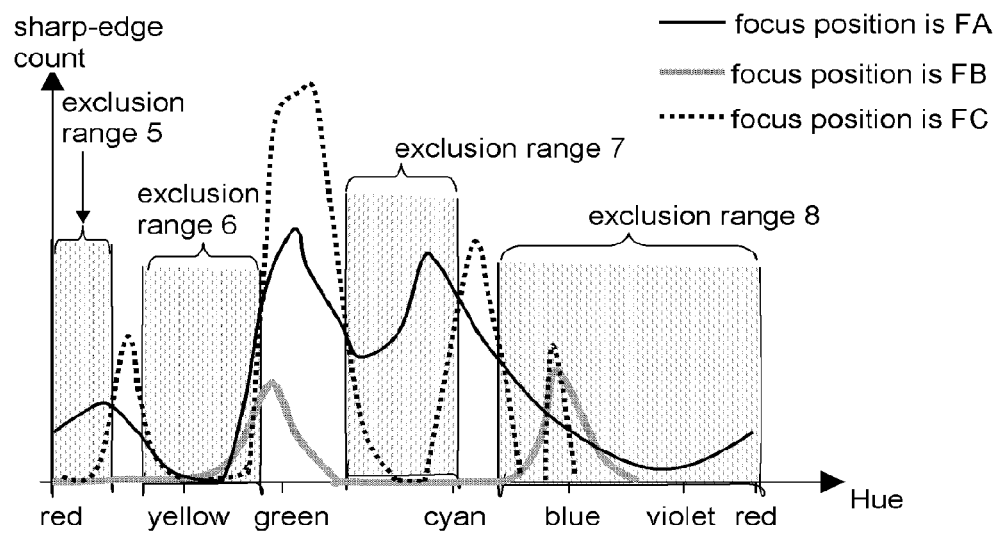
FIG. 30C is a graph showing hue exclusion ranges for focus position FC ("person")

As an illustration, FIG. 13 is a graph of narrow-edge count plotted against time when scanning the scene illustrated in FIG. 12. The narrow-edge count peaks whenever the focus position is such that an object projects a sharp image on the pixel array 108 in FIG. 1 or 2, thus its peaking signifies a presence of sharp-enough edges. FIGS. 26, 27, and 28 illustrate the images captured when the focus lens is at each of those focus positions where the narrow-edge count peaks.

FIG. 14 shows the gross focus signal output by the focus signal generator 120 during the scan, where the exclusion filter 207 is bypassed by the 'exclude' signal being OFF. The gross focus signal correctly exhibits a minimum corresponding to the times when the focus position is near each of the three focus positions that brings an object into sharp focus. However, the gross focus signal's minimum is not at the sharp_edge_width level, which is 2.0 in this example, due to the interference from blurred edges contributed by the other objects that are out-of-focus. As aforementioned, turning on 'exclude' signal after having calibrated the exclusion calibrator 205 will subsequently allow the gross focus signal to exhibit a single global minimum for each of the 3 groups of objects by retrieving exclusion ranges using the index for each group of object, even if they have moved from where they were during scanning. FIGS. 29, and 30A-30C illustrate how exclusion ranges for hue for each of those three groups of objects may be formed.

Search—Display & User Direction

Figure 31:
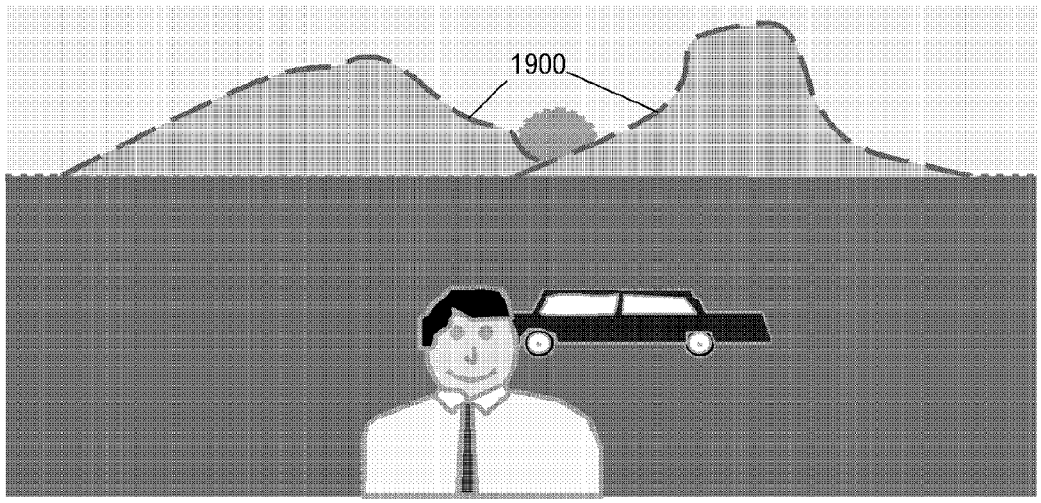
FIG. 31 is an illustration showing edges in sharp focus corresponding to the focus position FA of FIG. 13 being highlighted on a display.
Figure 32:
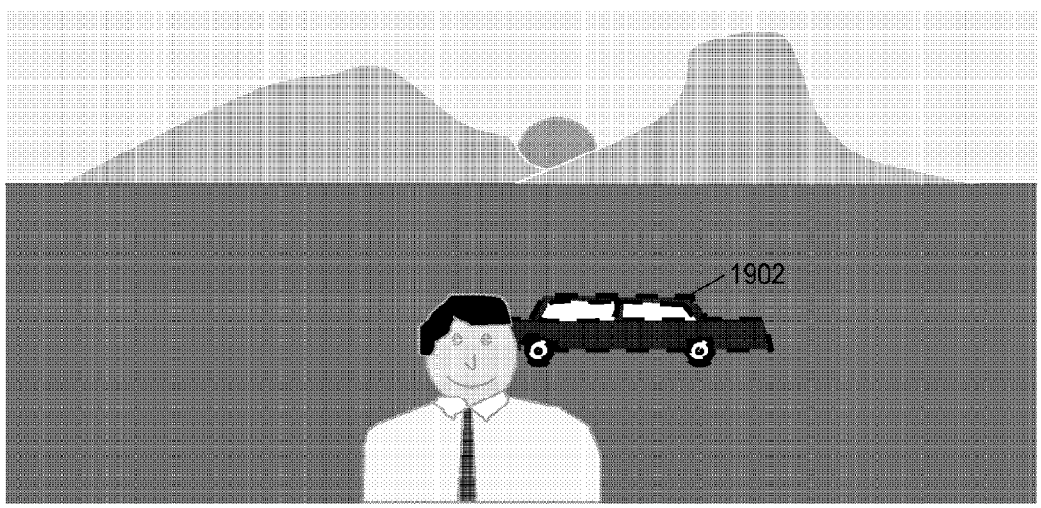
FIG. 32 is an illustration showing edges in sharp focus position FB of FIG. 14 being highlighted on a display.
Figure 33:
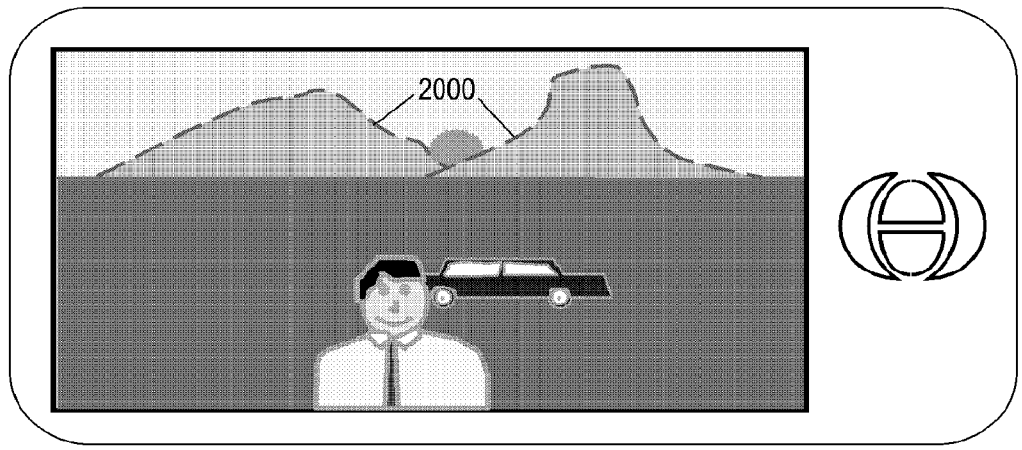
FIG. 33 is an illustration showing buttons on the image capture device for the user to request jumping to the next farther or nearer sharp focus positions.

FIG. 31-33 illustrate how edges may be highlighted on the display 114 of FIG. 1 or 2 when the focus position bring them into sharp focus. Highlighting sharp edges or sharp-enough edges is especially helpful to the user when the image capture resolution is far higher than the display resolution such that an insufficiently sharply focus edge still appears to be sharp on the display. It also solves a common problem wherein the user is not able to tell which object among several objects in the scene is in sharp focus. Having been thus informed of which objects are in sharp focus, the user can then press either the outward button 1912 of the image capture apparatus 102 of FIG. 16 to focus on a farther object, or inward button 1910 to focus on a nearer object or use any one of user input device and method available to input such user commands. The image capture apparatus 102 may also display a blinking outline 2100 overlapping the object whose edges are to be focused on, as shown in FIG. 33. In general, any display method to indicate one or more sharp-enough edges may be used, as one skilled in the art would readily recognize.

A Search Mode

Figure 34:
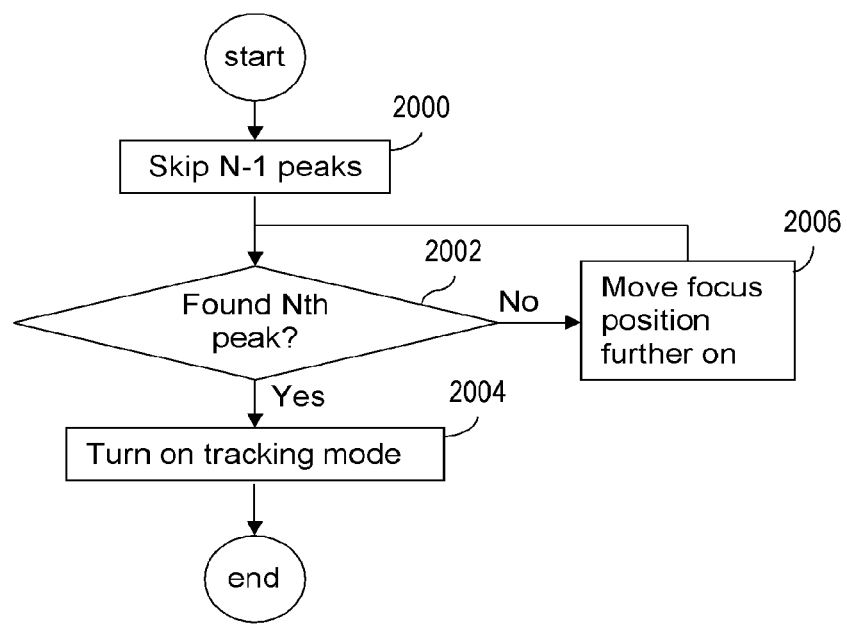
FIG. 34 is a flowchart for a focus control system in seek mode.
Figure 35:
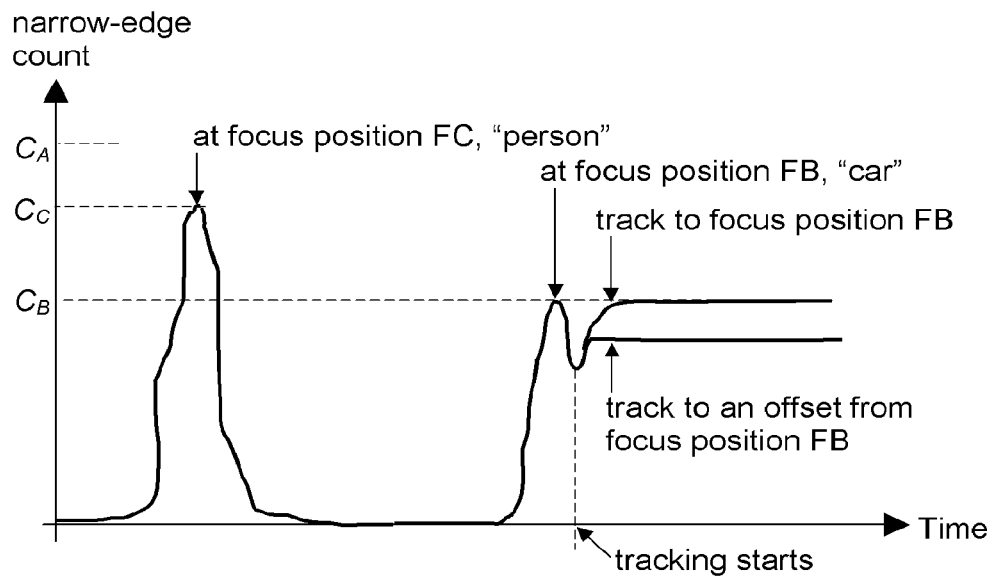
FIG. 35 is a graph of a narrow-edge count versus focus position during a seek to the focus position FB and a subsequent switch to a tracking mode.
Figure 36:
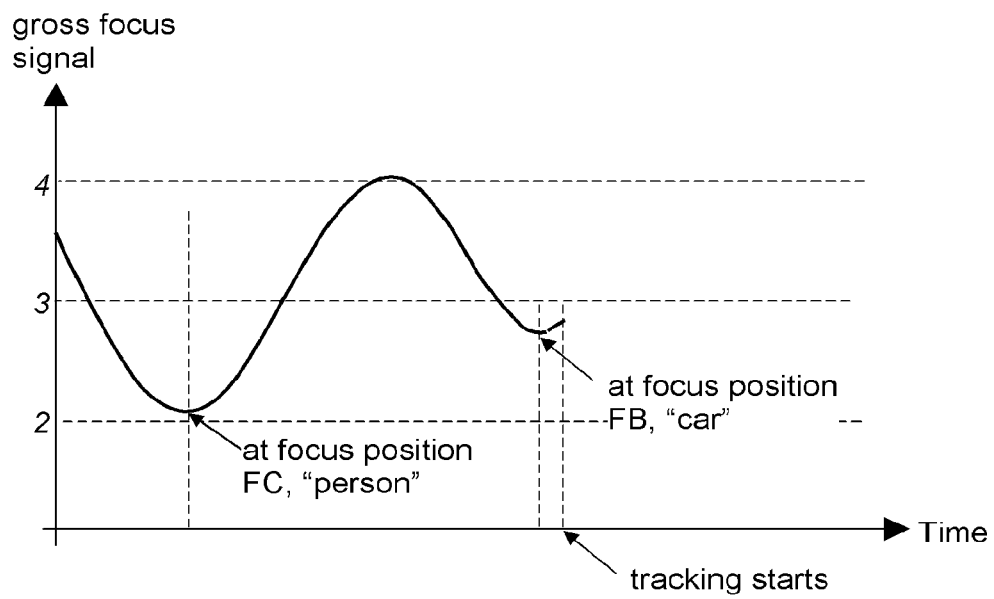
FIG. 36 is a graph showing the gross focus signal during a seek to the focus position FB corresponding to FIG. 35.

FIG. 34 is a flowchart for seeking to the Nth object in a given direction. At step 2200, the focus lens 104 moves until N−1 peaks are skipped. Peak skipping can be detected using one of several signals for peak detection ("peak-detection signal"). One candidate peak-detection signal is gross focus signal, which as FIG. 36 shows attains a local minimum at each position where there are objects producing sharp edges in the captured image. For the scene of FIG. 12, to bring the car into sharp focus, the focus lens will move outwards from the innermost position to skip focus position FC where the person is in sharp focus, past the focus position where the gross focus signal reaches a local minimum (that nearly reaches the sharp_edge_width value of 2.0). Another candidate peak-detection signal is the narrow-edge count. FIG. 35 shows narrow-edge count as focus position moves outward from the innermost position past the position where the person produces a sharp image in the captured image.

Figure 37:
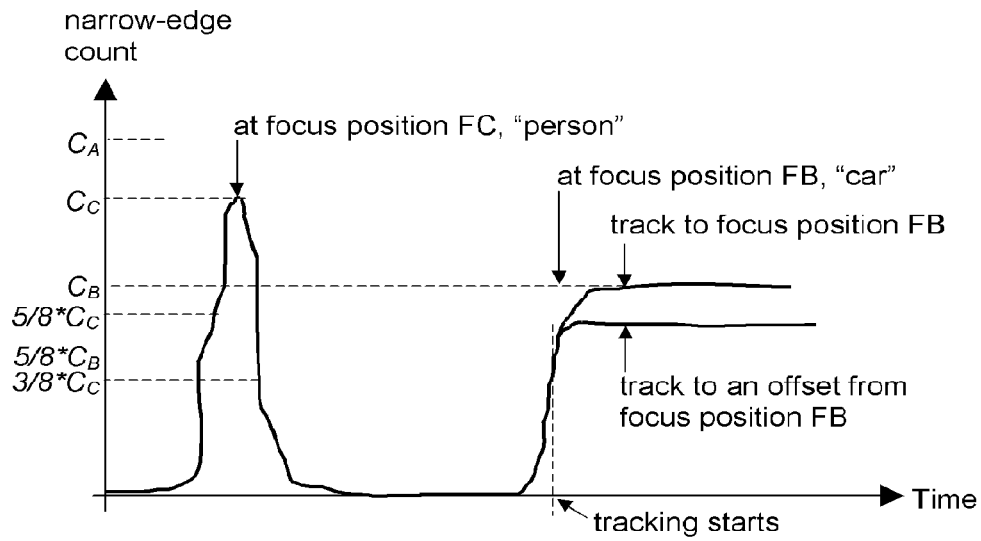
FIG. 37 is a graph of narrow-edge count versus focus position for an alternate embodiment wherein the focus system switches to tracking mode.
Figure 38:
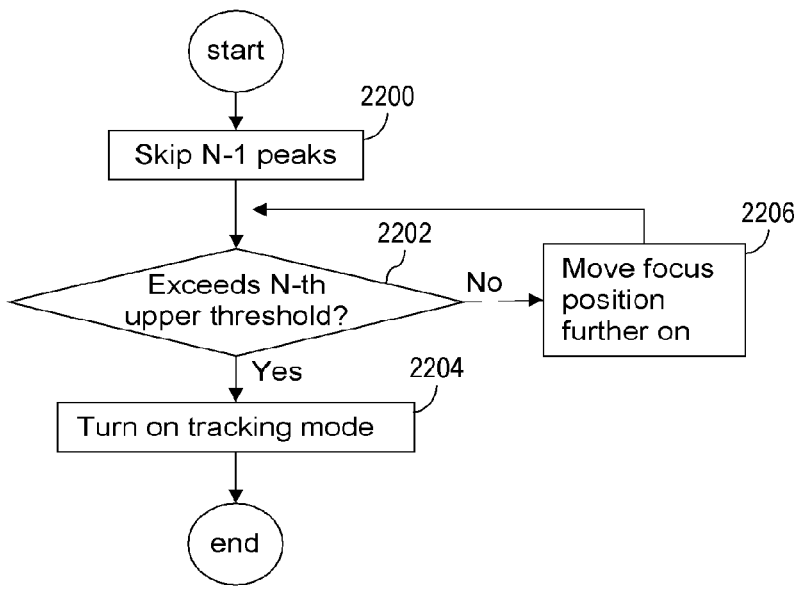
FIG. 38 is a flowchart for focus control system in seek mode for FIG. 37.

At step 2202 of the flowchart in FIG. 34, unless having found the Nth peak, continue to move focus lens in the same direction, at step 2206, and return to the same query at 2202. If found, move to step 2204 to turn on tracking mode. Detection of the Nth peak can use one of several peak-detection signals. One candidate peak-detection signal is the gross focus signal. Another candidate is the narrow-edge count. A different peak-detection signal may be used for step 2202 than step 2200. Tracking may be turned on after the peak is detected, as shown in FIGS. 35 and 36 following the flowchart of FIG. 34, or when approaching and near enough to the peak value, as shown in FIG. 37, following flowchart of FIG. 38. ("Near enough" may be exceeding a predetermined fraction of the prior detected peak value, e.g. from a prior scan.)

User Control on Search

The number N to associate with the focus position to seek to may be established in one of several ways.

In a first method, the apparatus 102 may provide a user control, such as buttons 1912 and 1910, shown in FIG. 16, to navigate outward or inward among sharp focus positions. For example, each pressing of the button 1912 may select the next farther sharp focus position, whereas each pressing of the button 1910 may select the next nearer sharp focus position. The apparatus 102 may display a highlight such as a highlight 2000 shown in FIG. 31 on a sharp edge or a sharp object. The sharp focus positions may be memorized during a scan. The highlight 2000, or the corresponding sharp edges, or both, at each sharp focus position found during the scan may be formed and memorized in a memory, such as within the processor 112, 112', 112", during the scan. The displayed image at each sharp focus position may be memorized along. During a navigation to a target focus position, such as by using buttons 1912 and 1910 to jump farther and nearer among sharp focus positions, the highlight that corresponds to the selected sharp focus position may be retrieved from the memory and displayed on the display 1902. Along with the highlight 2000, the previously memorized displayed image that corresponds to the selected sharp focus position may be displayed as well to show what object in the memorized display image gave rise to the sharp edges at the selected sharp focus position. With this aid, the user may decide whether the selected sharp focus position corresponds to his or her intended target sharp, or he or she needs to navigate farther or nearer. Thus, even with several different objects at different focus distances giving rise to edges overlapping within the image in the display 1902 in FIG. 16, for example the head of the person and the left end of the car, the user is able to select the target object. The processor 112 thus determines the user's selection of the target sharp focus position and its associated memorized sharp focus position or exclusion chain or index or any combination thereof. If the target sharp focus position is the nearest, found from the scan, N is 1. If it is the one immediately after, N is 2; and so on. The associated chain of exclusion ranges may be retrieved and applied to the exclusion filter 207, the associated chain having been calibrated, created and stored under an index previously.

In a second method, a prior scan is not assumed. Using the user interface as described in the previous paragraph, the user may navigate farther or nearer by N number of steps. For example, the user may press button 1912 three times to demand an outward search from the current focus position past a first sharp focus position followed by a second sharp focus position to stop at a third sharp focus position. The focus system controller 112 commands the focus lens 104 to move outwards to the third sharp focus position by following the flowchart in FIG. 34, having N initialized to 3. If the user subsequently demands to change the target sharp focus position to the second sharp focus position by pressing button 1910 once, the focus system controller 112 commands the focus lens 104 to move to the second sharp focus position by following the flowchart in FIG. 34, but moving the focus position in the inward direction this time, having N initialized to 1. The apparatus 102 may display a highlight 2000 on sharp edges each time a sharp focus position is found at the final destination or in passing.

Either of the above methods is useful to deal with difficult focusing situations in which edges from objects at different focus distances overlap. One example of such situation is a chicken wire and a chicken behind the chicken wire. If the focus position has the chicken wire in sharp focus whereas the chicken is the desired object, the user can navigate outwards one step using the user interface, for example by pressing the outward button 1912 once. In response, the focus system controller 112 commands the focus lens 104 to move outwards until the next sharp focus is detected, which is the sharp focus position for the chicken. On the other hand, if the focus position has the chicken in sharp focus whereas the chicken wire is the desired object, the user can navigate inwards one step using the user interface, for example by pressing the inward button 1910 once. In response, the focus system controller 112 commands the focus lens 104 to move inwards until the next sharp focus is detected, which is the sharp focus position for the chicken wire. In either case, the sharp object or its edges may be highlighted on the display 1902 each time an object is brought into sharp focus to help the user determine which object is in sharp focus.

Highlighting on a display an object or its edges in sharp focus, providing a user interface to initiate and/or give a direction to seek to a next focus position to bring a farther or nearer object into sharp focus, seeking to said next sharp focus position upon a user entering a corresponding command via said user interface, and highlighting objects or their edges brought into sharp focus during transiting to the final focus position are steps useful to a user of an apparatus 102 regardless of how the focus signal is formed or how the object or its edges in sharp focus is determined. The focus signal may be generated by measuring widths of edges in an image as in this application. Alternately, the apparatus 102 may measure a contrast across an edge and detecting sharp focus of the edge by detecting a peaking in said contrast when focus position of the focus lens 104 is changed. Alternately, the apparatus 102 may generate a focus signal by dividing the image into groups of adjacent pixels, e.g. each group having 16-by-16 pixels, a contrast measured within each group as a difference between a maximum value and a minimum value of a signal that represents visible light reflecting from the scene, e.g. luminance, and detecting sharp focus within said group of pixels by detecting a peaking in said contrast when focus position of the focus lens 104 is changed, and highlighting a portion of the image displayed in display 1902 corresponding to said group of pixels. Alternately, the apparatus 102 may generate a focus signal using any conventional method.

A Tracking Mode

The focus system controller, such as processor 112 in FIG. 1 or 2, may turn on the 'fine' control signal to the focus signal generator 120 to receive a fine focus signal when tracking mode starts. It may also turn on the 'exclude' control signal and provide the corresponding index to an exclusion calibration 205 within the focus signal generator 120 to retrieve the corresponding exclusion ranges, if the object nearly in-focus has been previously calibrated. If not, it can issue a calibrate command to the exclusion calibration 205 to perform a calibration and provide a new index to store the calibrated exclusion ranges, and subsequently retrieve them for use by the exclusion filter 207. Doing so improves an accuracy of the fine focus signal by greatly attenuating the interference from unintended objects.

Figure 39:
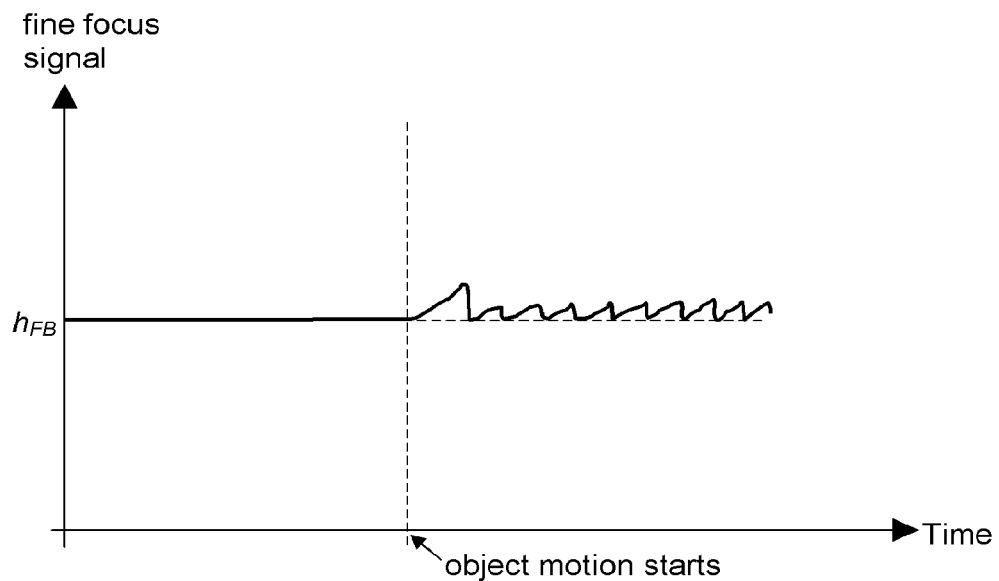
FIG. 39 is a graph illustrating a variation of the fine focus signal during tracking of a moving object for an embodiment of a focus control system that maintains the fine focus signal at a minimum.
Figure 40:
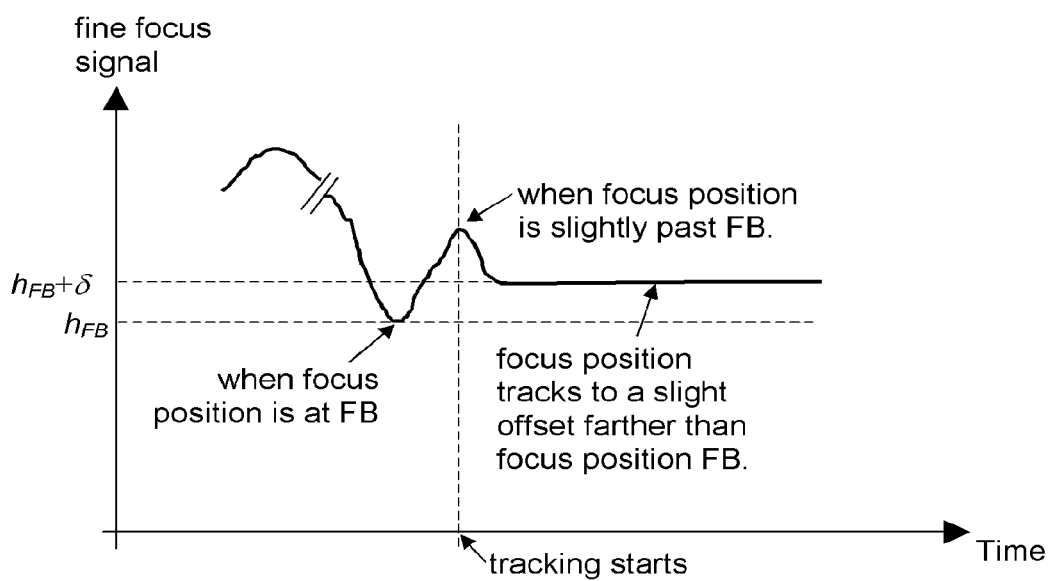
FIG. 40 is a graph illustrating how a fine focus signal varies with time during a sharp focus acquisition.
Figure 41:
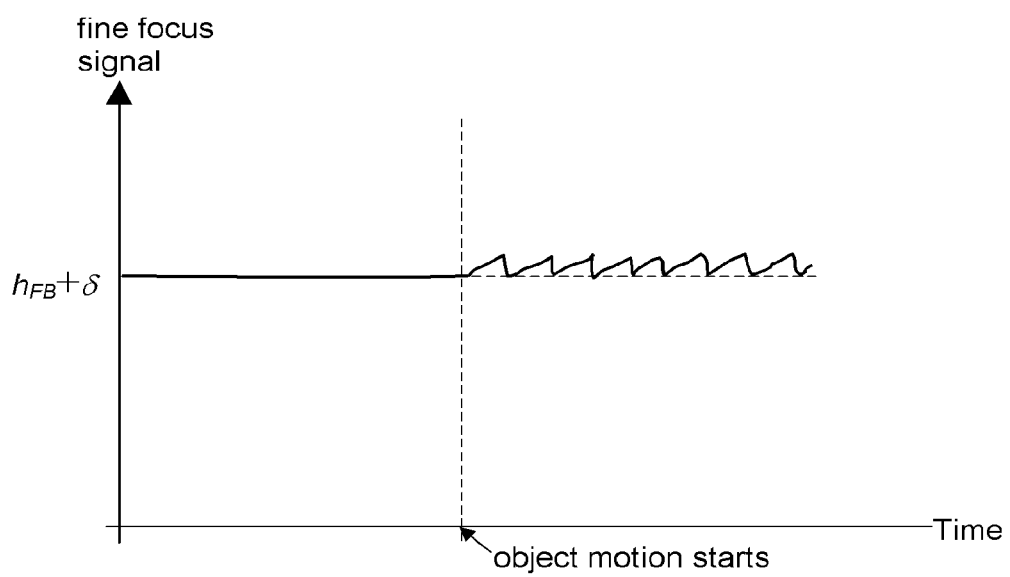
FIG. 41 is a graph illustrating a variation of the fine focus signal during a tracking of a moving object for an alternate embodiment of focus control system that maintains the fine focus signal at an offset from a minimum.

The focus system controller may adjust the focus position to keep the fine focus signal nearest possible to the minimum, as shown in FIG. 39, or it can pursue an alternate strategy of controlling the focus position to keep the fine focus signal an offset away from the sharp_edge_width and above the minimum, as shown in FIGS. 40 and 41. (sharp_edge_width is labeled as $h_{FB}$ in FIGS. 40-41.) Maintaining fine focus signal at an offset above sharp_edge_width and the minimum has a benefit in that a slight change in the fine focus signal due to any movement in the object gives off clue as to whether the object is moving closer or farther. If the focus position is farther than the ideal focus position that would have brought the fine focus signal to the minimum (hence the fine focus signal level is higher than the minimum), a movement in the object that reduces the fine focus signal must be directed outwards, i.e. closer to the scene location where the current focus position would make sharp image. On the other hand, if a movement in the object increases the fine focus signal, the object must be moving inwards, i.e. away from that scene location. On the other hand, if the focus position is nearer than the ideal focus position, the opposite would be true. The focus system controller then can immediately move the focus lens in the direction thus determined. This is shown in FIG. 41 where the fine focus signal is shown to always return to the same level after a small departure, whereas in FIG. 39 where the focus system controller targets the fine focus signal to the minimum is unable to immediately determine the direction of movement of the object and may make a mistake when the object starts moving, causing the initial increase in fine focus signal to be more rapid, and only after that to realize the mistaken guess of direction and to correct itself. In FIG. 39, the subsequent ripples are maintained as small as FIG. 41 on the assumption that the object continues to move in the same direction, hence the focus system controller does not make a second mistake in the direction. But if the object changes direction, the focus system controller that targets the minimum focus signal level can make a mistake again. In general, the focus system controller that targets the fine focus signal to an offset above the minimum can better cope with movement of an object that varies in velocity.

Use with Exclusion Illustrated

Figure 42B:
FIG. 42B is an illustration showing a second image captured after the bird has moved to a second location of the image capture frame.
Figure 42C:
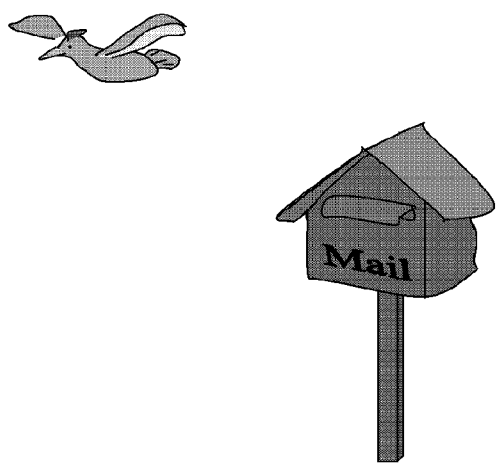
FIG. 42C is an illustration showing a third image captured after the bird has moved to a third location from the second location.
Figure 44:
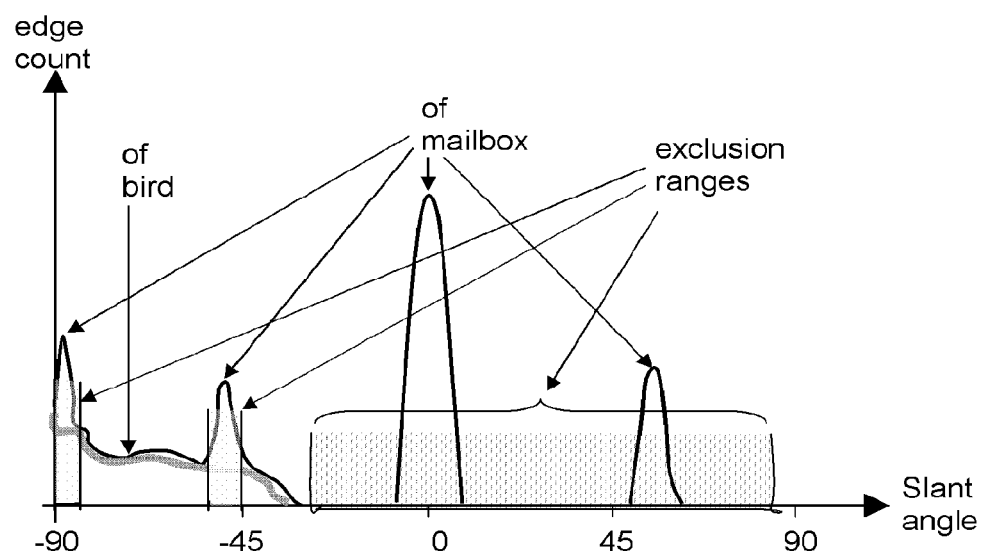
FIG. 44 is a first histogram of slant angle from the vertical axis of edges and a second histogram of only sharp-enough edges (bird) of FIG. 42A.

FIGS. 42A-42C illustrate an ability of the focus control system to track an object (the bird) that moves relative to background objects. In FIG. 42A, the bird is in sharp focus, and the focus system controller issues a calibrate command to the exclusion calibrator 205 and turns the 'fine' control signal ON to generate a fine focus signal and the 'exclude' control signal ON to exclude the mailbox, which is not sharp in FIG. 42A. The exclusion calibrator 205 finds two characteristics, namely the length of concatenated edges and slant angles, whose exclusion ranges are shown in FIGS. 43 and 44, respectively, to exclude the mailbox from the bird.

Next, in FIG. 42B, the bird flies near and rests on the mailbox. Between FIGS. 42A and 42B, the focus control system continues to track the bird to keep it in sharp focus. When the bird comes to rest on the mailbox, edges contributed by the mailbox are also sharp-enough edges, but they are excluded by the exclusion filter 207 by using two characteristics, namely the length of concatenated edges and slant angles, whose exclusion ranges are shown in FIGS. 43 and 44, respectively. The fine focus signal continues to indicate the sharpness of edges contributed by only the bird, not the mailbox. Finally, when the bird flies away, the focus control system continues to track the bird to maintain its image in sharp focus and not getting falsely-locked onto the mailbox, which by the sheer larger number of edges would have otherwise dominated the fine focus signal and falsely tell the focus control signal that the object of interest remains at the same focus distance.

Certain Advantages

One advantage of the focus signal generator is that the minimum focus signal of different images are at approximately the same values. This ensures that the lens will remain in the same position even if the camera is shaking but the image still remains sharp. Another advantage is that the range between the largest and smallest focus signal for a scene with different focal distances are wide enough to ensure that the optimum focus can be obtained.

A further advantage is that the focus signal value is not dependent on illumination nor on color or reflectivity of objects in the scene. Conventional contrast method of generating a focus signal produces contrast signal which is strongly dependent on all said factors, such that when a new object enters the scene even though at the sharp focus distance, the focus signal produced by the contrast method usually changes.

Alternate Embodiments

Figure 45:
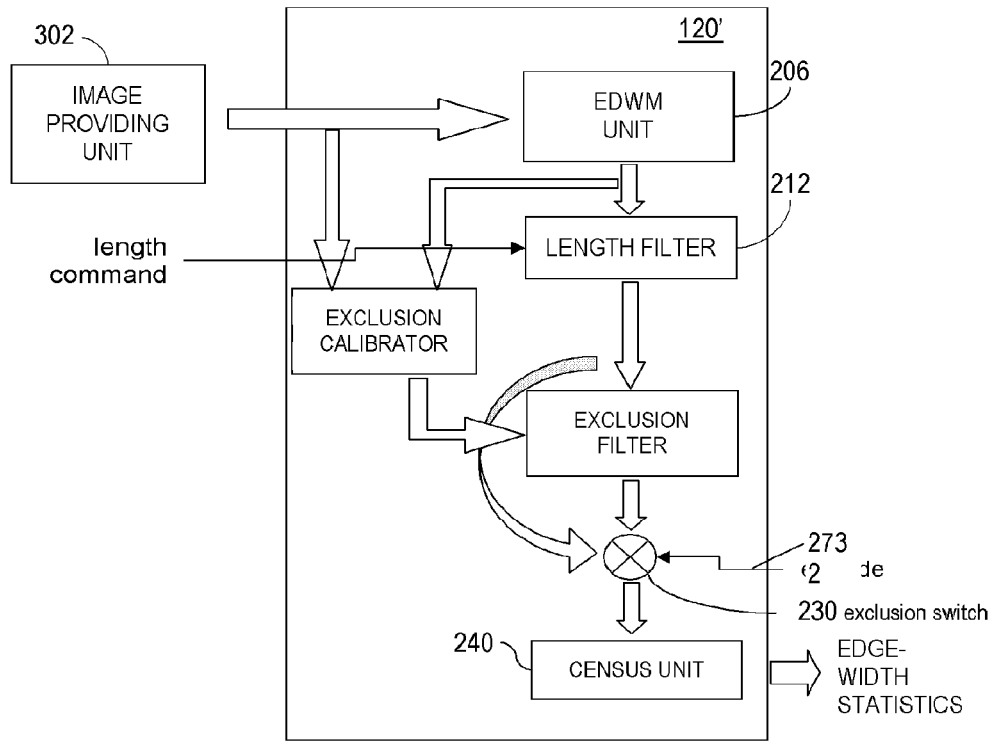
FIG. 45 is a block diagram of an alternate embodiment of a focus signal generator.

FIG. 45 shows an alternate embodiment of a focus signal generator 120'. Focus signal generator 120' outputs statistics of edges and edge widths. Among the edge-width statistics that controller 120' outputs may be one or more of the following: an edge-width histogram comprising edge counts at different edge widths; an edge width where edge width count reaches maximum; a set of coefficients representing a spline function that approximates edge counts at different edge widths; and any data that can represent a function of edge width. Census Unit 240 may receive data computed in one or more of the other units with the focus signal generator 120' to calculate statistics of edge widths. In general, the focus signal generator 120' may output a signal that has an indication of a distribution of edge widths.

Figure 46:
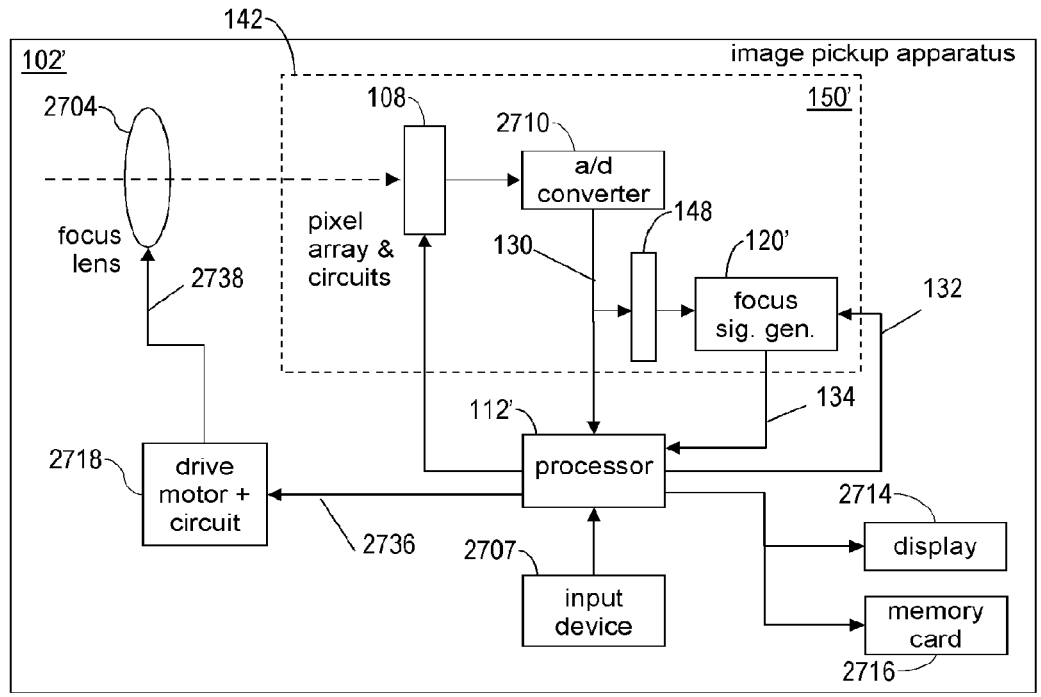
FIG. 46 is a schematic of an alternate embodiment of an auto-focus image pickup apparatus.

Referring to FIG. 46, the edge-width statistics thus provided in signals 134 to an alternate embodiment of processor 112' in an alternate auto-focus image pickup apparatus 102' may be used by the processor 112' to compute a gross and/or fine focus signal and a narrow-edge count in accordance with methods discussed above or equivalent thereof. In addition, any data computed in the focus signal generator 120' may be output to the processor 112' as part of the output signals 134. For example, the exclusion ranges and chains, along with statistics of edges, such as statistics of edge characteristics used for calculating the exclusion ranges and chains according to the flowcharts of FIG. 19 or FIG. 20, may be sent to the processor 112'.

The processor 112' may internally generate a focus signal and/or a narrow-edge count in addition to the functions included in the processor 112 of FIG. 1.

The pixel array 108, A/D Converter 110, color interpolator 148, and generator 120' may reside within a package 142, together comprising an image sensor 150', separate from the processor 112'.

Yet another embodiment of a focus signal generator may add a census unit 240 to the generator 102 of FIG. 1 and output one or more statistics calculated in such a generator to the processor 112.

Auxiliary Pixel Array

Figure 47:
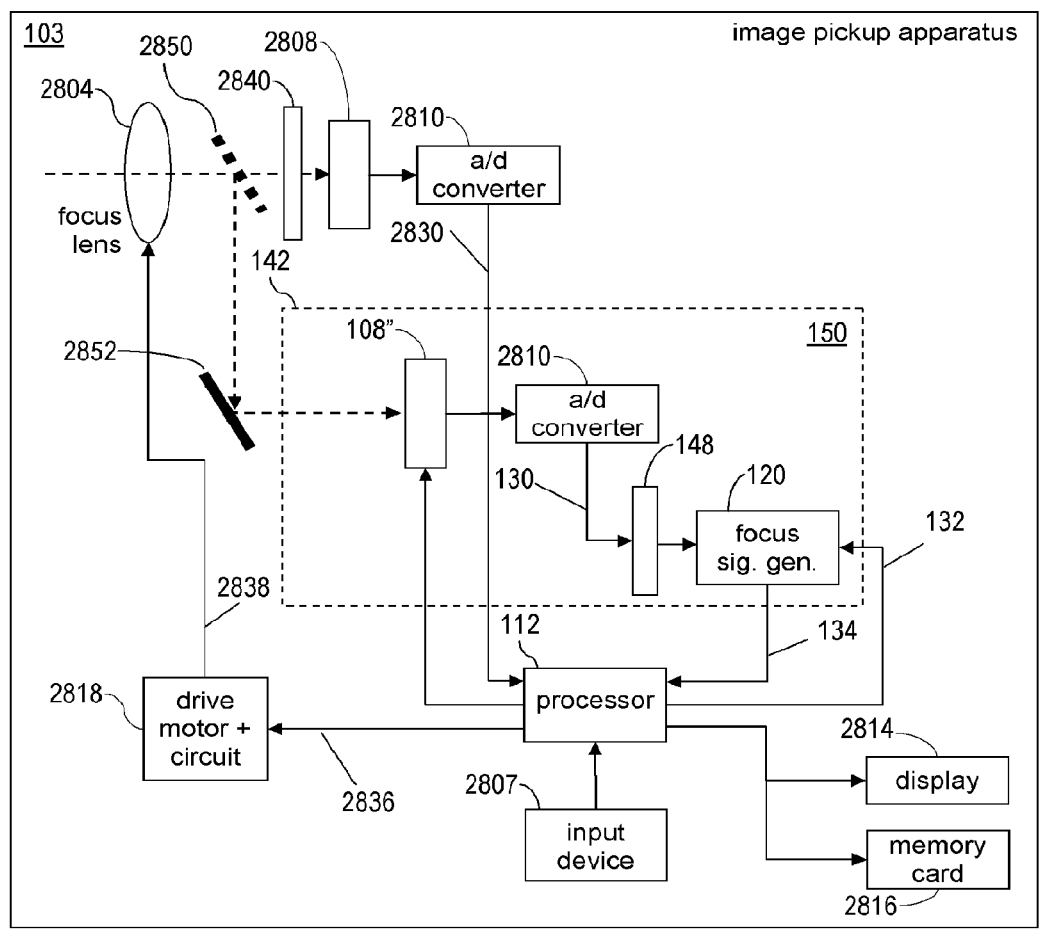
FIG. 47 is a schematic of an embodiment of an auto-focus image pickup apparatus having a main pixel array and an auxiliary pixel array.

FIG. 47 shows an alternate embodiment of an auto-focus image pickup system 103. In addition to elements included in a system 102, the system 103 may include a partial mirror 2850, a full mirror 2852, an optical lowpass filter 2840, a main pixel array 2808, and a main A/D Converter 2810. The partial mirror 2850 may split the incoming light beam into a first split beam and a second split beam, one transmitted, the other reflected. The first split beam may further pass through the optical lowpass filter 2840 before finally reaching the main pixel array 2808, which detects the first split beam and converts to analog signals. The second split beam may be reflected by the full mirror 2852 before finally reaching the auxiliary pixel array 108", which corresponds to the pixel array 108 in system 102 shown in FIG. 1. The ratio of light intensity of the first beam to the second beam may be 1-to-1 or greater than 1-to-1. For example, the ratio may be 4-to-1.

The main pixel array 2808 may be covered by a color filter array of a color mosaic pattern, e.g. the Bayer pattern. The optical lowpass filter 2808 prevents the smallest light spot focused on the pixel array 2808 from being too small as to cause aliasing. Where a color filter of a mosaic pattern covers the pixel array 2808, aliasing can give rise to color moiré artifacts after a color interpolation. For example, the smallest diameter of a circle encircling 84% of the visible light power of a light spot on the main pixel array 2808 ("smallest main diameter") may be kept larger than one and a half pixel width but less than two pixel widths by use of the optical lowpass filter. For example, if the main pixel array 2808 has a pixel width of 4.5 um, whereas the smallest diameter is 2.0 um without optical lowpass filtering, the optical lowpass filter 2840 may be selected to make the light spot 6.7 um or larger in diameter.

The auxiliary pixel array 108" may comprise one or more arrays of photodetectors. Each of the arrays may or may not be covered by a color filter array of a color mosaic pattern. The array(s) in auxiliary pixel array 108" outputs image(s) in analog signals that are converted to digital signals 130 by A/D Converter 110. The images are sent to the focus signal generator 120. A color interpolator 148 may generate the missing colors for images generated from pixels covered by color filters. If auxiliary pixel array 108" comprises multiple arrays of photodetectors, each array may capture a sub-image that corresponds to a portion of the image captured by the main pixel array 2808. The multiple arrays may be physically apart by more than a hundred pixel widths, and may or may not share a semiconductor substrate. Where the pixel arrays within auxiliary pixel array 108" do not share a semiconductor substrate, they may be housed together in a package (not shown).

Main A/D Converter 2810 converts analog signals from the Main Pixel Array 2808 into digital main image data signal 2830, which is sent to the processor 112, where the image captured on the Main Pixel Array 2808 may receive image processing such as color interpolation, color correction, and image compression/decompression and finally be stored in memory card 116.

An array of photodetectors in the auxiliary pixel array 108" may have a pixel width ("auxiliary pixel width") that is smaller than a pixel width of the main pixel array 2808 ("main pixel width"). The auxiliary pixel width may be as small as half of the main pixel width. If an auxiliary pixel is covered by a color filter and the auxiliary pixel width is less than 1.3 times the smallest spot of visible light without optical lowpass filtering, a second optical lowpass filter may be inserted in front of the auxiliary array 108" to increase the smallest diameter on the auxiliary pixel array 108" ("smallest auxiliary diameter") to between 1.3 to 2 times as large but still smaller than the smallest main diameter, preferably 1.5. The slight moiré in the auxiliary image is not an issue as the auxiliary image is not presented to the user as the final captured image.

Figure 50:
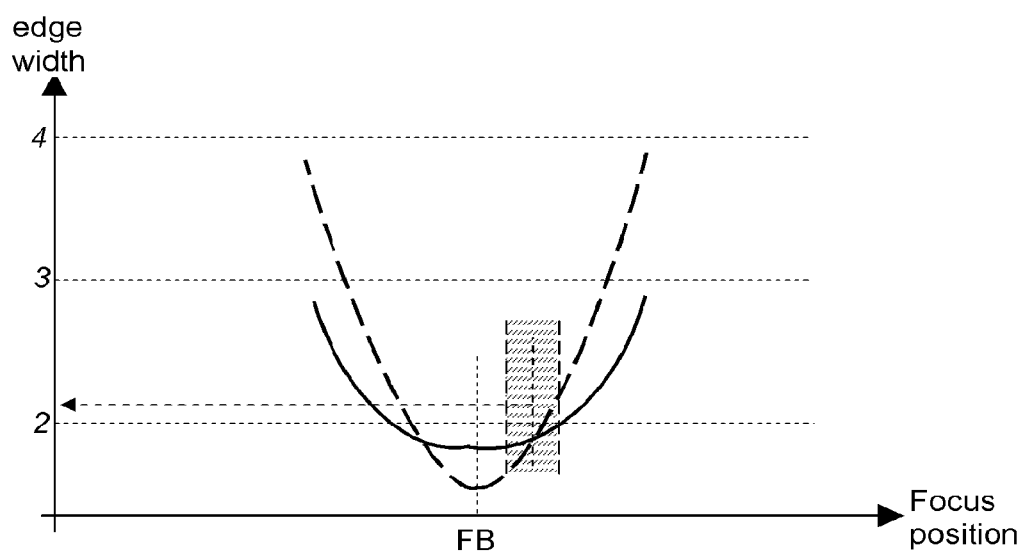
FIG. 50 is an illustration of a variation of an edge width from a main pixel array and a variation of an edge width from an auxiliary pixel array at different focus positions.

FIG. 50 illustrates how edge widths may vary about a sharp focus position for main images from the main pixel array 2808 (solid curve) and auxiliary images from the auxiliary pixel array 108" (dashed curve). The auxiliary images give sharper slopes even as the main images reach the targeted sharp edge width of 2. The auxiliary image is permitted to reach below the targeted sharp edge width, since moiré due to aliasing is not as critical in the auxiliary image, as it is not presented to the user as a final image. This helps to sharpen the slope below and above the sharp edge width. The sharper slope is also helped by the auxiliary pixel width being smaller than the main pixel width.

The shaded region in FIG. 50 indicates a good region within which to control the focus position to keep the main image in sharp focus. A change in focus position outwards will cause the edge width to increase in the auxiliary image, whereas a change inwards will cause the it to decrease. To maintain the main image's edge widths near the sharp edge width, a linear feedback control system may be employed to target the middle auxiliary edge width value within the shade region and to use as feedback signal the edge widths generated from the auxiliary images.

The auxiliary pixel array 108", A/D Converter 110, focus signal generator 120 together may be housed in a package 142 and constitute an auxiliary sensor 150. The auxiliary sensor 150 may further comprise a color interpolator 148.

Figure 48:
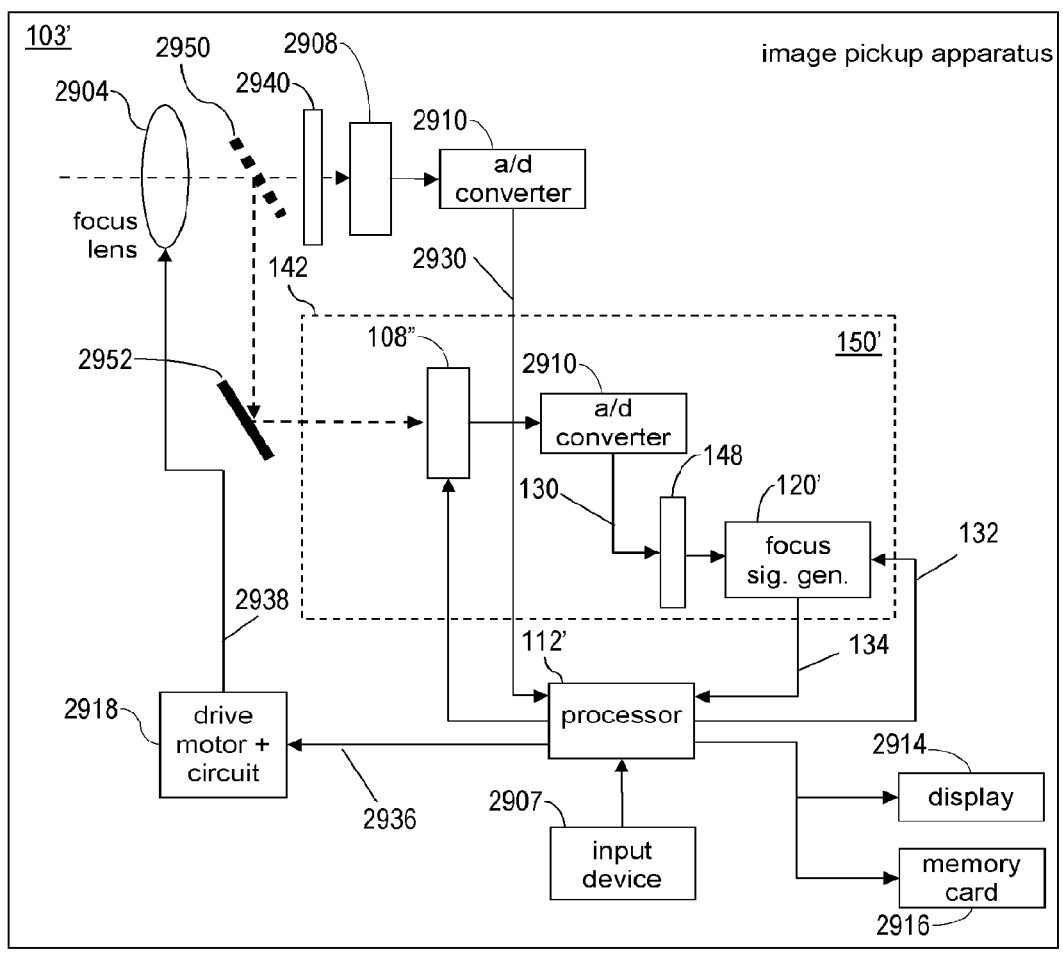
FIG. 48 is a schematic of an alternate embodiment of an auto-focus image pickup apparatus having a main pixel array and an auxiliary pixel array.

FIG. 48 shows an alternate embodiment of auto-focus image pickup apparatus 103' similar to apparatus 103 except focus signal generator 120' replaces focus signal generator 120. The auxiliary pixel array 108", A/D Converter 110, focus signal generator 120' together may be housed in a package 142 and constitute an auxiliary sensor 150'. The auxiliary sensor 150 may further comprise a color interpolator 148.

Figure 49:
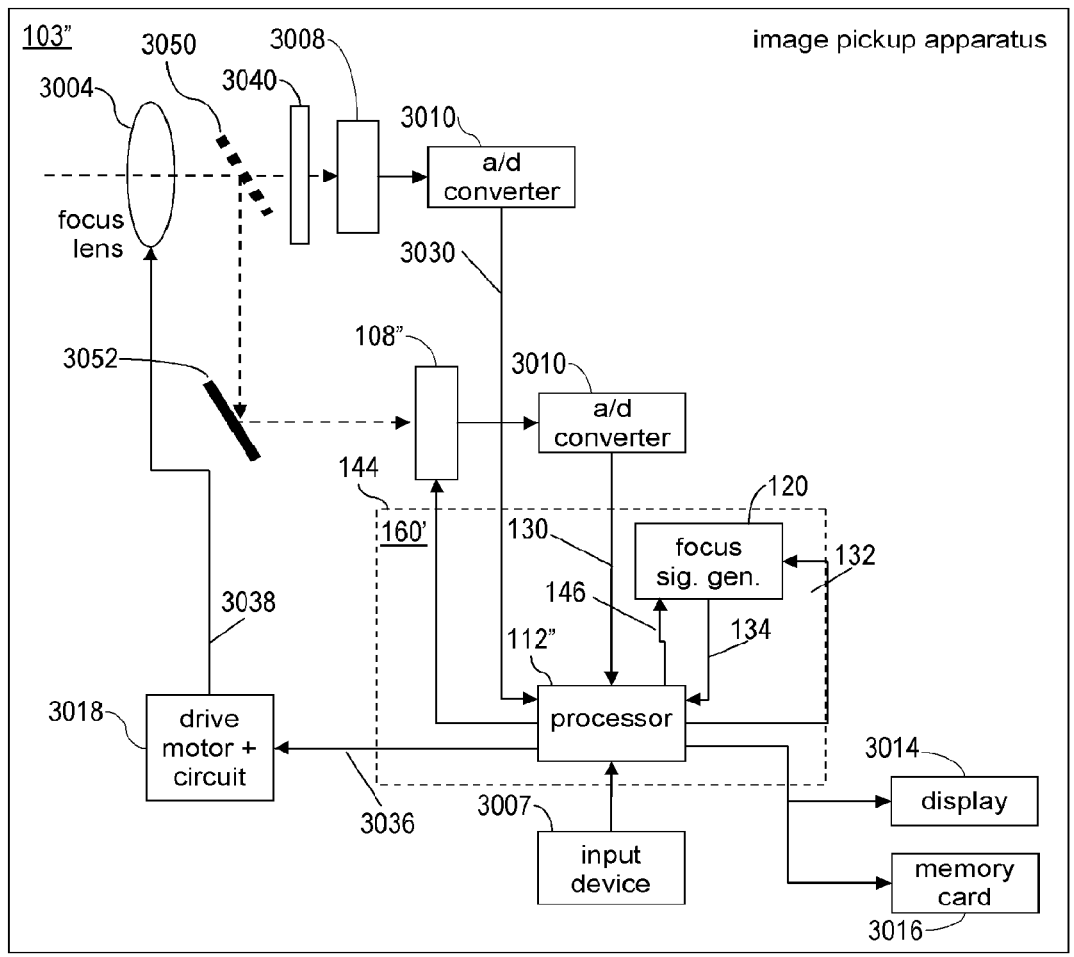
FIG. 49 is a schematic of an alternate embodiment of an auto-focus image pickup apparatus having a main pixel array and an auxiliary pixel array.

FIG. 49 shows an alternate embodiment of auto-focus image pickup apparatus 103". The focus signal generator 120 and the processor 112" may be housed in a package 144 as a camera controller, separate from the auxiliary pixel array 108". The processor 112" is similar to processor 112 except that processor 112" receives images from the main pixel array 2808 as well as the auxiliary pixel array 108". The processor 112" may perform a color interpolation, a color correction, a compression/decompression, and a storing to memory card 116 for the images received on signal 2830 similar to the processing that the processor 112 may perform on signal 130 in FIG. 2. Unlike in FIG. 2, here the images received on signal 130 need not receive compression/decompression and storing to memory card 116. The processor 112" may perform color interpolation on images received on signal 130 for pixels that are covered by color filters in the auxiliary pixel array 108" and send the color interpolated images to the focus signal generator 120 on signal 146.

The auto-focus image pickup system 102, 102', 103, 103', 103" may include a computer program storage medium (not shown) that comprises instructions that causes the processor 112, 112', 112" respectively, and/or the focus signal generator 120, 120' to perform one or more of the functions described herein. By way of example, the instructions may cause the processor 112 or the generator 120' to perform a slant correction for an edge width in accordance with the flowchart of FIG. 7. As another example, the instructions may cause the processor 112' or the generator 120 to perform an edge width filtering in accordance with the above description for Width Filter 209. Alternately, the processor 112, 112' or the generator 120, 120' may be configured to have a combination of firmware and hardware, or a pure hardware implementation for one or more of the functions contained therein. For example, in generator 120, a slant correction may be performed in pure hardware and a length filter 212 performed according to instructions in a firmware.

While a memory card 116 is shown as part of system 102, any nonvolatile storage medium may be used instead, e.g. hard disk drive, wherein images stored therein are accessible by a user and may be copied to a different location outside and away from the system 102.

One or more parameters for use in the system, for instance the sharp_edge_width, may be stored in a non-volatile memory in a device within the system. The device may be a flash memory device, the processor, or the image sensor, or the focus signal generator as a separate device from those.

One or more formulae for use in the system, for example for calculating the concatenated length threshold, or for calculating beta may likewise be stored as parameters or as computer-executable instructions in a non-volatile memory in one or more of those devices.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for evaluating a measure of sharpness of an image on basis of a plurality of edges within said image, comprising:
   receiving said image into a computing device; and,
   evaluating by said computing device a first measure on a gradient profile of an edge among said plurality of edges, wherein a contribution of a second measure of said gradient profile towards said measure of sharpness depends at least in part on said first measure but not on detection of any other edge,
   wherein each of said first and second measures is not affected by a change that scales all gradient values in said gradient profile with a non-zero scaling factor,
   wherein said gradient profile is a sequence of gradients that includes one peak gradient or one pair of mutually adjacent peak gradients of equal gradient values and gradient values of said gradients decline with each gradient further away from said one peak gradient/pair of peak gradients.

2. The method of claim 1, wherein each edge is a group of a plurality of pixels arrayed side-by-side in a direction and a gradient signal in said direction is either all-positive or all-negative over said plurality of pixels.

3. The method of claim 1, wherein said first measure is a weight for said second measure in determining said measure of sharpness.

4. The method of claim 1, wherein said first measure is used in a shape test, which is a comparison to decide whether or not said second measure will contribute towards said measure of sharpness.

5. The method of claim 1, wherein said first measure differentiates between a pair of gradient profiles having reflection symmetry about their respective single peak gradients whereas said second measure yields same result between both gradient profiles of the pair, wherein one of the pair of gradient profiles has gradient values declining linearly from its single peak gradient down to a first percentage of its single peak gradient whereas the other has gradient values declining in increasing step size from its single peak gradient down to said first percentage.

6. The method of claim 1, wherein, determination of peak gradient level and/or location of interpolated peak aside, said first and second measures essentially measure gradients on one side of the peak gradient(s) separately from gradients on another side.

7. The method of claim 6, wherein, if said one side passes a shape test, which is a predefined comparison based at least in part on said first measure, whereas said other side fails said shape test or any other criterion, said second measure of said other side is deemphasized in favor of said second measure of said one side for contribution to said measure of sharpness.

8. The method of claim 1, wherein said first measure measures a discrepancy between said gradient profile and a normal gradient profile defined by data stored in a nonvolatile memory.

9. The method of claim 1, further comprising:
   determining whether said first measure meets a predetermined criterion, said predetermined criterion being independent of said second measure.

10. The method of claim 1, wherein said first and second measures are not widths or pixel counts measured from said gradient profile at different gradient levels.

11. The method of claim 1, wherein said first and second measures are measured at different gradient levels.

12. The method of claim 1, wherein said first measure is a gradient level, normalized by a peak gradient value or interpolated peak gradient value, at a predefined distance from a peak gradient or interpolated peak of said gradient profile.

13. The method of claim 12, wherein said predefined distance is defined with respect to an edge width of said edge.

14. The method of claim 1, wherein said second measure measures a distance from a gradient/interpolated gradient at a predetermined percentage down from a peak gradient or an interpolated peak to a said peak gradient or said interpolated peak.

15. The method of claim 1, wherein said second measure measures an edge width of said edge.

16. The method of claim 1, wherein said second measure measures a distance between a gradient/interpolated gradient on one side of the peak gradient/pair of peak gradients and another gradient/interpolated gradient on an opposite side, both gradients/interpolated gradients being at a given percentage down from said peak gradient(s) or an interpolated peak.

17. The method of claim 15, said second measure measures an area under said gradient profile and normalized by a peak gradient value or interpolated peak gradient value of said gradient profile.

18. The method of claim 1, wherein said second measure is a function of distances of a plurality of gradients of said gradient profile from a predefined position within said gradient profile.

19. The method of claim 18, wherein said predefined position is a center of gravity among a plurality of gradients within said gradient profile, gradient values being treated as weights.

20. The method of claim 18, wherein said function measures a k-th central moment of a plurality of gradients within said gradient profile about said predefined position, k being a positive integer greater than one.

21. The method of claim 20, wherein k is even.

22. The method of claim 20, wherein k is odd.

23. The method of claim 20, wherein said second measure sums a plurality of gradient values in said gradient profile, each normalized by a peak gradient value or interpolated peak gradient value of said gradient profile.

24. The method of claim 1, further comprising:
   storing said edge in a memory and/or displaying said edge on a display, depending on a result of a comparison on said first measure.

* * * * *